United States Patent
Nakano et al.

(10) Patent No.: US 12,007,644 B2
(45) Date of Patent: Jun. 11, 2024

(54) LIQUID CRYSTAL DISPLAY DEVICE AND ELECTRONIC DEVICE

(71) Applicants: SONY SEMICONDUCTOR SOLUTIONS CORPORATION, Kanagawa (JP); SONY GROUP CORPORATION, Tokyo (JP)

(72) Inventors: Shintaro Nakano, Kanagawa (JP); Tsuyoshi Okazaki, Tokyo (JP)

(73) Assignees: SONY SEMICONDUCTOR SOLUTIONS CORPORATION, Kanagawa (JP); SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/907,425

(22) PCT Filed: Mar. 23, 2021

(86) PCT No.: PCT/JP2021/012088
§ 371 (c)(1),
(2) Date: Sep. 27, 2022

(87) PCT Pub. No.: WO2021/205869
PCT Pub. Date: Oct. 14, 2021

(65) Prior Publication Data
US 2023/0118579 A1 Apr. 20, 2023

(30) Foreign Application Priority Data
Apr. 6, 2020 (JP) .................................. 2020-068095

(51) Int. Cl.
*G02F 1/1335* (2006.01)
*G02F 1/13363* (2006.01)
*G02F 1/1343* (2006.01)

(52) U.S. Cl.
CPC .... *G02F 1/133526* (2013.01); *G02F 1/13363* (2013.01); *G02F 1/13439* (2013.01); *G02F 2201/121* (2013.01); *G02F 2201/123* (2013.01)

(58) Field of Classification Search
CPC ......... G02F 1/133634; G02F 1/133632; G02F 1/133526; G02F 1/13363; G02F 1/136209;
(Continued)

(56) References Cited

U.S. PATENT DOCUMENTS 7,006,294 B2 * 2/2006 Steenblik ............... B42D 25/29
380/54
2003/0179364 A1 * 9/2003 Steenblik ............. G02B 5/1861
356/71
(Continued)

FOREIGN PATENT DOCUMENTS

| CN | 103454808 A | 12/2013 |
| JP | 2001022284 A | * 1/2001 |

(Continued)

OTHER PUBLICATIONS

International Search Report and Written Opinion of PCT Application No. PCT/JP2021/012088, dated Jun. 8, 2021, 14 pages of ISRWO.

*Primary Examiner* — Hoan C Nguyen
(74) *Attorney, Agent, or Firm* — CHIP LAW GROUP

(57) ABSTRACT

Provided is a liquid crystal display device that includes a first substrate including a microlens corresponding to each pixel, a second substrate disposed to face the first substrate, and a liquid crystal material layer sandwiched between the first substrate and the second substrate. A first transparent material layer including a material having a first refractive index is formed in the first substrate, and a material having a second refractive index different from the first refractive index is disposed in a portion of the first transparent material (Continued)

layer corresponding to a region between adjacent pixels. A second transparent material layer including a material having a third refractive index is formed in the second substrate, and a material having a fourth refractive index different from the third refractive index is disposed in a portion of the second transparent material layer corresponding to the region between the adjacent pixels.

27 Claims, 44 Drawing Sheets

(58) Field of Classification Search
CPC ............ G02F 1/13439; G02F 2413/05; G02F 2201/121; G02F 2413/10; G02F 1/133567; G02F 2413/01; G02F 1/133562; G02F 2201/123; G02F 1/1368; G02F 1/13394; G02F 1/13306; G02F 1/136286; G02F 1/133345; G02F 1/133723; G02F 1/13452; G09F 9/00; H04N 9/3197; H04N 9/3105
See application file for complete search history.

(56) References Cited

U.S. PATENT DOCUMENTS

| | | | | |
|---|---|---|---|---|
| 2007/0183016 | A1* | 8/2007 | Kamijima | ......... G02F 1/133526 359/245 |
| 2012/0050659 | A1* | 3/2012 | Nakanishi | ......... G02F 1/134336 349/139 |
| 2013/0134536 | A1* | 5/2013 | Mori | ................. H01L 27/14623 438/70 |
| 2014/0218664 | A1* | 8/2014 | Nimura | ............. G02F 1/133526 349/95 |
| 2018/0314087 | A1* | 11/2018 | Ito | ..................... G02F 1/133524 |

FOREIGN PATENT DOCUMENTS

| | | |
|---|---|---|
| JP | 2007-249183 A | 9/2007 |
| JP | 2013-113954 A | 6/2013 |
| JP | 2018-100994 A | 6/2018 |
| JP | 2019-008044 A | 1/2019 |
| JP | 2019-132874 A | 8/2019 |
| JP | 2019-139140 A | 8/2019 |

* cited by examiner

LIQUID CRYSTAL DISPLAY DEVICE AND ELECTRONIC DEVICE

CROSS REFERENCE TO RELATED APPLICATIONS

This application is a U.S. National Phase of International Patent Application No. PCT/JP2021/012088 filed on Mar. 23, 2021, which claims priority benefit of Japanese Patent Application No. JP 2020-068095 filed in the Japan Patent Office on Apr. 6, 2020. Each of the above-referenced applications is hereby incorporated herein by reference in its entirety.

TECHNICAL FIELD

The present disclosure relates to a liquid crystal display device and an electronic device.

BACKGROUND ART

There has been known a liquid crystal display device having a configuration in which a liquid crystal material layer is sandwiched between a pair of substrates. The liquid crystal display device displays an image by operating a pixel as an optical shutter (light valve).

In recent years, the liquid crystal display device has been required to have high definition and high luminance. Therefore, it has been proposed that a microlens corresponding to a pixel is provided to increase light utilization efficiency. Furthermore, it has also been proposed to stack a plurality of microlenses to further increase light utilization efficiency (for example, see Patent Document 1).

CITATION LIST

Patent Document

Patent Document 1: Japanese Patent Application Laid-Open No. 2018-100994

SUMMARY OF THE INVENTION

Problems to be Solved by the Invention

In a case where a liquid crystal display device is formed by stacking a plurality of microlenses, it is necessary to align the lenses with high accuracy in order to form an image with high accuracy. However, due to a misalignment caused in a lithography process and a shape variation caused in an etching process, it is not easy to align the microlenses having a three-dimensional shape with high accuracy. At this point, it is required to increase light utilization efficiency without stacking a plurality of microlenses having a three-dimensional shape.

Therefore, an object of the present disclosure is to provide a liquid crystal display device capable of improving light utilization efficiency, without stacking a plurality of microlenses having a three-dimensional shape, and an electronic device including the liquid crystal display device.

Solutions to Problems

A liquid crystal display device according to the present disclosure for achieving the above-described object includes: a first substrate including a microlens corresponding to each pixel; a second substrate disposed to face the first substrate; and a liquid crystal material layer sandwiched between the first substrate and the second substrate, in which a first transparent material layer including a material having a first refractive index is formed in the first substrate, and a material having a second refractive index different from the first refractive index is disposed in a portion of the first transparent material layer corresponding to a region between adjacent pixels, and a second transparent material layer including a material having a third refractive index is formed in the second substrate, and a material having a fourth refractive index different from the third refractive index is disposed in a portion of the second transparent material layer corresponding to the region between adjacent pixels.

The first transparent material layer is formed between the microlens and the liquid crystal material layer.

The second refractive index is smaller than the first refractive index.

The material having the second refractive index is arranged in a form of a lattice.

The material having the second refractive index is arranged to widen at an intersection portion of the lattice.

The material having the first refractive index is a silicon nitride or a silicon oxynitride.

The material having the second refractive index is a silicon oxide.

A multilayer laminate film including a high refractive index material film and a low refractive index material film is disposed between the microlens and the first transparent material layer.

The multilayer laminate film includes a silicon nitride film and a silicon oxide film.

The first transparent material layer includes a multilayer laminate film including a high refractive index material film and a low refractive index material film.

The fourth refractive index is smaller than the third refractive index.

The material having the fourth refractive index is arranged in a form of a lattice.

The material having the fourth refractive index is arranged to widen at an intersection portion of the lattice.

The material having the third refractive index is a silicon nitride or a silicon oxynitride.

The material having the fourth refractive index is a silicon oxide.

A transparent common electrode is formed in the first substrate, and a transparent pixel electrode corresponding to each pixel is formed in the second substrate.

The second substrate has a lattice-shaped light shielding region located in a portion corresponding to the region between adjacent pixels.

A plurality of transparent electrodes extending in a first direction is formed in the first substrate, and a plurality of transparent electrodes extending in a second direction different from the first direction is formed in the second substrate.

An electronic device according to the present disclosure for achieving the above-described object includes a liquid crystal display device, the liquid crystal display device including: a first substrate including a microlens corresponding to each pixel; a second substrate disposed to face the first substrate; and a liquid crystal material layer sandwiched between the first substrate and the second substrate, in which a first transparent material layer including a material having a first refractive index is formed in the first substrate, and a material having a second refractive index different from the first refractive index is disposed in a portion of the first transparent material layer corresponding to a region between adjacent pixels, and a second transparent material layer including a material having a third refractive index is formed in the second substrate, and a transparent material having a fourth refractive index different from the third refractive index is disposed in a portion of the second transparent material layer corresponding to the region between adjacent pixels.

A third transparent material layer including a material having a fifth refractive index higher than the second refractive index is formed on the first transparent material layer in the first substrate, and the material having the second refractive index is embedded in a first groove provided in portions of the first and third transparent material layers corresponding to the region between adjacent pixels.

A side wall of the first groove in the first transparent material layer is inclined at a first inclination angle from a direction perpendicular to an interface between the first transparent material layer and the third transparent material layer, and a side wall of the first groove in the third transparent material layer is inclined at a second inclination angle larger than the first inclination angle from the perpendicular direction.

The third transparent material layer has a film thickness of larger than 0 nm and smaller than 200 nm.

The first transparent material layer is a silicon oxynitride film, and the third transparent material layer is a silicon nitride film.

The third transparent material layer is etched or polished at a slower speed than the first transparent material layer.

A fourth transparent material layer including a material having a sixth refractive index higher than the fourth refractive index is formed on the second transparent material layer in the second substrate, and the material having the fourth refractive index is embedded in a second groove provided in portions of the second and fourth transparent material layers corresponding to the region between adjacent pixels.

A side wall of the second groove in the second transparent material layer is inclined at a third inclination angle from a direction perpendicular to an interface between the second transparent material layer and the fourth transparent material layer, and a side wall of the second groove in the fourth transparent material layer is inclined at a fourth inclination angle larger than the third inclination angle from the perpendicular direction.

The fourth transparent material layer has a film thickness of larger than 0 nm and smaller than 200 nm.

The second transparent material layer is a silicon oxynitride film, and the fourth transparent material layer is a silicon nitride film.

The fourth transparent material layer is etched or polished at a slower speed than the second transparent material layer.

In the electronic device according to the present disclosure for achieving the above-described object, a third transparent material layer including a material having a fifth refractive index higher than the second refractive index is formed on the first transparent material layer in the first substrate, and the material having the second refractive index is embedded in a first groove provided in portions of the first and third transparent material layers corresponding to the region between adjacent pixels.

BRIEF DESCRIPTION OF DRAWINGS

FIG. 30A shows a front view thereof and FIG. 30B shows a rear view thereof.

MODE FOR CARRYING OUT THE INVENTION

Figure 1:
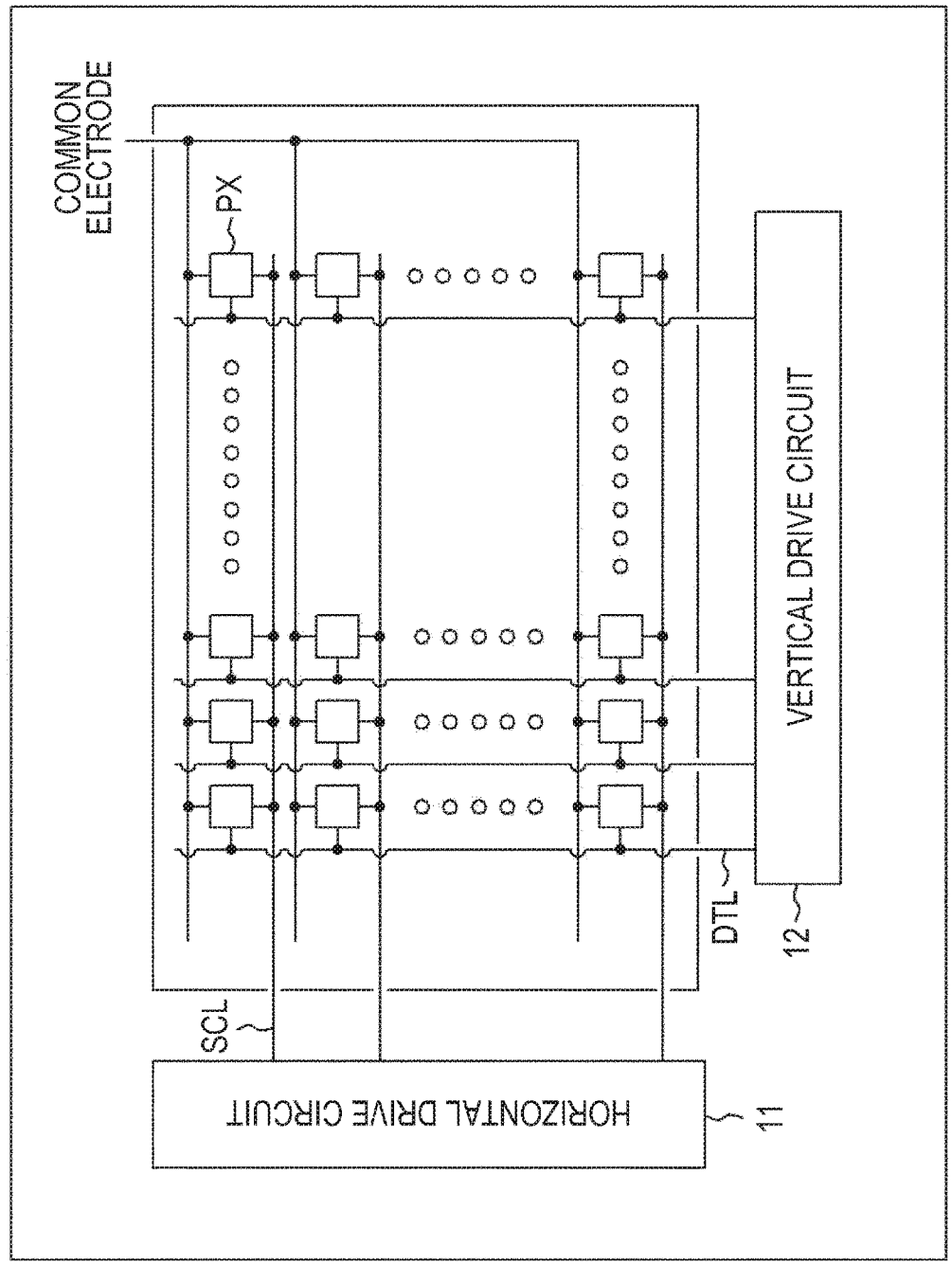
FIG. 1 is a schematic view for explaining a liquid crystal display device according to a first embodiment.

Hereinafter, the present disclosure will be described based on embodiments with reference to the drawings. The present disclosure is not limited to the embodiments, and various numerical values and materials in the embodiments are exemplary. In the following description, the same reference signs will be used for the same elements or elements having the same functions, and description thereof will not be repeated. Note that the description will be given in the following order.

1. General Description of Liquid Crystal Display Device and Electronic Device According to Present Disclosure
2. First Embodiment
3. Second Embodiment
4. Third Embodiment
5. Fourth Embodiment
6. Description of Electronic Device
7. Application Example
8. Others

[General Description of Liquid Crystal Display Device and Electronic Device According to Present Disclosure]

In the following description, a liquid crystal display device according to the present disclosure and a liquid crystal display device included in an electronic device according to the present disclosure may be simply referred to as [a liquid crystal display device of the present disclosure]. As described above, the liquid crystal display device of the present disclosure includes:

a first substrate including a microlens corresponding to each pixel;
a second substrate disposed to face the first substrate; and
a liquid crystal material layer sandwiched between the first substrate and the second substrate,
in which a first transparent material layer including a material having a first refractive index is formed in the first substrate, and a material having a second refractive index different from the first refractive index is disposed in a portion of the first transparent material layer corresponding to a region between adjacent pixels, and
a second transparent material layer including a material having a third refractive index is formed in the second substrate, and a material having a fourth refractive index different from the third refractive index is disposed in a portion of the second transparent material layer corresponding to the region between adjacent pixels.

In the liquid crystal display device of the present disclosure, the first transparent material layer can be formed between the microlens and the liquid crystal material layer. The configuration of the microlens is not particularly limited. The microlens can be formed by a known lithography technique or a known etching technique.

In the liquid crystal display device of the present disclosure including the above-described preferable configuration, the second refractive index can be smaller than the first refractive index.

In the liquid crystal display device of the present disclosure including the above-described various preferable configurations, the material having the second refractive index may be discretely arranged, but is preferably arranged in the form of a lattice. In this case, the material having the second refractive index can be arranged to widen at an intersection portion of the lattice.

In the liquid crystal display device of the present disclosure including the above-described various preferable configurations, the material having the first refractive index and the material having the second refractive index can be appropriately selected from organic materials and inorganic materials. From the viewpoint of a process of manufacturing the liquid crystal display device and the like, the material having the first refractive index is preferably a silicon nitride or a silicon oxynitride. In this case, the material having the second refractive index can be a silicon oxide.

In the liquid crystal display device of the present disclosure including the above-described various preferable configurations, a multilayer laminate film including a high refractive index material film and a low refractive index material film can be disposed between the microlens and the first transparent material layer. The high refractive index material film and the low refractive index material film can be constituted by using, for example, inorganic insulating materials. Examples of the material constituting the high refractive index material film include a silicon nitride ($SiN_x$), a tantalum oxide ($Ta_2O_5$), and a titanium oxide ($TiO_2$). In addition, examples of the material constituting the low refractive index material film include a silicon oxide ($SiO_x$) and a silicon oxynitride ($SiO_xN_y$). From the viewpoint of a process of manufacturing the liquid crystal display device and the like, the multilayer laminate film preferably includes a silicon nitride film and a silicon oxide film.

The multilayer laminate film described above usually functions as a C plate. In addition, the multilayer laminate film including a group of stacked layers, in which high refractive index oblique vapor deposition films and low refractive index oblique vapor deposition films having the same inclination direction with respect to a normal line of a surface on which the films are formed are alternately formed, optically functions as an inclined C plate. Such a multilayer laminate film can optically compensate for the influence of the refractive index anisotropy of the liquid crystal material layer and the pre-tilt of the liquid crystal molecules.

The film thickness or the number of stacked films of the multilayer laminate film may be appropriately set from the viewpoint of optical compensation. For example, the film thickness can be about 10 to 50 nanometers. The film thickness ratio between the high refractive index material films and the low refractive index material films may be about 1:1. The number of these stacked films may be, for example, about 10 to 200. The high refractive index material films and the low refractive index material films can be formed by a known film formation method such as a CVD method or a PVD method.

Alternatively, in the liquid crystal display device of the present disclosure including the above-described various preferable configurations, the first transparent material layer may include a multilayer laminate film including a high refractive index material film and a low refractive index material film. In this case, a mean refractive index of the multilayer laminate film may be set as the first refractive index. The configuration of the multilayer laminate film including the high refractive index material films and the low refractive index material films is similar to that described above, and thus, the description thereof will be omitted.

In the liquid crystal display device of the present disclosure including the above-described various preferable configurations, the fourth refractive index can be smaller than the third refractive index.

In the liquid crystal display device of the present disclosure including the above-described various preferable configurations, the material having the fourth refractive index may be discretely arranged, but is preferably arranged in the form of a lattice. In this case, the material having the fourth refractive index can be arranged to widen at an intersection portion of the lattice.

In the liquid crystal display device of the present disclosure including the above-described various preferable configurations, the material having the third refractive index and the material having the fourth refractive index can be appropriately selected from organic materials and inorganic materials. From the viewpoint of a process of manufacturing the liquid crystal display device and the like, the material having the third refractive index is preferably a silicon nitride or a silicon oxynitride. In this case, the material having the fourth refractive index can be a silicon oxide.

In the liquid crystal display device of the present disclosure including the above-described various preferable configurations, a transparent common electrode can be formed in the first substrate, and a transparent pixel electrode corresponding to each pixel can be formed in the second substrate. Furthermore, in order to operate the liquid crystal display device in a so-called active matrix type, a transistor for driving the transparent pixel electrode or a holding capacitor for holding a charge may be formed in the second substrate. In this case, the second substrate can have a lattice-shaped light shielding region located in a portion corresponding to a region between adjacent pixels The light shielding region is usually formed by shielding light using various wirings, electrodes, or the like for driving the transparent pixel electrode. The light shielding region usually has a lattice shape to be located between pixels.

Alternatively, in the liquid crystal display device of the present disclosure including the above-described various preferable configurations, a plurality of transparent electrodes extending in a first direction can be formed in the first substrate, and a plurality of transparent electrodes extending in a second direction different from the first direction can be formed in the second substrate. The liquid crystal display device having this configuration is a liquid crystal display device in a so-called passive matrix type, and a portion where a transparent electrode in the first direction and a transparent electrode in the second direction different from the first direction overlap each other functions as a pixel.

In a case where the liquid crystal display device is a transmissive liquid crystal display device, the transparent pixel electrode or the like formed in the second substrate can be formed using a transparent conductive material such as an indium tin oxide (ITO) or an indium zinc oxide (IZO). The same applies to the transparent common electrode formed in the first substrate. Note that, in some cases, it is also possible to use a metal thin film including silver (Ag), magnesium (Mg), or the like having a thickness of about 5 nm and transmitting light to some extent.

As a substrate used for the first substrate or the second substrate, a substrate including a transparent material such as plastic, glass, or quartz can be used. In addition, the transistors and various circuits driving the pixel electrodes provided in the second substrate can be configured by, for example, forming and processing a semiconductor material layer or the like on the substrate.

The material constituting various wirings, electrodes, or contacts is not particularly limited, and a metal material can be used, for example, aluminum (Al), an aluminum alloy such as Al—Cu or Al—Si, tungsten (W), or a tungsten alloy such as a tungsten silicide (WSi).

The material constituting an interlayer insulating layer, a planarization film, or the like is not particularly limited, and an inorganic material such as a silicon oxide, a silicon oxynitride, or a silicon nitride, or an organic material such as polyimide can be used.

A method for forming the semiconductor material layer, the wiring, the electrode, the insulating layer, the insulating film, or the like is not particularly limited, and a film can be formed using a known film formation method as long as it does not cause a problem in implementing the present disclosure. The same applies to a method for patterning the semiconductor material layer, the wiring, the electrode, the insulating layer, the insulating film, or the like.

The liquid crystal display device may be configured to display a monochrome image, or may be configured to display a color image. As a pixel value of the liquid crystal display device, some image resolutions can be exemplified, for example, (3840, 2160) and (7680, 4320) as well as U-XGA (1600, 1200), HD-TV (1920, 1080), and Q-XGA (2048, 1536), but the pixel value is not limited thereto.

Furthermore, as an electronic device including the liquid crystal display device of the present disclosure, various electronic devices each having an image display function can be exemplified as well as a direct view type display device or a projection type display device.

In the present specification, various conditions are considered satisfied not only when they are strictly satisfied but also when they are substantially satisfied. The presence of several variations caused by design or caused in a manufacturing process is allowed. In addition, the drawings used in the following description are schematic, and do not indicate actual dimensions or ratios therebetween.

First Embodiment

A first embodiment relates to a liquid crystal display device and an electronic device according to the present disclosure.

FIG. 1 is a schematic view for explaining the liquid crystal display device according to the first embodiment.

The liquid crystal display device according to the first embodiment is a liquid crystal display device in an active matrix type. As shown in FIG. 1, the liquid crystal display device 1 includes pixels PX arranged in a matrix form and various circuits such as a horizontal drive circuit 11 and a vertical drive circuit 12 for driving the pixels PX. The liquid crystal display device 1 is a display device in which various circuits such as the horizontal drive circuit 11 and the vertical drive circuit 12 are integrated. Note that, in some cases, various circuits may be configured separately.

The reference sign SCL denotes a scanning line for scanning the pixels PX, and the reference sign DTL denotes a signal line for supplying various voltages to the pixels PX. The pixels PX are arranged in a matrix form, including, for example, M pixels PX in a horizontal direction and N pixels PX in a vertical direction, i.e. a total of M×N pixels PX. A common electrode shown in FIG. 1 is provided as an electrode common to all liquid crystal cells. Note that, in an example shown in FIG. 1, each of the horizontal drive circuit 11 and the vertical drive circuit 12 is disposed on one end side of the liquid crystal display device 1, but this is merely exemplary.

Figure 2A:
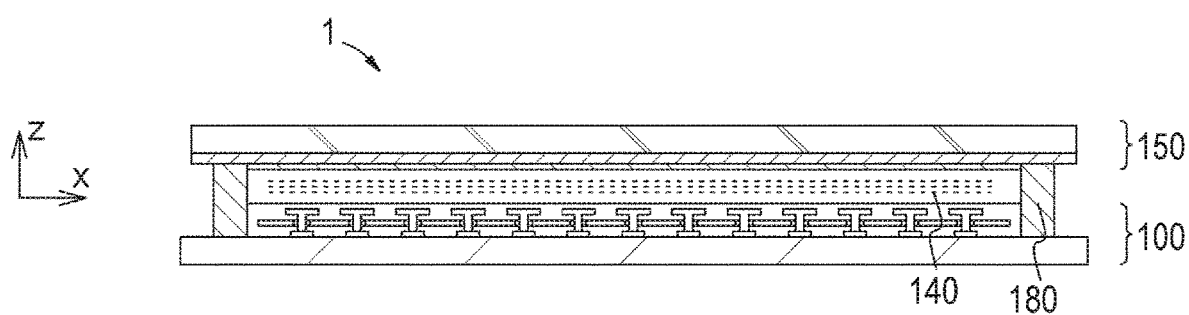
FIG. 2A is a schematic cross-sectional view for explaining a basic configuration of the liquid crystal display device.
Figure 2B:
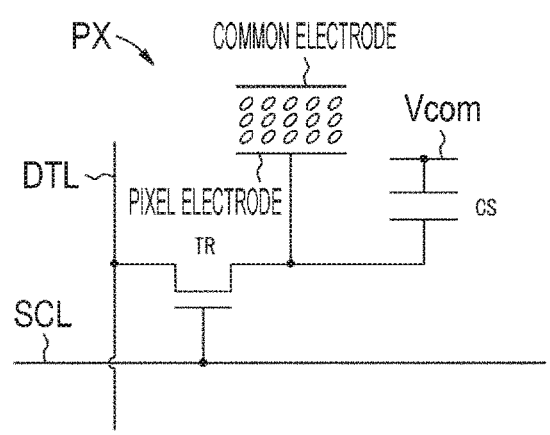
FIG. 2B is a schematic circuit diagram for explaining a pixel in the liquid crystal display device.

FIG. 2A is a schematic cross-sectional view for explaining a basic configuration of the liquid crystal display device. FIG. 2B is a schematic circuit diagram for explaining a pixel in the liquid crystal display device.

As shown in FIG. 2A, the liquid crystal display device 1 includes a first substrate 150, a second substrate 100 disposed to face the first substrate 150, and a liquid crystal material layer 140 sandwiched between the first substrate 150 and the second substrate 100. For convenience of illustration, the first substrate 150 and the second substrate 100 in FIG. 2A are illustrated in a simplified manner. The first substrate 150 and the second substrate 100 are sealed by a seal part 180. The seal part 180 has an annular shape to surround the liquid crystal material layer 140.

Although not shown in FIG. 2A, the first substrate 150 includes a microlens corresponding to each of the pixels. In addition, the first substrate 150 includes a transparent common electrode including a transparent conductive material such as ITO. More specifically, the first substrate 150 includes a rectangular support substrate including a transparent material such as quartz, a microlens corresponding to each of the pixels, a transparent common electrode provided on a surface of the support substrate facing the liquid crystal material layer 140, an alignment film provided on the transparent common electrode, etc. Furthermore, appropriate polarizing films or the like are disposed on the first substrate 150 and the second substrate 100 to satisfy the crossed Nicols or parallel Nicols condition.

As will be described later, the second substrate 100 is formed by stacking various components on a support substrate including, for example, quartz. The liquid crystal display device 1 is a transmissive liquid crystal display device. That is, light from a light source enters the first substrate 150 and exits the second substrate 100 after passing through the liquid crystal material layer.

As shown in FIG. 2B, a liquid crystal cell constituting a pixel PX includes a transparent pixel electrode provided on the second substrate 100, and a liquid crystal material layer and a transparent common electrode in a portion corresponding to the transparent pixel electrode. In order to prevent the deterioration of the liquid crystal material layer, a positive-polarity common potential $V_{com}$ and a negative-polarity common potential $V_{com}$ are alternately applied to the transparent common electrode while the liquid crystal display device 1 is driven. Note that the components of the pixel PX excluding the liquid crystal material layer and the transparent common electrode are formed on the second substrate 100 shown in FIG. 2A.

As is clear from the connection relationship in FIG. 2B, a pixel voltage supplied through the signal line DTL is applied to the transparent pixel electrode via a transistor TR brought into a conductive state by a scanning signal through the scanning line SCL. Since the transparent pixel electrode and one electrode of a capacitance structure CS are conductive, the pixel voltage is also applied to one electrode of the capacitance structure CS. Note that the common potential $V_{com}$ is applied to the other electrode of the capacitance structure CS. In this configuration, even after the transistor TR is brought into a non-conductive state, the voltage of the transparent pixel electrode is maintained by the capacitance of the liquid crystal cell and the capacitance structure CS.

As will be described in detail with reference to FIGS. 3 to 13, in the display device 1 according to the first embodiment, a first transparent material layer including a material having a first refractive index is formed in the first substrate 150, and a material having a second refractive index different from the first refractive index is disposed in a portion of the first transparent material layer corresponding to a region between adjacent pixels. Also, a second transparent material layer including a material having a third refractive index is formed in the second substrate 100, and a material having a fourth refractive index different from the third refractive index is disposed in a portion of the second transparent material layer corresponding to a region between adjacent pixels.

Figure 3:
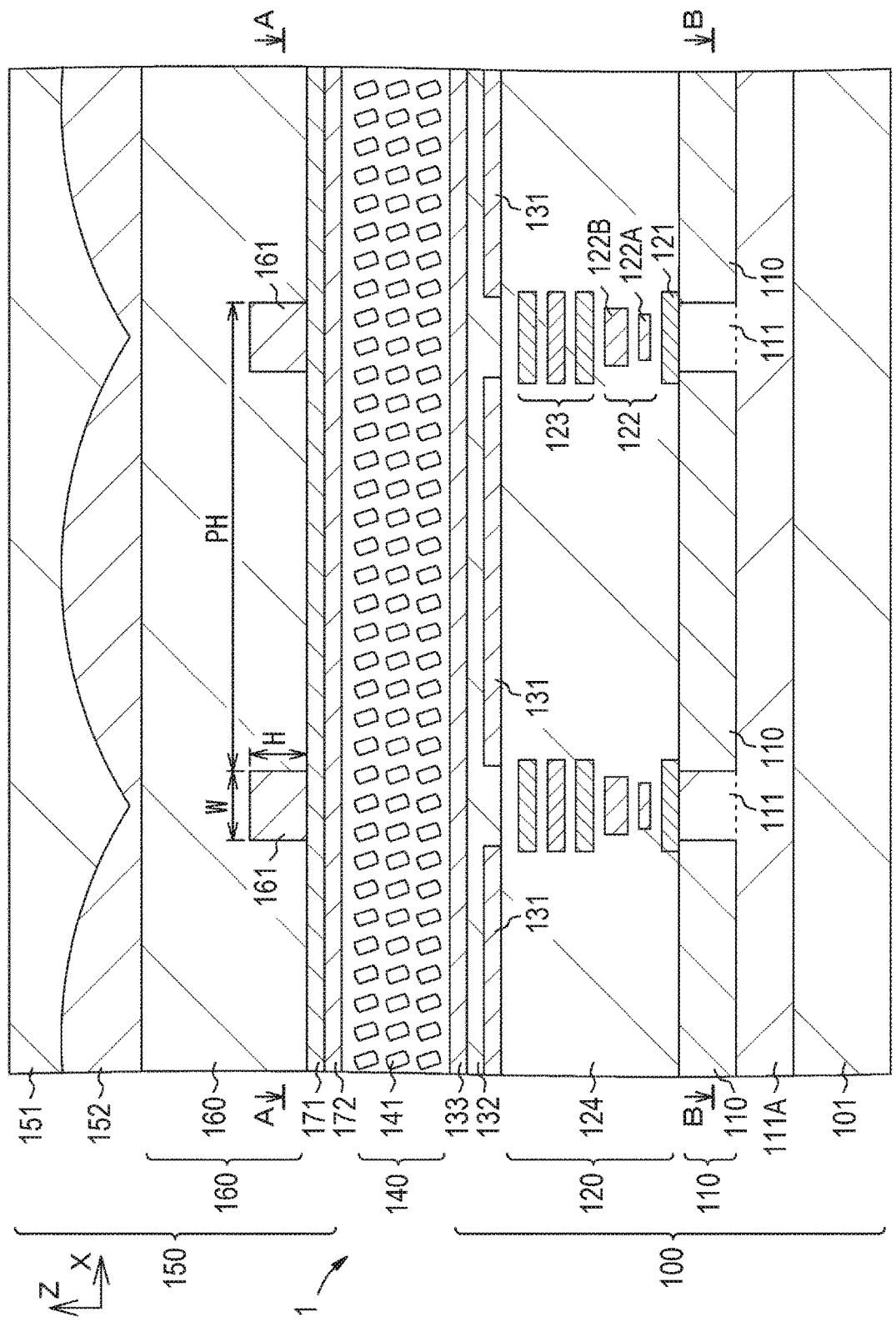
FIG. 3 is a partial schematic cross-sectional view of a substrate, etc. for explaining the liquid crystal display device according to the first embodiment.

FIG. 3 is a partial schematic cross-sectional view of a substrate, etc. for explaining the liquid crystal display device according to the first embodiment.

As described above, the liquid crystal display device 1 includes a first substrate 150, a second substrate 100, and a liquid crystal material layer 140 sandwiched between the first substrate 150 and the second substrate 100.

The first substrate 150 includes a support substrate 151 including quartz and a microlens 152 formed on the support substrate 151 and disposed to correspond to each pixel. In addition, a first transparent material layer 160 including a material having a first refractive index is formed in the first substrate 150, and a material 161 having a second refractive index different from the first refractive index is disposed in a portion of the first transparent material layer 160 corresponding to a region between adjacent pixels. Note that, for convenience of description, the material constituting the first transparent material layer 160 may be referred to as the material 160.

An arrangement pitch, a height, and a width of the material 161 are denoted by the reference signs PH, H, and W, respectively. The pitch denoted by the reference sign PH is equal to a pixel pitch, and has a value of, for example, about 5 to 10 micrometers. In addition, the height denoted by the reference sign H has a value of about 0.2 to 1 micrometer, and the width denoted by the reference sign W has a value of 0.5 to 1 micrometer.

The material 160 having the first refractive index and the material 161 having the second refractive index are selected to satisfy the condition that the second refractive index is smaller than the first refractive index. Here, the material 160 having the first refractive index is a silicon nitride, and the material 161 having the second refractive index is a silicon oxide. The first transparent material layer 160 including the silicon nitride is formed between the microlens 152 and the liquid crystal material layer 140. A transparent common electrode 171 and an alignment film 172 are stacked on a surface of the first transparent material layer 160 facing the liquid crystal material layer 140.

The second substrate 100 disposed to face the first substrate 150 includes a support substrate 101 including quartz, a wiring layer 120 including various wirings and the like, and a pixel electrode 131 formed on the wiring layer 120. A planarization film 132 and an alignment film 133 are stacked on an entire surface of the wiring layer including on the pixel electrode 131. The pixel electrode 131 is connected to one source/drain region of a transistor 122 via a contact (not illustrated).

In the wiring layer 120, the reference sign 121 denotes a wiring that also serves to shield light, and the reference sign 122 denotes a transistor. The reference sign 122A denotes a patterned semiconductor material layer, and the reference sign 122B denotes a gate electrode. Note that, although not illustrated, the wiring 121 is connected to the gate electrode 122B. The reference sign 123 schematically denote various other wirings. Note that the wirings 123 include wirings extending in an X direction and wirings extending in a Y direction, but only partial cross sections thereof are schematically shown in FIG. 3. The reference sign 124 denotes an insulating layer for separating the wirings and the like from each other. Note that the wiring layer 120 is formed by stacking various elements, but is illustrated in a simplified manner for convenience of illustration.

A second transparent material layer 110 including a material having a third refractive index is formed between the support substrate 101 and the wiring layer 120, and a material 111 having a fourth refractive index different from the third refractive index is disposed in a portion of the second transparent material layer 110 corresponding to a region between adjacent pixels. The reference sign 111A denotes a base layer including, for example, the same material as the material 111. Note that, for convenience of description, the material constituting the second transparent material layer 110 may be referred to as the material 110. An arrangement pitch, a height, and a width of the material 111 are similar to the arrangement pitch, the height, and the width of the material 161 described above, respectively.

Note that the material 110 constituting the second transparent material layer may be formed over an entire area of the first substrate 150, or may be formed only in a portion of the first substrate 150 corresponding to a display region.

For example, by not forming the material 110 in a region where the horizontal drive circuit 11 and the vertical drive circuit 12 shown in FIG. 1 are formed, it is possible to adjust a threshold of a transistor according to the characteristics of the peripheral circuit described above and the like. In addition, a material having a high refractive index generally has large stress, which may cause a film to be peeled off. However, by forming the material 110 only in a specific region, stress can be suppressed overall.

The material 110 having the third refractive index and the material 111 having the fourth refractive index are selected to satisfy the condition that the fourth refractive index is smaller than the third refractive index. Here, the material 110 having the third refractive index is a silicon nitride, and the material 111 having the fourth refractive index is a silicon oxide. The second transparent material layer 110 including the silicon nitride is formed between the wiring layer 120 and the support substrate 101.

Note that polarizing films (not illustrated) are disposed on the first substrate 150 and the second substrate 100 to have a crossed Nicols or parallel Nicols relationship depending on the specifications of the liquid crystal display device 1.

The liquid crystal material layer 140 is sandwiched between the second substrate 100 and the first substrate 150. An initial alignment direction of liquid crystal molecules 141 of the liquid crystal material layer 140 is set by the alignment films 133 and 172. In a state where no electric field is applied to the liquid crystal material layer 140, the liquid crystal molecules 141 are aligned in a substantially vertical direction with a predetermined tilt angle. The liquid crystal display device 1 is a liquid crystal display device in a so-called vertical alignment type (VA mode).

The basic configuration of the liquid crystal display device 1 has been described above. Next, convergence of light transmitted through liquid crystal display device 1 will be described. For convenience of description, a planar shape of a light shielding region in the liquid crystal display device 1 will be described first.

Figure 4:
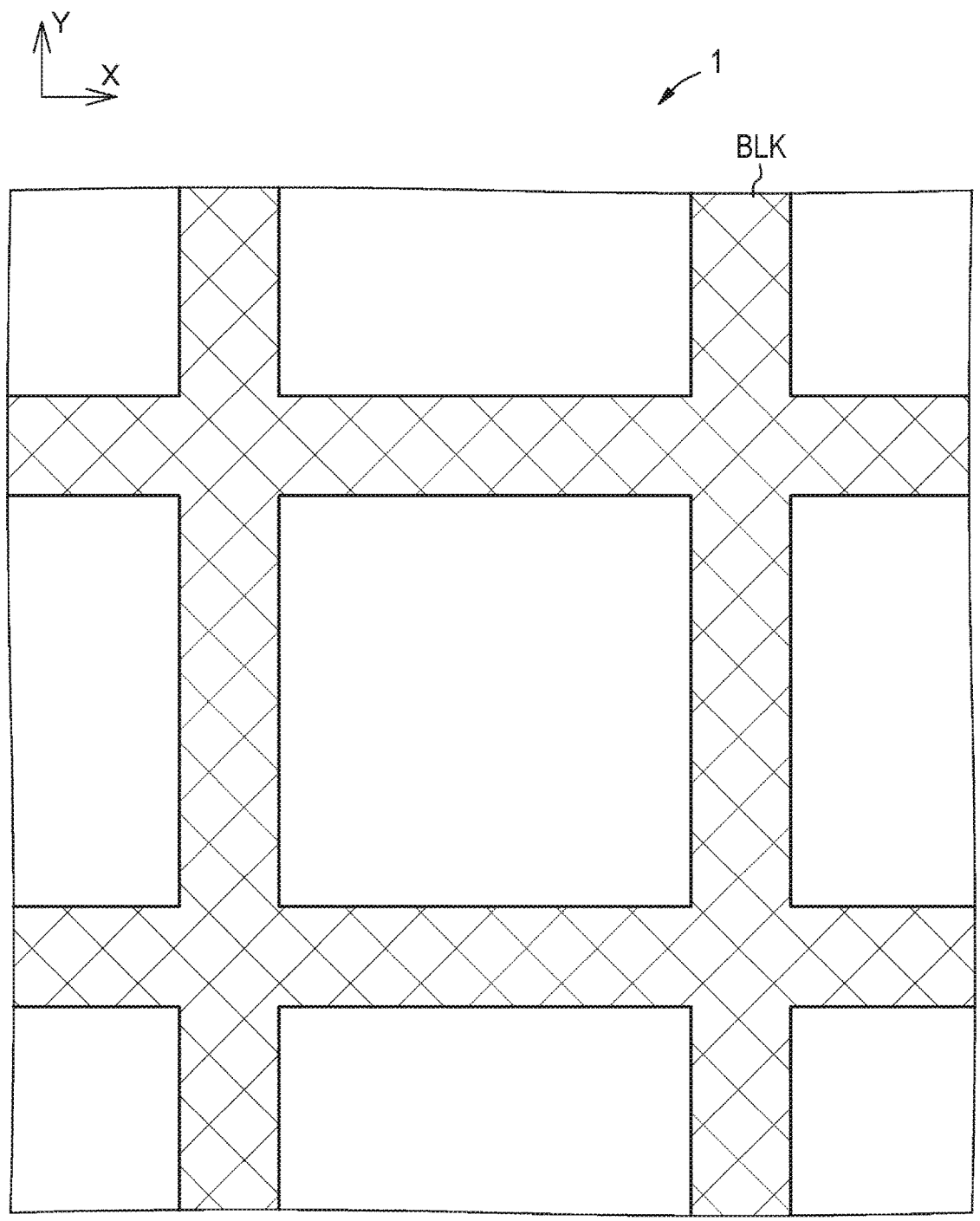
FIG. 4 is a partial schematic plan view of the liquid crystal display device for explaining a planar shape of a light shielding region in the liquid crystal display device according to the first embodiment.

FIG. 4 is a partial schematic plan view of the liquid crystal display device for explaining the planar shape of the light shielding region in the liquid crystal display device according to the first embodiment.

A light shielding region, which does not allow light to be transmitted therethrough, is formed in the liquid crystal display device 1 by the wiring 121, the wirings 123, or the like shown in FIG. 3. The various wirings are basically arranged to be positioned between a pixel electrode 131 and another pixel electrode 131. Therefore, the light shielding region BLK of the liquid crystal display device 1 is a lattice-like region indicated by the hatching in FIG. 4. Basically, the material 161 having the second refractive index different from the first refractive index is disposed in a portion of the first transparent material layer 160 corresponding to the light shielding region BLK. Similarly, the material 111 having the fourth refractive index different from the third refractive index is disposed in a portion of the second transparent material layer 110 corresponding to the light shielding region BLK.

The planar shape of the light shielding region has been described above. Next, convergence of light by the first transparent material layer will be described.

Figure 5:
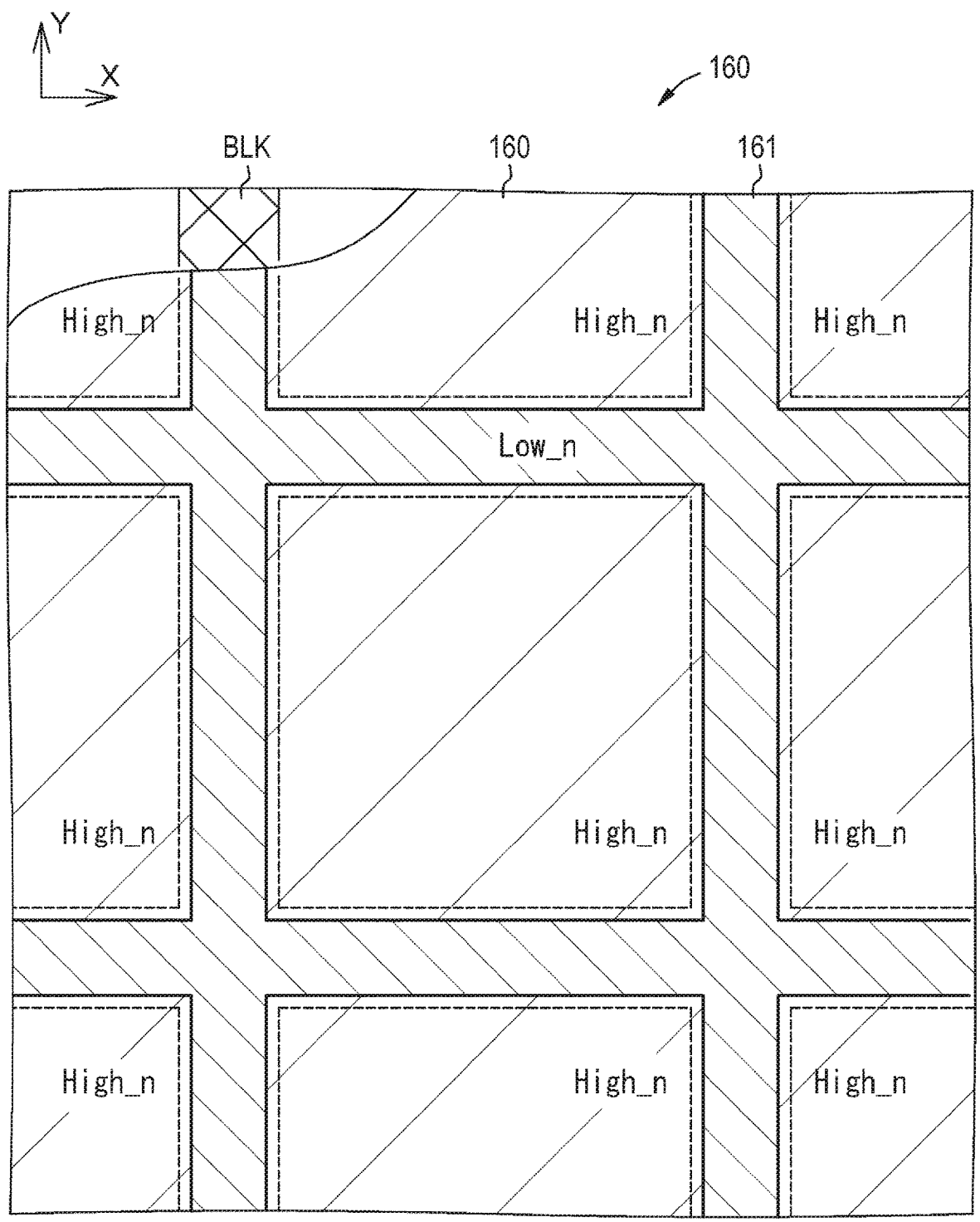
FIG. 5 is a schematic cross-sectional view of a portion taken along line A-A of FIG. 3.
Figure 6:
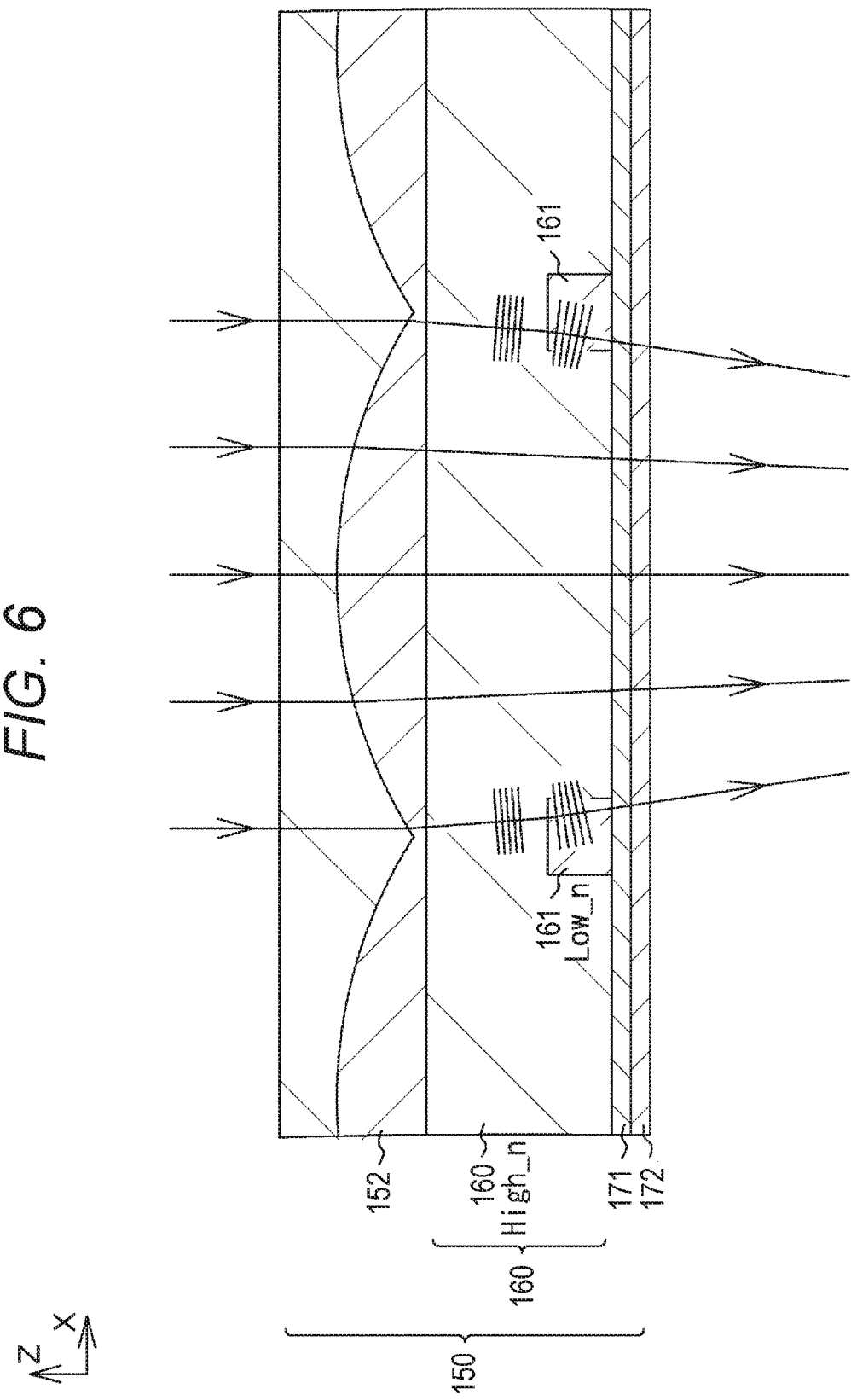
FIG. 6 is a partial schematic cross-sectional view of a substrate, etc. for explaining how light transmitted through the first substrate converges.

FIG. 5 is a schematic cross-sectional view of a portion taken along line A-A of FIG. 3. FIG. 6 is a partial schematic cross-sectional view of a substrate, etc. for explaining how light transmitted through the first substrate converges.

As shown in FIG. 5, in the cross section taken along the line A-A, the material 161 having the second refractive index is arranged in the form of a lattice. Then, the material 160 constituting the first transparent material layer 160 is arranged in an island shape with respect to the lattice shape formed by the material 161. As shown in FIG. 6, a direction of light incident on the first substrate 150 is first changed by the microlens 152 to propagate in a convergent direction. The direction of the light incident on the first transparent material layer 160 is changed to propagate in a more convergent direction near a boundary between the material 160 and the material 161 because the light propagates relatively fast in the material 161 having a relatively small refractive index. In other words, the first transparent material layer 160 in which the material 161 is embedded optically functions similarly to a convex lens.

Figure 7:
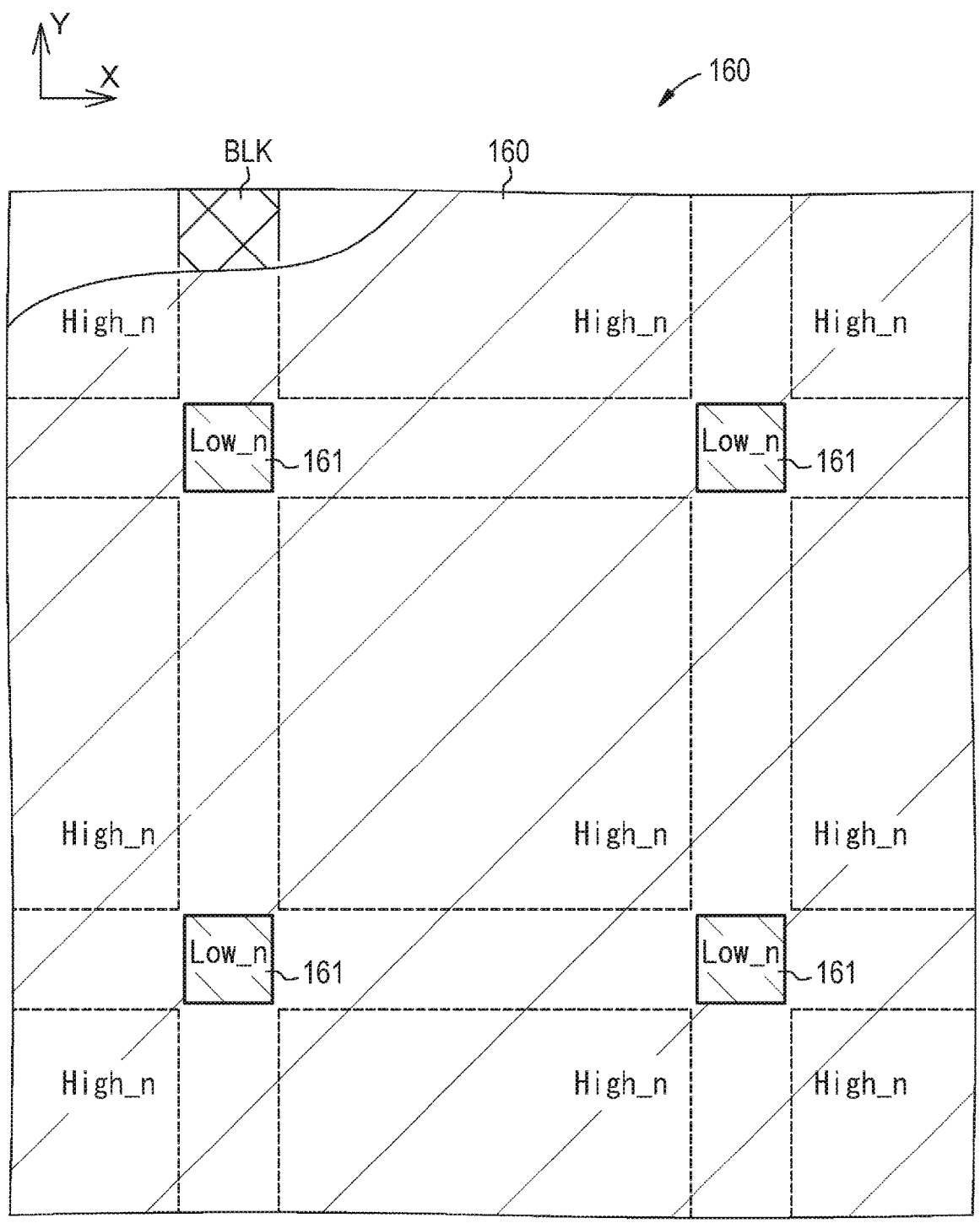
FIG. 7 is a schematic cross-sectional view for explaining another example of the portion taken along the line A-A of FIG. 3.
Figure 8:
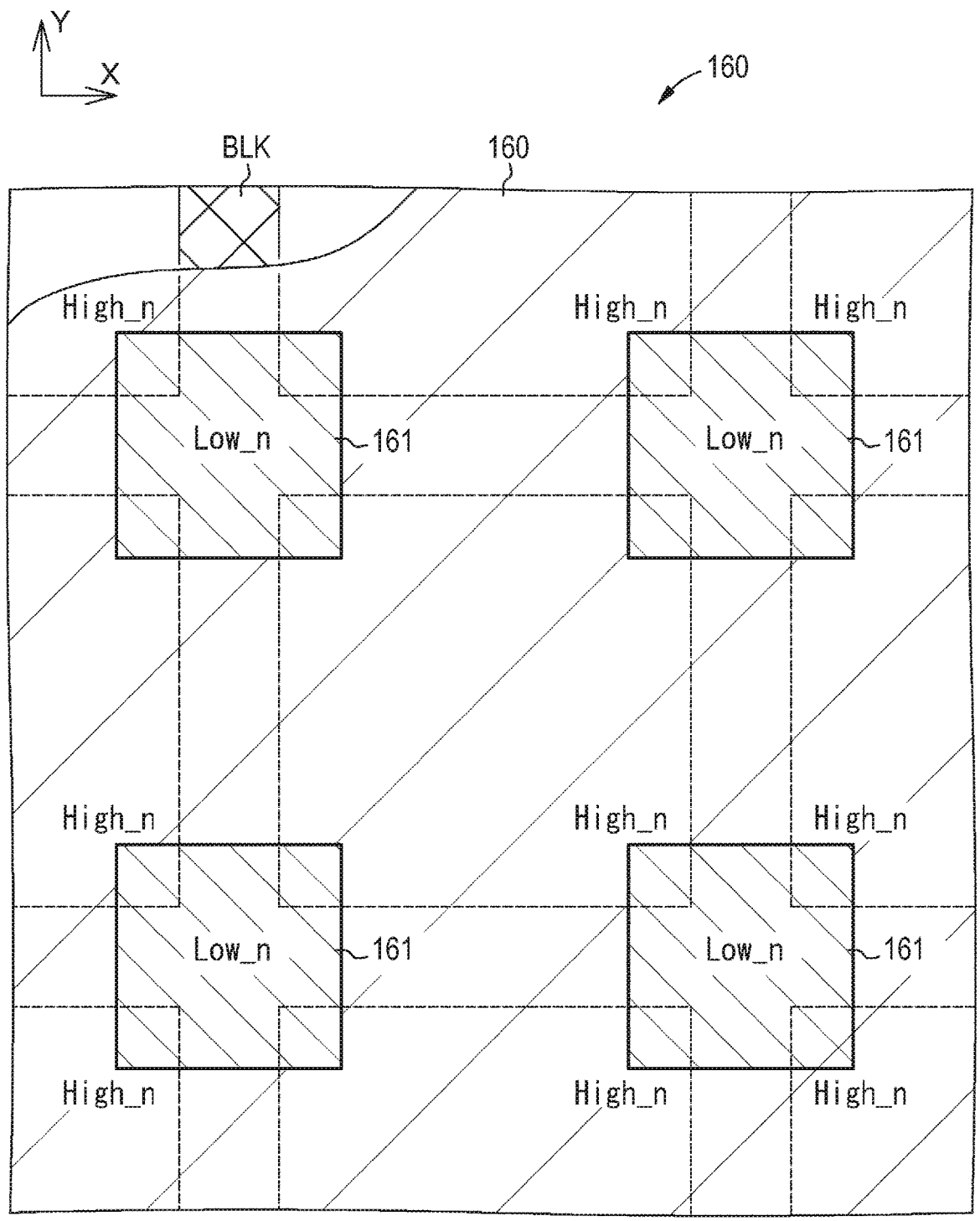
FIG. 8 is a schematic cross-sectional view for explaining another example of the portion taken along the line A-A of FIG. 3, following FIG. 7.

Note that it has been described above that the material 161 is arranged in the form of a lattice in the cross section of the portion taken along the line A-A, but this is merely exemplary. For example, even in a configuration in which the material 161 is discretely arranged in a portion corresponding to the light shielding region BLK, a certain degree of effect can be obtained. The same applies to the material 111 in the second transparent material layer 110. FIGS. 7 and 8 are schematic cross-sectional views for explaining other examples of the portion taken along the line A-A of FIG. 3. They illustrate examples in which the material 161 is arranged at an intersection portion of the light shielding region BLK. FIG. 7 illustrates an example in which a region where the material 161 is arranged falls within the light shielding region BLK. FIG. 8 illustrates an example in which a part of the region where the material 161 is disposed beyond the light shielding region BLK.

The convergence of light by the first transparent material layer has been described above. Next, convergence of light by the second transparent material layer will be described.

Figure 9:
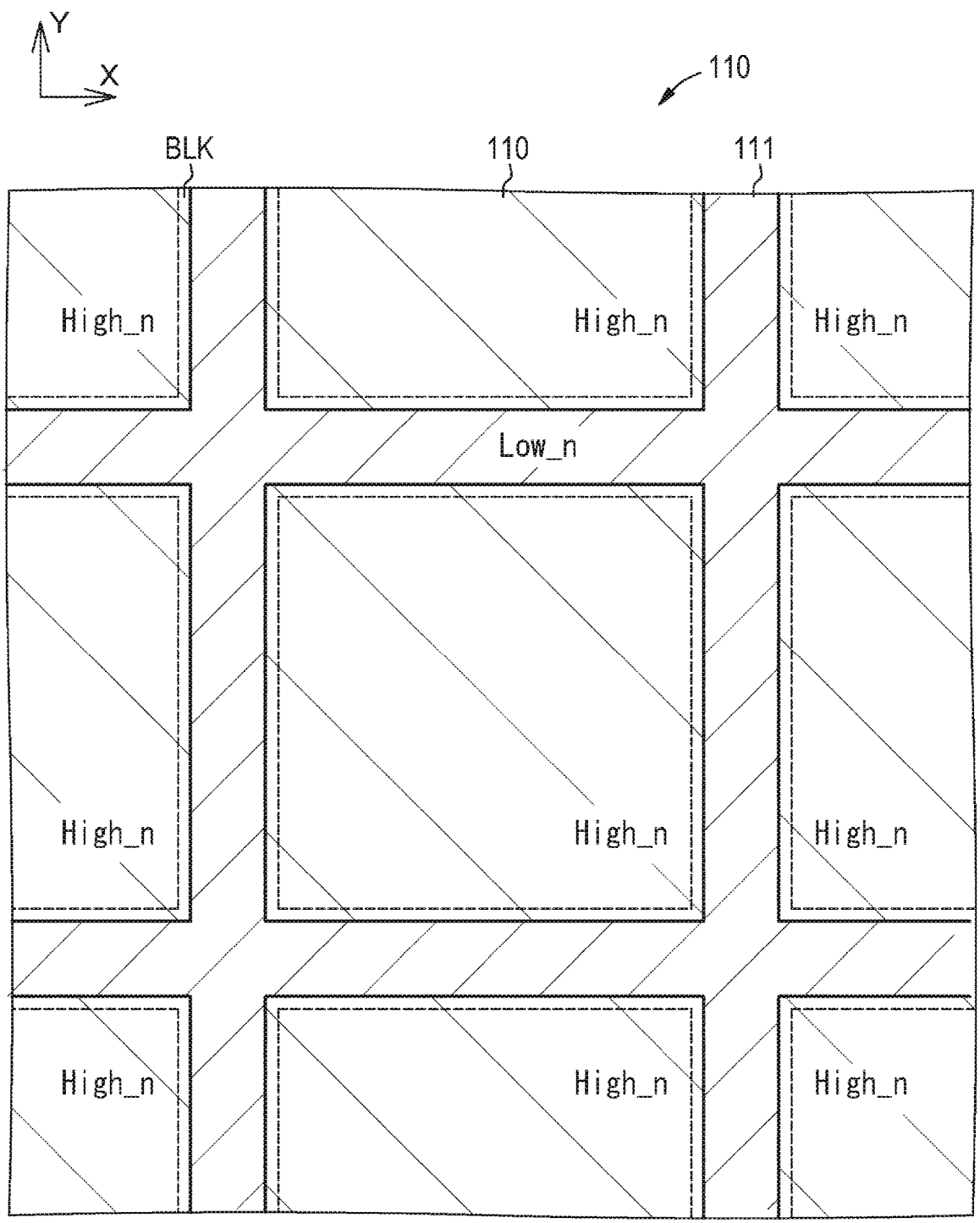
FIG. 9 is a schematic cross-sectional view of a portion taken along line B-B of FIG. 3.
Figure 10:
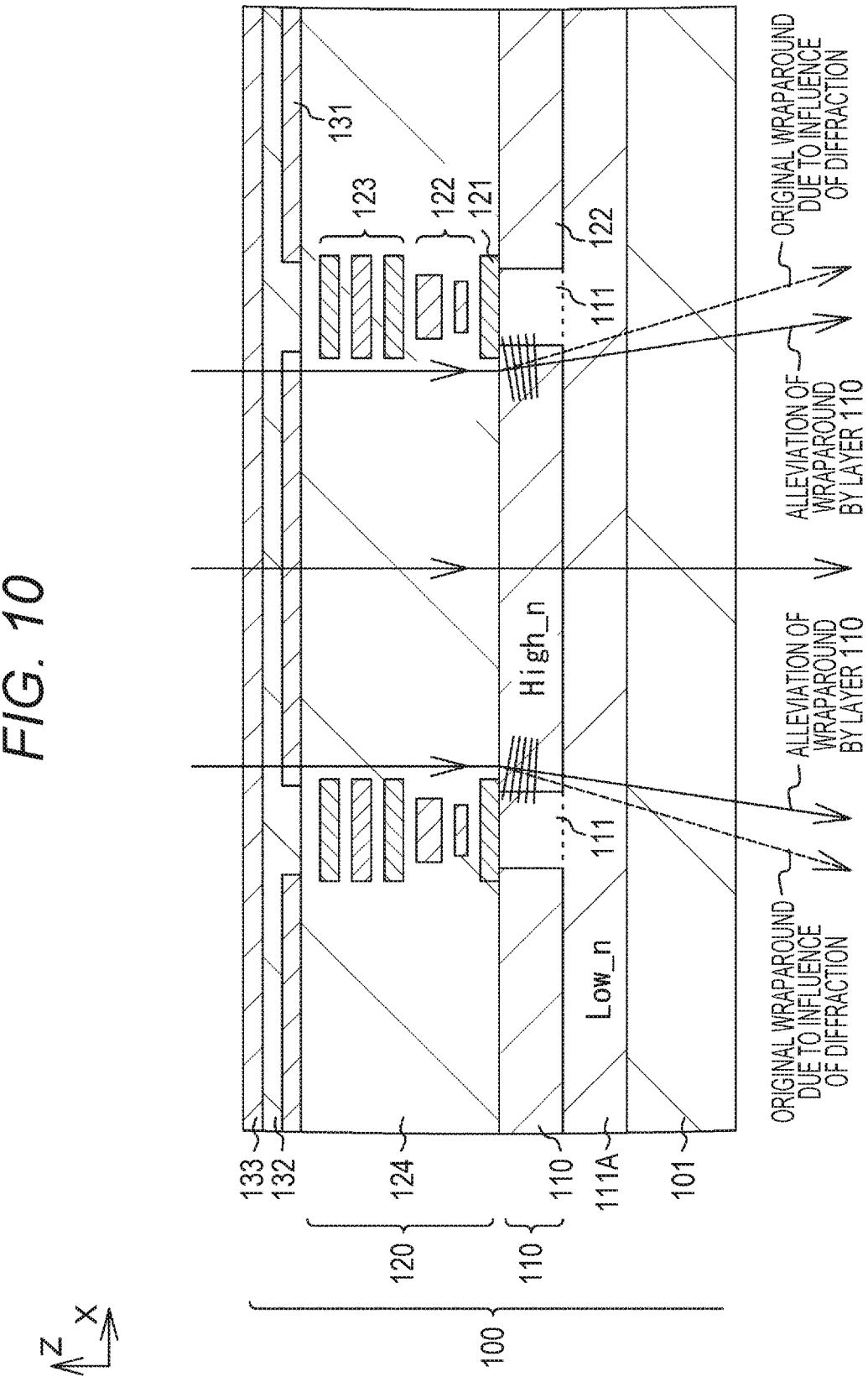
FIG. 10 is a partial schematic cross-sectional view of a substrate, etc. for explaining how light transmitted through the second substrate converges.

FIG. 9 is a schematic cross-sectional view of a portion taken along line B-B of FIG. 3. FIG. 10 is a partial schematic cross-sectional view of a substrate, etc. for explaining how light transmitted through the second substrate converges.

As shown in FIG. 9, in the cross section taken along the line B-B, the material 111 having the fourth refractive index is arranged in the form of a lattice. Then, the material 110 constituting the second transparent material layer 110 is arranged in an island shape with respect to the lattice shape formed by the material 111. As shown in FIG. 10, the light incident on the second substrate 100 through the liquid crystal material layer 140 is diffracted by the wiring or the like of the wiring layer 120, and a direction of the light is changed to propagate in a divergent direction. At this time, the light incident near a boundary between the material 110 and the material 111 propagates relatively fast in the material 111 having a relatively small refractive index, and thus, wraparound due to the diffraction is alleviated. In other words, the second transparent material layer 110 in which the material 111 is embedded optically functions similarly to a convex lens.

The convergence of light by the second transparent material layer has been described above.

In the liquid crystal display device 1, the light convergence effect is enhanced by the microlens 152 and the first transparent material layer 160 in which the material 161 is embedded, without stacking a plurality of microlenses having a three-dimensional shape. In addition, the wraparound due to the diffraction by the wiring or the like is alleviated by the second transparent material layer 110. In this way, the liquid crystal display device 1 is capable of improving light utilization efficiency, without stacking a plurality of microlenses having a three-dimensional shape.

Figure 11:
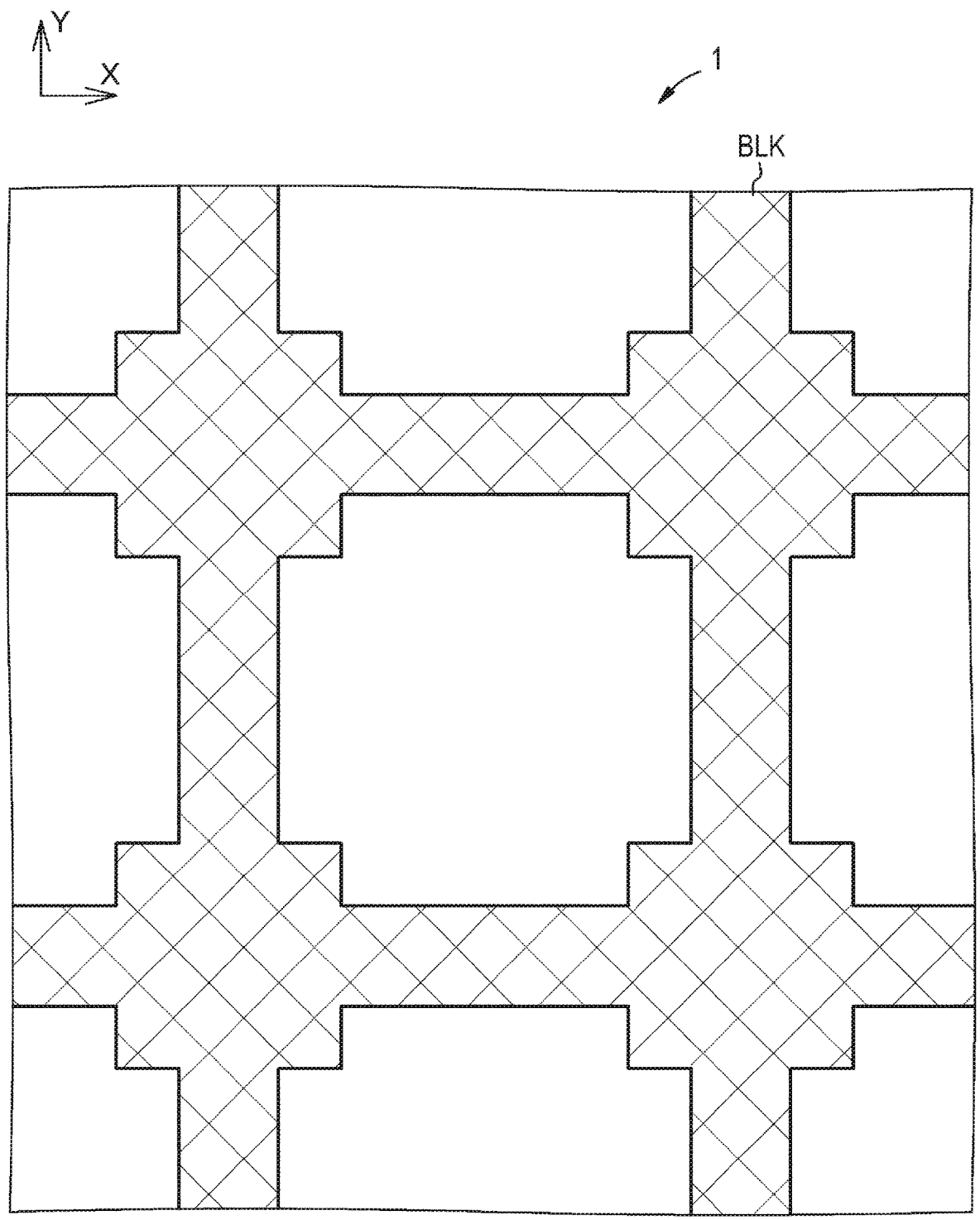
FIG. 11 is a partial schematic plan view of the liquid crystal display device for explaining a modification of the planar shape of the light shielding region in the liquid crystal display device according to the first embodiment.
Figure 12:
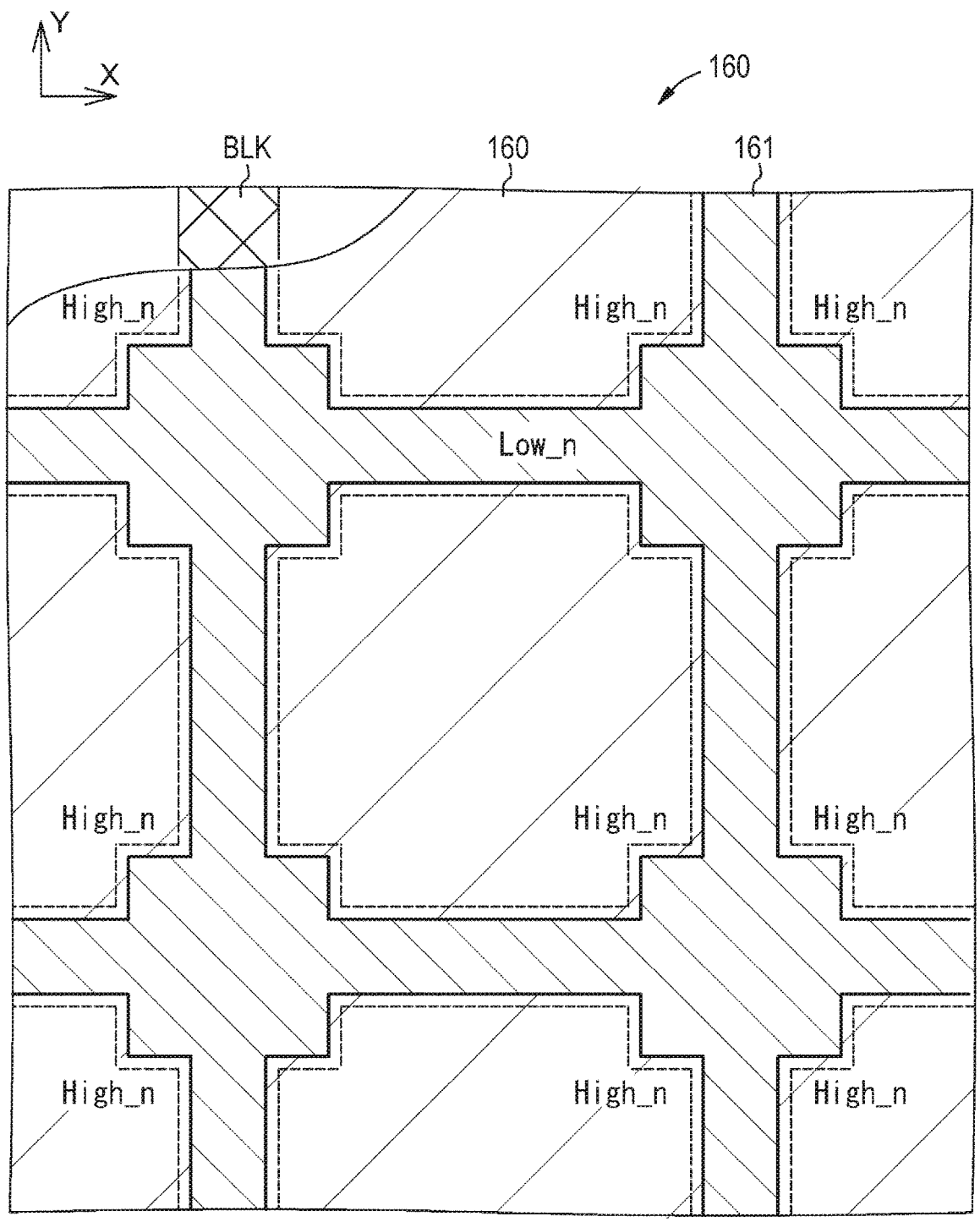
FIG. 12 is a schematic cross-sectional view of the portion taken along the line A-A of FIG. 3, showing an example corresponding to the light shielding region shown in FIG. 11.
Figure 13:
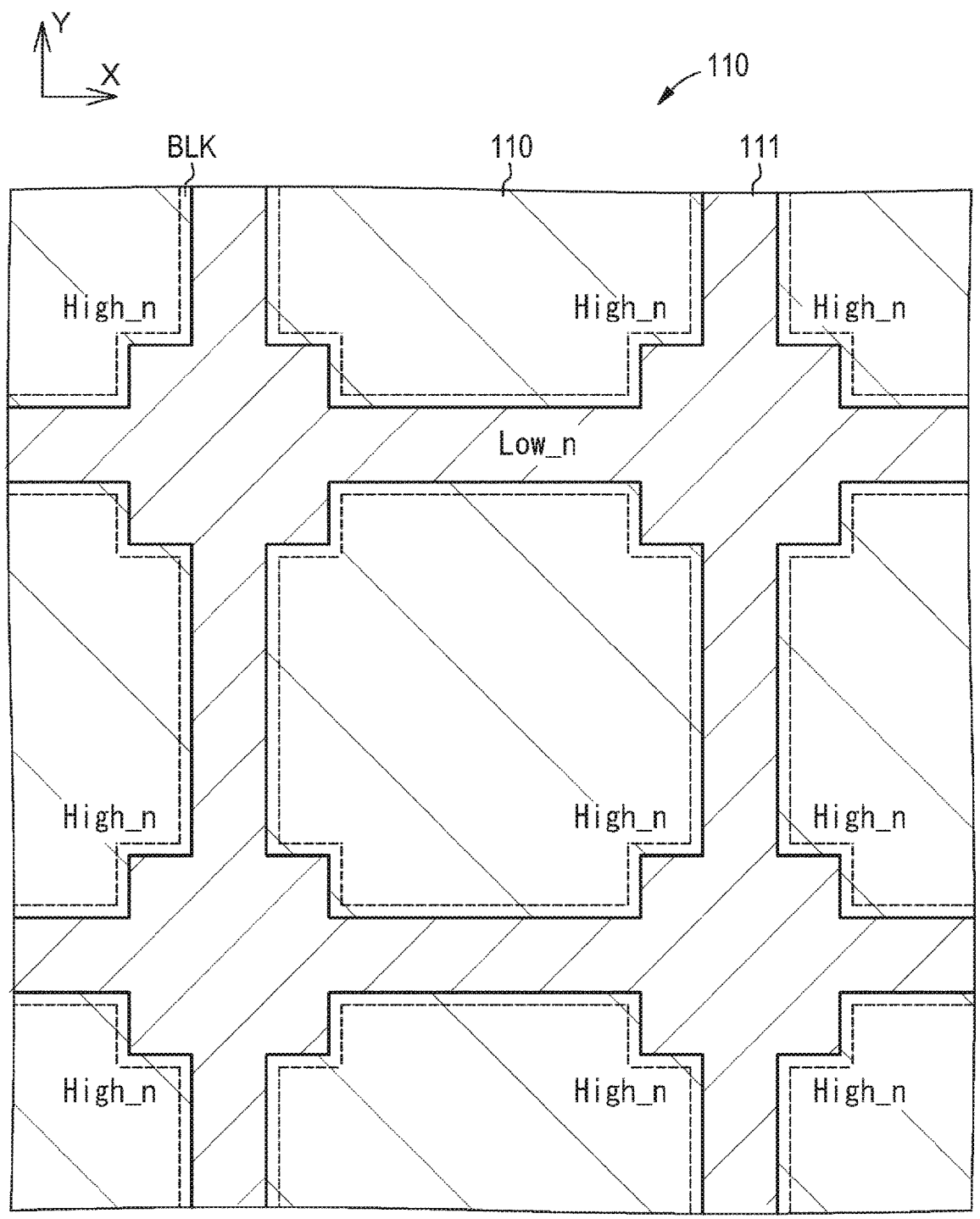
FIG. 13 is a schematic cross-sectional view of the portion taken along the line B-B of FIG. 3, showing an example corresponding to the light shielding region shown in FIG. 11.
Figure 14A:
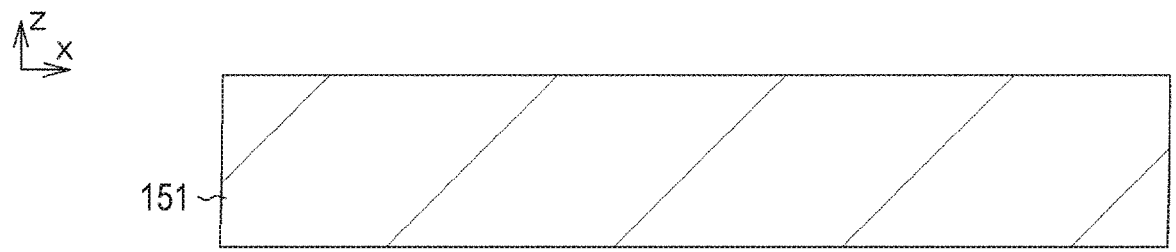
FIGS. 14A and 14B are partial schematic cross-sectional views of substrates, etc. for explaining a method for manufacturing the display device according to the first embodiment.
Figure 14B:
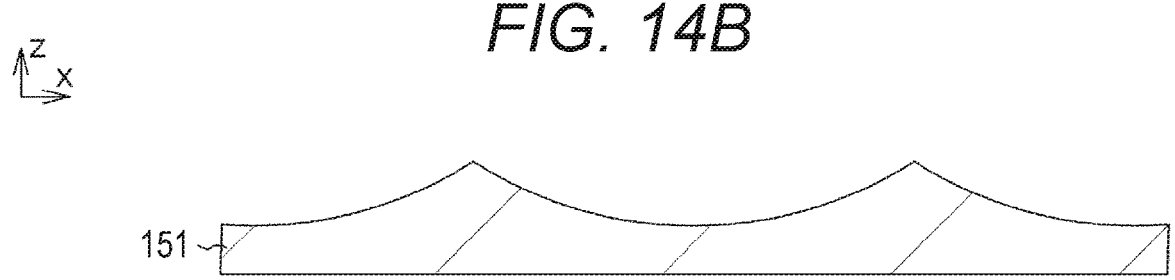

Note that, since the planar shape of the light shielding region is determined by the arrangement and shape of wiring and the like, the light shielding region does not necessarily have a simple lattice shape. For example, as shown in FIG. 11, the light shielding region may widen at an intersection portion of the lattice. In such a case, it is only required that the material 161 having the second refractive index in the first transparent material layer 160 be arranged to widen at an intersection portion of the lattice. Specifically, the material 161 may be embedded in the first transparent material layer 160 so that the portion taken along the line A-A of FIG. 3 has a cross section as shown in FIG. 12. Similarly, it is only required that the material 111 having the fourth refractive index in the second transparent material layer 110 be arranged to widen at an intersection portion of the lattice. Specifically, the material 111 may be embedded in the second transparent material layer 110 so that the portion taken along the line B-B of FIG. 3 has a cross section as shown in FIG. 13.

Next, a method for manufacturing the liquid crystal display device 1 according to the first embodiment will be described.

FIGS. 14A, 14B, 15A, 15B, 16A, 16B, 17A, 17B, 18A, 18B, 18C, 19A, 19B, 19C, 20A, and 20B are partial schematic cross-sectional views of substrates, etc. for explaining the method for manufacturing the display device according to the first embodiment.

[Process-100] (See FIGS. 14A, 14B, and 15A) First, a process of manufacturing a first substrate 150 will be described. A support substrate 151 is prepared (see FIG. 14A), and an outer shape for a microlens is formed thereon using a known etching technique or the like (see FIG. 14B). Subsequently, a material 152 having a higher refractive index than the support substrate 151 is formed thereon, and then planarized to form a microlens 152 (see FIG. 15A).

[Process-110] (See FIGS. 15B, 16A, 16B, and 17A)

Subsequently, a first transparent material layer 160 in which a material 161 having a second refractive index is embedded is formed on the microlens 152. First, a layer including a material 160 having a first refractive index is formed on the microlens 152 (see FIG. 15B). Subsequently, an opening OP is formed in a portion corresponding to a region between a pixel electrode 131 and another pixel electrode 131 (see FIG. 16A). Thereafter, a layer including a material 161 having a second refractive index is formed on an entire surface (see FIG. 16B). Subsequently, planarization is performed to obtain a first transparent material layer 160 in which the material 161 is embedded in the opening OP (see FIG. 17A). Note that, although it is illustrated that the material 161 remains only in the opening OP, the material 161 may remain at a predetermined thickness on an upper surface of the material 160 after the planarization.

Figure 17A:
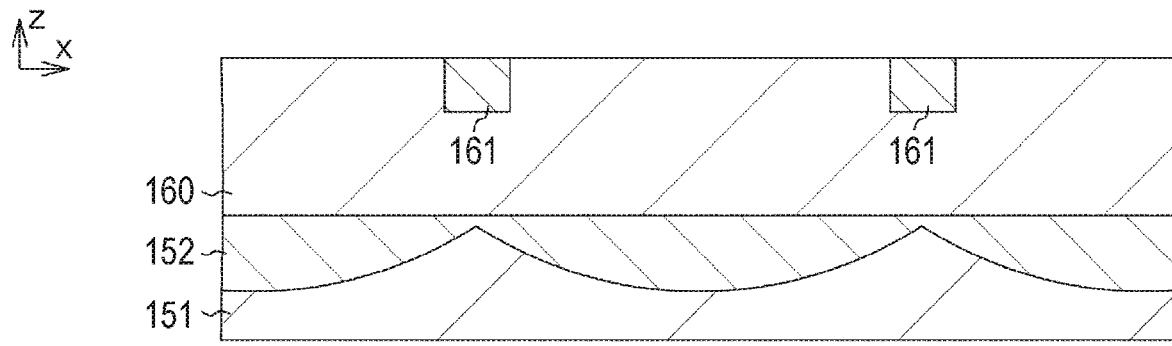
FIGS. 17A and 17B are partial schematic cross-sectional views of substrates, etc. for explaining the method for manufacturing the display device according to the first embodiment, following FIG. 16B.
Figure 17B:
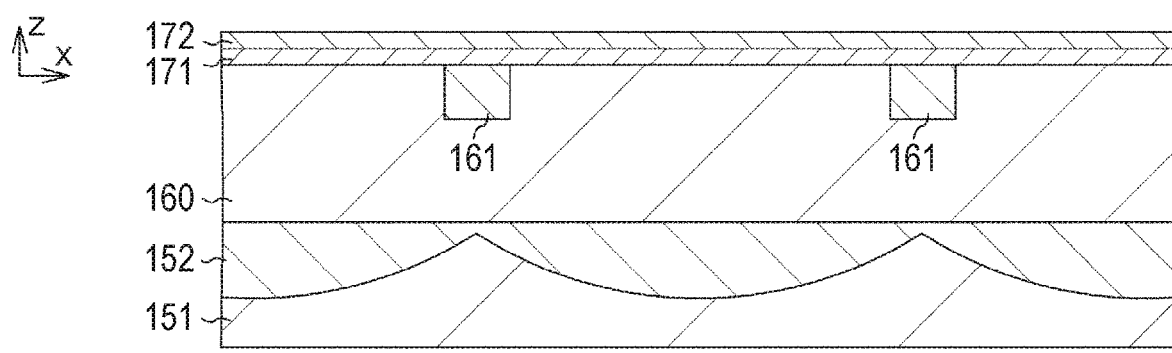
Figure 18A:
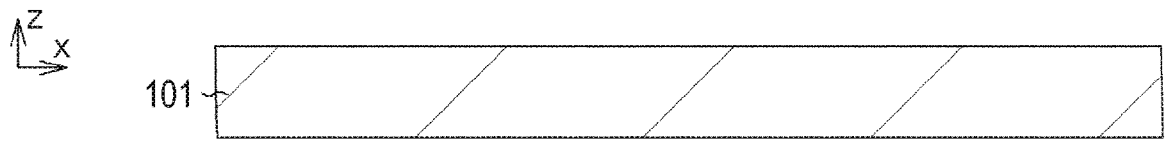
FIGS. 18A, 18B, and 18C are partial schematic cross-sectional views of substrates, etc. for explaining the method for manufacturing the display device according to the first embodiment, following FIG. 17B.
Figure 18B:
Figure 18C:
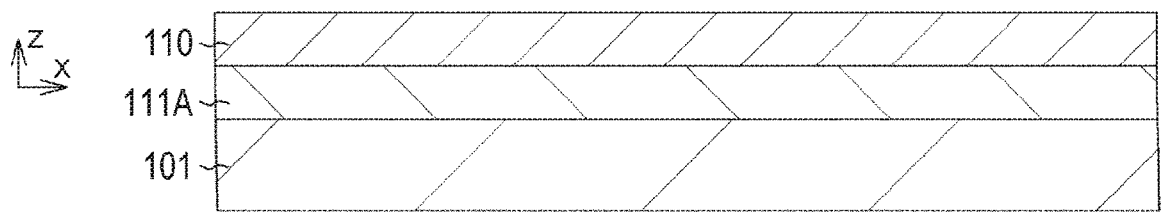

[Process-120] (see FIG. 17B)

Thereafter, a transparent common electrode 171 and an alignment film 172 are sequentially stacked on the entire surface of the first transparent material layer 160. Through the above-described processes, the first substrate 150 can be obtained.

[Process-130] (See FIGS. 18A, 18B, 18C, 19A, 19B, and 19C)

Next, a process of manufacturing the second substrate 100 will be described. A support substrate 101 is prepared (see FIG. 18A), and a second transparent material layer 110 in which a material 111 having a fourth refractive index is embedded is formed thereon. First, a base film 111A including the same material as the material 111 having the fourth refractive index is formed (see FIG. 18B). Subsequently, a layer including a material 110 having a third refractive index is formed thereon (see FIG. 18C).

Figure 19A:
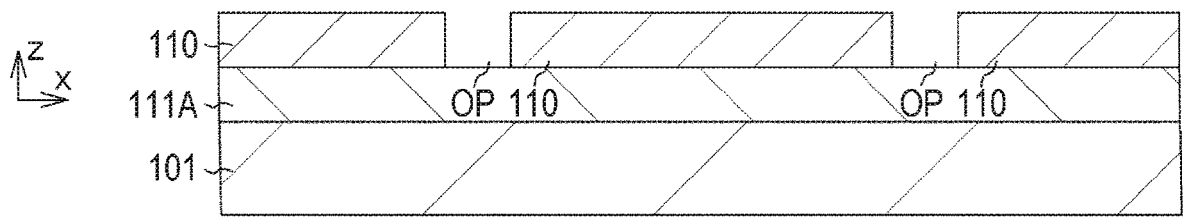
FIGS. 19A, 19B, and 19C are partial schematic cross-sectional views of substrates, etc. for explaining the method for manufacturing the display device according to the first embodiment, following FIG. 18C.
Figure 19B:
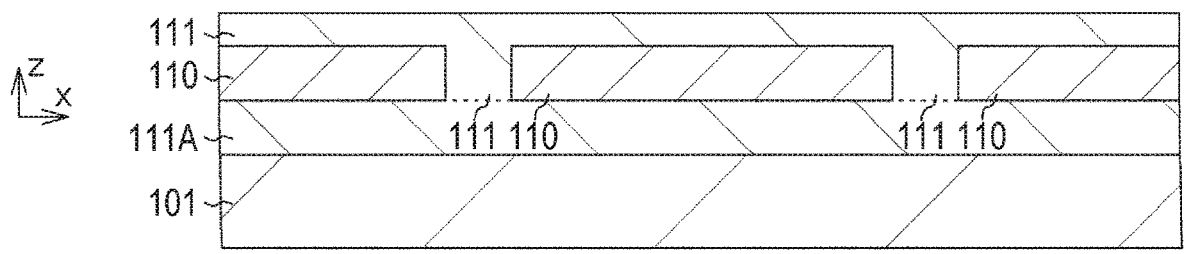
Figure 19C:
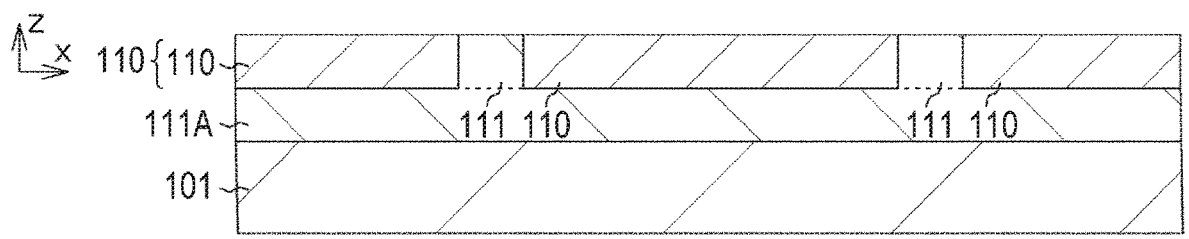

Subsequently, an opening OP is formed in a portion corresponding to a region between a pixel electrode 131 and another pixel electrode 131 of the layer including the material 110 (see FIG. 19A). Thereafter, a layer including a material 111 having a third refractive index is formed on an entire surface (see FIG. 19B). Subsequently, planarization is performed to obtain a second transparent material layer 110 in which the material 111 is embedded in the opening OP (see FIG. 19C).

Figure 20A:
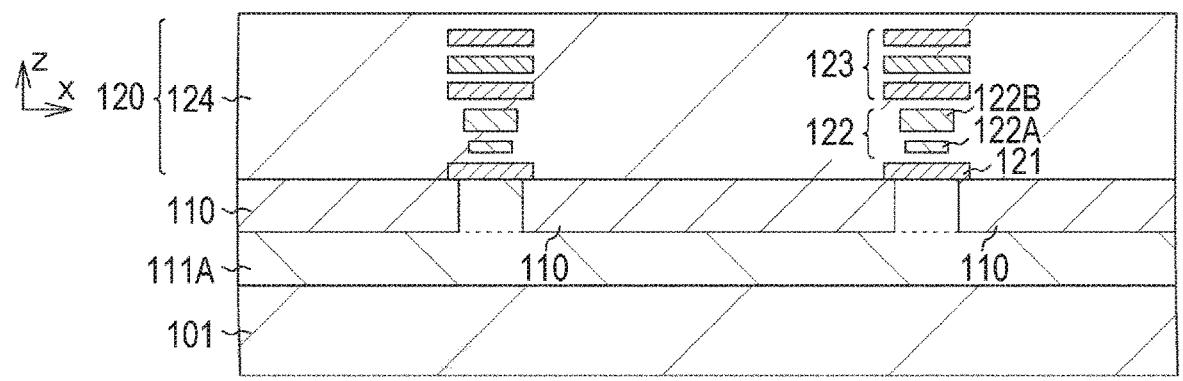
FIGS. 20A and 20B are partial schematic cross-sectional views of substrates, etc. for explaining the method for manufacturing the display device according to the first embodiment, following FIG. 19C.

[Process-140] (see FIG. 20A)

Thereafter, a wiring layer 120 is formed on the second transparent material layer 110. A wiring 121, a transistor 122 including a semiconductor material layer 122A and a gate electrode 122B, and wirings 123 can be formed by a known film formation technique, a known patterning technique, and the like. The configuration of the wiring layer 120 is not particularly limited as long as the implementation of the present disclosure is not hindered. For example, the transistor 122 can be a TFT formed by forming a semiconductor material layer on the second transparent material layer 110 and appropriately patterning the semiconductor material layer. Alternatively, the transistor 122 can be formed by a so-called SOI process.

In a case where the transistor 122 is a TFT, a high-quality oxide film may be further formed on the second transparent material layer 110, and then the wiring layer 120 may be formed on the oxide film. By forming the high-quality oxide film, it is possible to reduce an influence of hydrogen desorbed from the second transparent material layer 110 on an interface between the semiconductor material layer 122A and a gate insulating film.

Figure 20B:
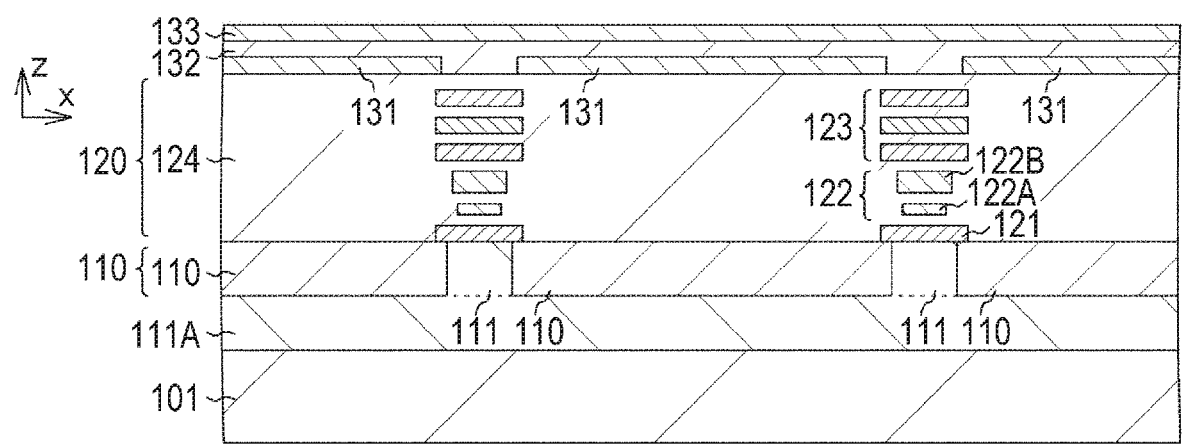

[Process-150] (see FIG. 20B)

Thereafter, a pixel electrode 131 is formed on the wiring layer 120, and subsequently, a planarization film 132 and an alignment film 133 are sequentially stacked on an entire surface. Through the above-described processes, the second substrate 100 can be obtained.

[Process-160]

Subsequently, sealing is performed in a state where the first substrate 150 and the second substrate 100 face each other with the liquid crystal material layer 140 sandwiched therebetween. As a result, the liquid crystal display device 1 shown in FIG. 3 can be obtained.

The liquid crystal display device 1 has been described above. In the liquid crystal display device 1, the light convergence effect is enhanced by the microlens 152 and the first transparent material layer 160 in which the material 161 is embedded without stacking a plurality of microlenses having a three-dimensional shape. In addition, the wraparound due to the diffraction by the wiring or the like is alleviated by the second transparent material layer 110. In this way, the liquid crystal display device 1 is capable of improving light utilization efficiency, without stacking a plurality of microlenses having a three-dimensional shape.

In addition, if a three-dimensional microlens is formed on the support 101, a crack or the like occurs during high-temperature heat treatment in a process of manufacturing a transistor after the microlens is formed, resulting in a decrease in yield. In the liquid crystal display device 1, since a flat structure, such as the second transparent material layer 110 in which the material 111 is embedded, is formed on the support 101, an occurrence of a crack caused by heat treatment can be suppressed.

Second Embodiment

A second embodiment also relates to a liquid crystal display device and an electronic device according to the present disclosure.

Figure 21:
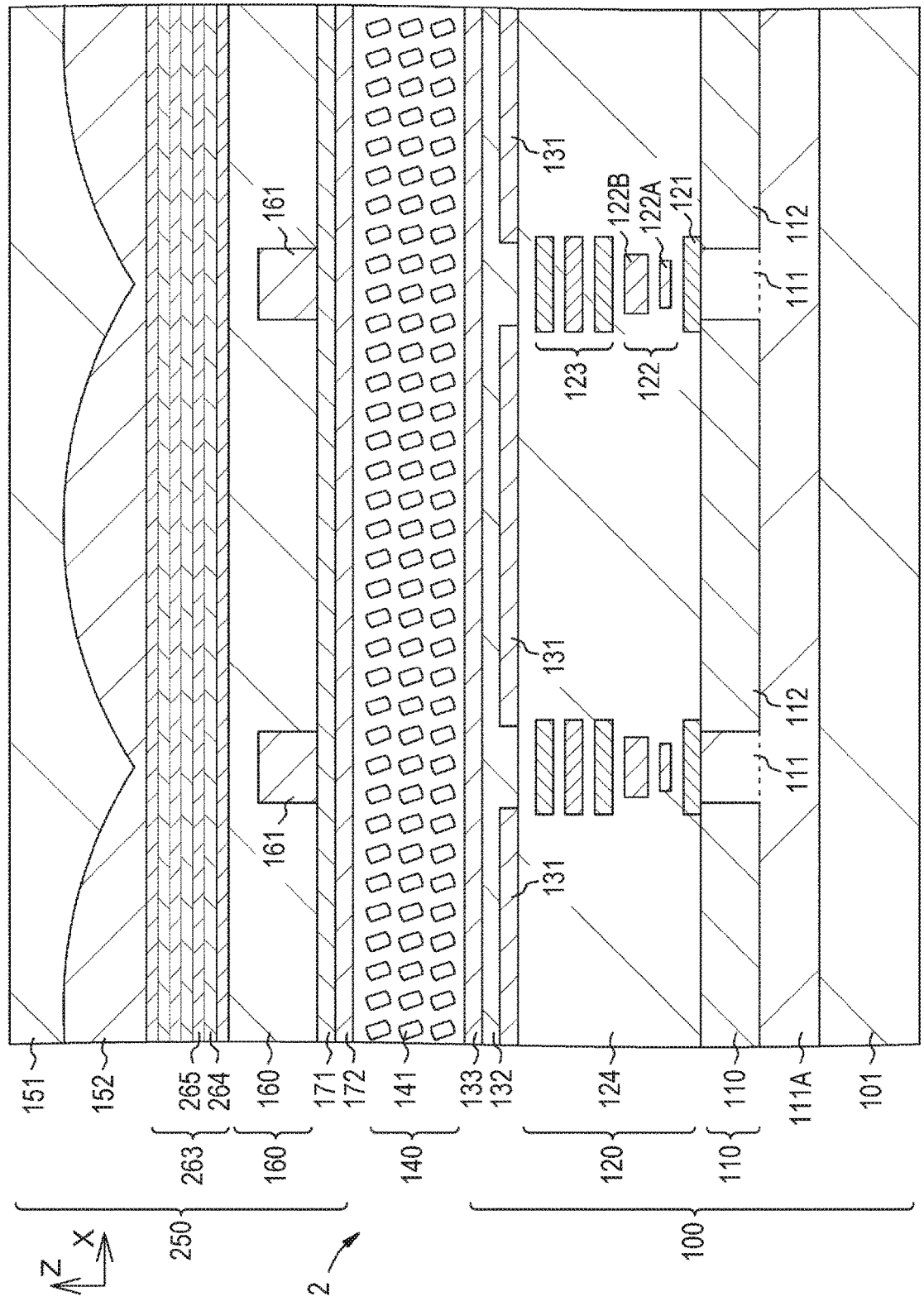
FIG. 21 is a partial schematic cross-sectional view of a substrate, etc. for explaining a liquid crystal display device according to a second embodiment.

FIG. 21 is a partial schematic cross-sectional view for explaining the liquid crystal display device according to the second embodiment. For a schematic view of the liquid crystal display device according to the second embodiment, the liquid crystal display device 1 of FIG. 1 may be replaced with a liquid crystal display device 2. For a schematic cross-sectional view for explaining the basic configuration of the liquid crystal display device, the liquid crystal display device 1 of FIG. 2A may be replaced with a liquid crystal display device 2, and the first substrate 150 of FIG. 2A may be replaced with a first substrate 250.

When compared to the liquid crystal display device 1 described in the first embodiment, the liquid crystal display device 2 further includes a multilayer laminate film 263 disposed between the microlens 152 and the first transparent material layer 160, the multilayer laminate film 263 including high refractive index material films 264 and low refractive index material films 265. The multilayer laminate film 263 includes a silicon nitride film as the high refractive index material film 264 and a silicon oxide film as the low refractive index material film 265.

A vapor deposition direction of the multilayer laminate film 263 is, for example, a normal direction of a surface on which films are formed. The multilayer laminate film 263 functions as an optical compensation element constituting a C plate. The multilayer laminate film 263 has an abnormal axis orthogonal to a plane, and does not cause retardation with respect to normal incident light. The refractive index anisotropy of the liquid crystal material layer 140 is compensated for by the multilayer laminate film 263.

Alternatively, the vapor deposition direction of the multilayer laminate film 263 may be the same inclination direction (vapor deposition direction) with respect to a normal line of a surface on which films are formed. Such a multilayer laminate film 263 has O-plate characteristics together with C-plate characteristics. Therefore, not only the refractive index anisotropy of the liquid crystal material layer 140 but also the refractive index anisotropy due to the tilt angle of the liquid crystal molecules 141 is compensated for by the multilayer laminate film 263.

Next, a method for manufacturing the liquid crystal display device 2 according to the second embodiment will be described.

Figure 22A:
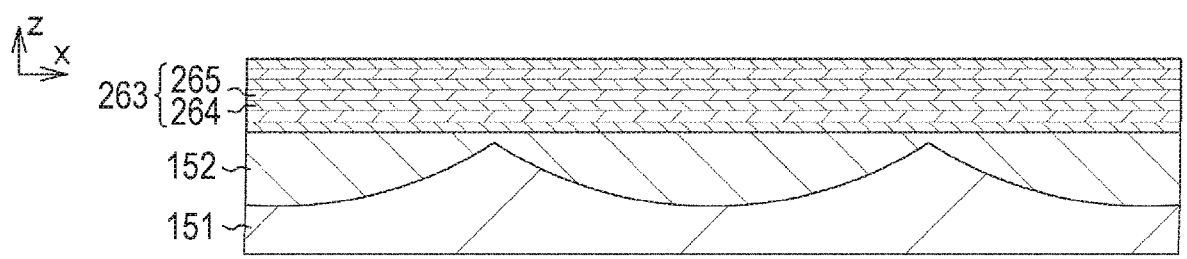
FIGS. 22A and 22B are partial schematic cross-sectional views of substrates, etc. for explaining a method for manufacturing the display device according to the second embodiment.
Figure 22B:
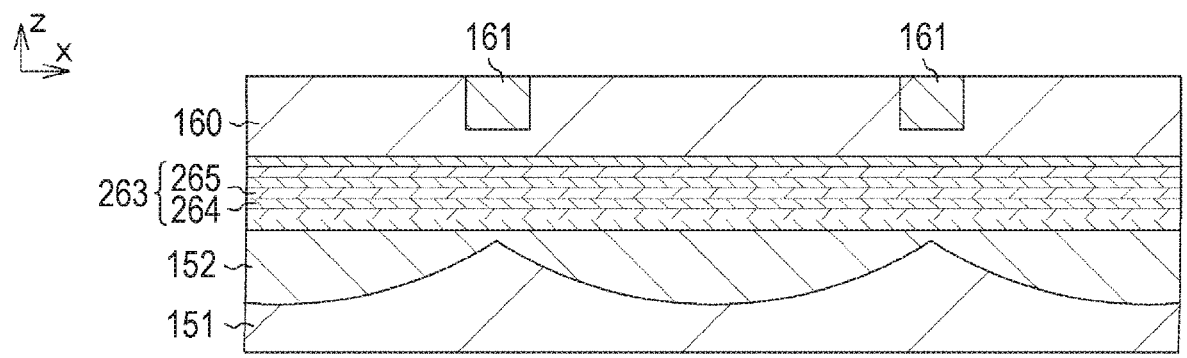

FIGS. 22A and 22B are partial schematic cross-sectional views for explaining the method for manufacturing the liquid crystal display device according to the second embodiment.

[Process-200]

Figure 15A:
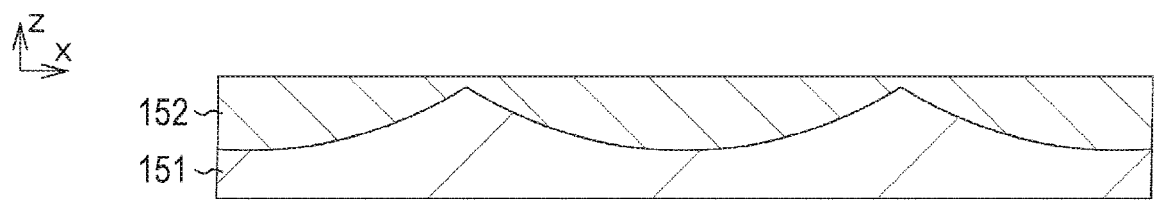
FIGS. 15A and 15B are partial schematic cross-sectional views of substrates, etc. for explaining the method for manufacturing the display device according to the first embodiment, following FIG. 14B.
Figure 15B:
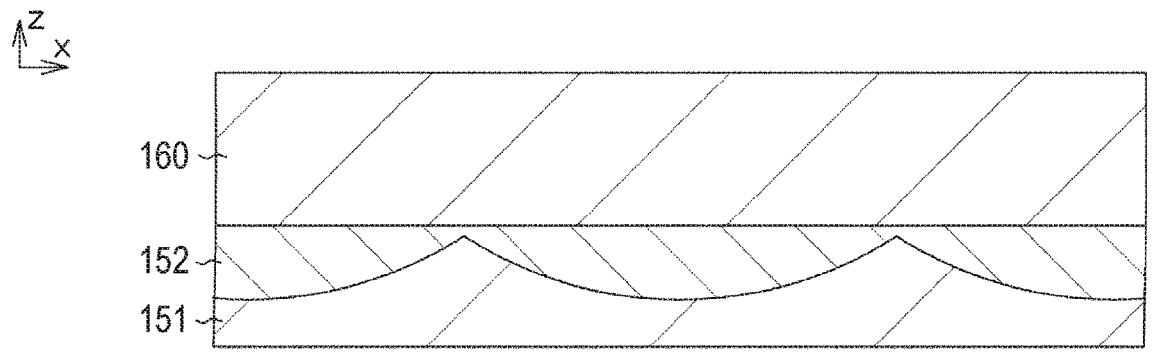

First, a process similar to [Process-100] described in the first embodiment is performed to form a microlens 152 on a support 151 (see FIG. 15A).

[Process-210] (see FIG. 22A)

Subsequently, a multilayer laminate film 263 is formed on the microlens 152. The multilayer laminate film 263 can be obtained, for example, by alternately and continuously forming high refractive index material films 264 and low refractive index material films 265 on the microlens 152 in a predetermined inclination direction by vapor deposition.

[Process-220] (see FIG. 22B)

Subsequently, a first transparent material layer 160 in which a material 161 having a second refractive index is embedded is formed on the multilayer laminate film 263. By performing a process similar to that described with reference to FIGS. 15B, 16A, 16B, and 17A in the first embodiment, the first transparent material layer 160 in which the material 161 having the second refractive index is embedded can be formed.

[Process-230]

Thereafter, a transparent common electrode 171 and an alignment film 172 are sequentially stacked on the entire surface of the first transparent material layer 160. Through the above-described processes, the first substrate 250 can be obtained.

[Process-240]

Subsequently, processes similar to [Process-130] to [Process-150] described in the first embodiment can be performed to obtain a second substrate 100. Then, a process similar to [Process-160] described in the first embodiment is performed. As a result, the liquid crystal display device 2 shown in FIG. 21 can be obtained.

In the liquid crystal display device 2 as well, the light convergence effect is enhanced by the microlens 152 and the first transparent material layer 160 in which the material 161 is embedded, without stacking a plurality of microlenses having a three-dimensional shape. In addition, the wrap-around due to the diffraction by the wiring or the like is alleviated by the second transparent material layer 110. In this way, the liquid crystal display device 2 is capable of improving light utilization efficiency, without stacking a plurality of microlenses having a three-dimensional shape. In addition, in the liquid crystal display device 2 as well, since flat structures, such as the first transparent material layer 160 in which the material 161 is embedded and the second transparent material layer 110 in which the material 111 is embedded, are stacked, an occurrence of a crack can be suppressed.

Moreover, in the liquid crystal display device 2, the multilayer laminate film functioning as an optical compensation element is included in a cell. Therefore, it is possible to increase a contrast of an image to be displayed without separately arranging an optical compensation element, and it is also possible to reduce the number of manufacturing processes and the number of parts. Furthermore, since the optical compensation element can be disposed in the liquid crystal display device, a highly reliable liquid crystal display device can be obtained.

Third Embodiment

A third embodiment also relates to a liquid crystal display device and an electronic device according to the present disclosure.

Figure 23:
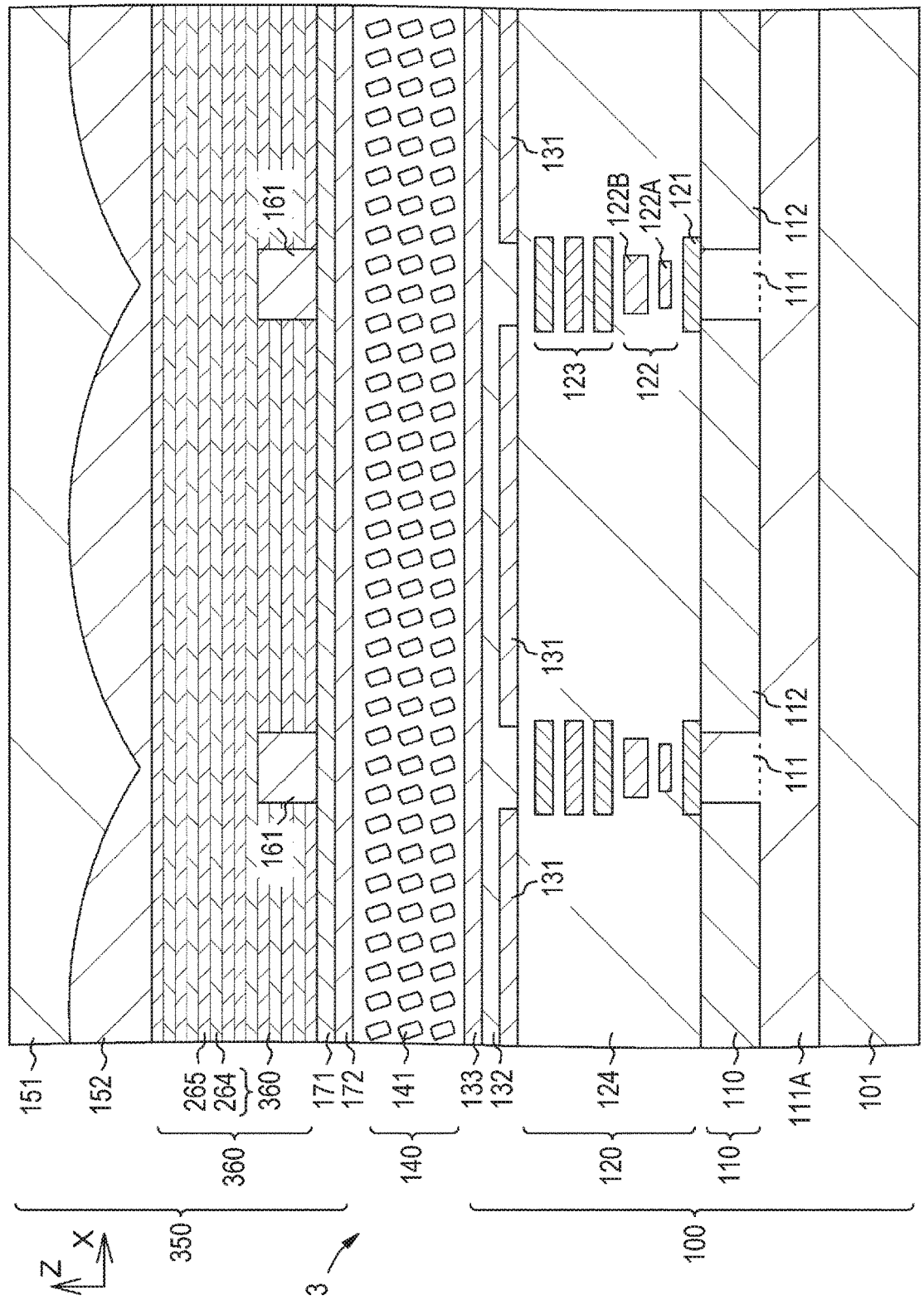
FIG. 23 is a partial schematic cross-sectional view of a substrate, etc. for explaining a liquid crystal display device according to a third embodiment.

FIG. 23 is a partial schematic cross-sectional view for explaining the liquid crystal display device according to the third embodiment. For a schematic view of the liquid crystal display device according to the third embodiment, the liquid crystal display device 1 of FIG. 1 may be replaced with a liquid crystal display device 3. For a schematic cross-sectional view for explaining the basic configuration of the liquid crystal display device, the liquid crystal display device 1 of FIG. 2A may be replaced with a liquid crystal display device 3, and the first substrate 150 of FIG. 2A may be replaced with a first substrate 350.

In the liquid crystal display device 3, a first transparent material layer 360 includes a multilayer laminate film including high refractive index material films and low refractive index material films. More specifically, the material 160 described in the first embodiment is replaced with the multilayer laminate film 360. In this case, a mean refractive index of the multilayer laminate film 360 may be a first refractive index. The configuration of the multilayer laminate film 360 is basically similar to that of the multilayer laminate film 263 described in the second embodiment.

Next, a method for manufacturing the liquid crystal display device 3 according to the third embodiment will be described.

Figure 24A:
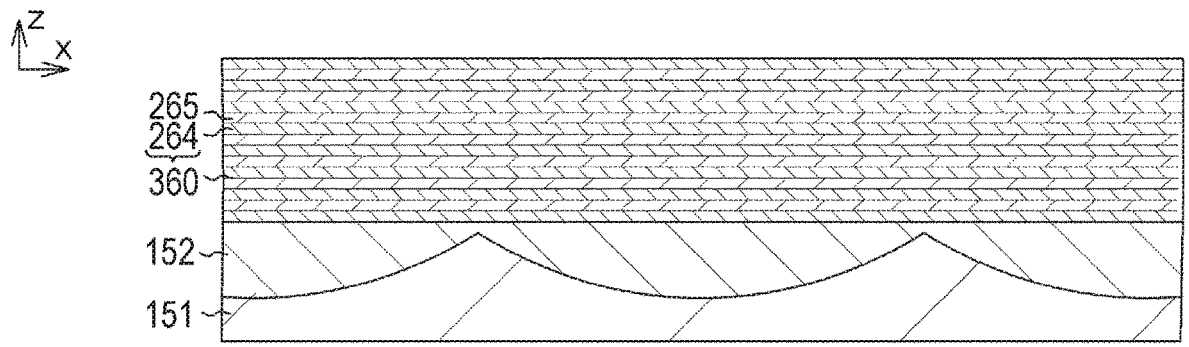
FIGS. 24A and 24B are partial schematic cross-sectional views of substrates, etc. for explaining a method for manufacturing the display device according to the third embodiment.
Figure 24B:
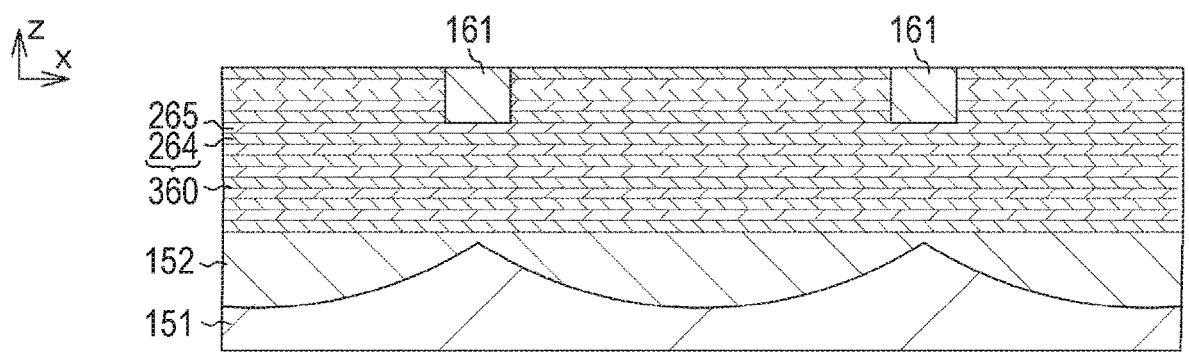

FIGS. 24A and 24B are partial schematic cross-sectional views for explaining the method for manufacturing the liquid crystal display device according to the third embodiment.

[Process-300]

First, a process similar to [Process-100] described in the first embodiment is performed to form a microlens 152 on a support substrate 151 (see FIG. 15A).

[Process-310] (see FIGS. 24A and 24B)

Subsequently, a first transparent material layer 360 in which a material 161 having a second refractive index is embedded is formed on the microlens 152. First, a multilayer laminate film 360 constituting the first transparent material layer is formed on the microlens 152 (see FIG. 24A). The multilayer laminate film 360 can be obtained, for example, by alternately and continuously forming high refractive index material films 264 and low refractive index material films 265 on the microlens 152 in a predetermined inclination direction by vapor deposition.

Figure 16A:
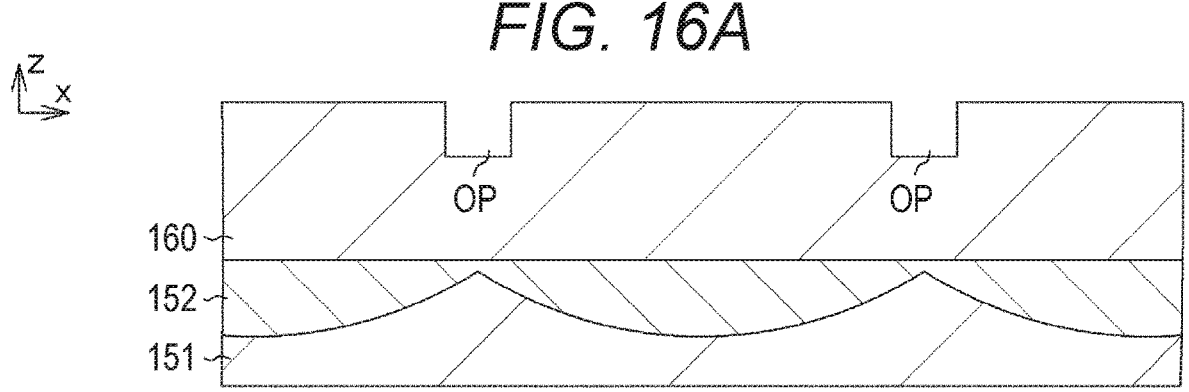
FIGS. 16A and 16B are partial schematic cross-sectional views of substrates, etc. for explaining the method for manufacturing the display device according to the first embodiment, following FIG. 15B.
Figure 16B:
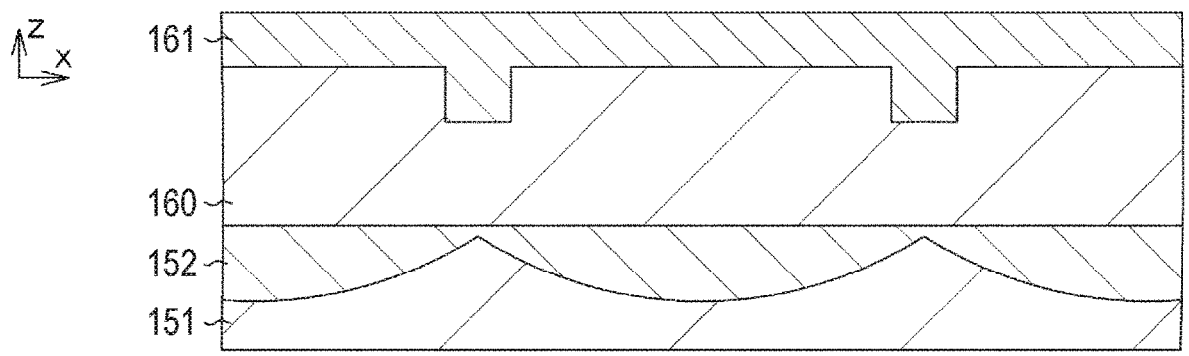

Subsequently, by performing a process similar to that described with reference to FIGS. 16A, 16B, and 17A in the first embodiment, the first transparent material layer 360 in which the material 161 having the second refractive index is embedded can be formed (see FIG. 24B).

[Process-320]

Thereafter, a transparent common electrode 171 and an alignment film 172 are sequentially stacked on the entire surface of the first transparent material layer 360. Through the above-described processes, the first substrate 350 can be obtained.

[Process-330]

Subsequently, processes similar to [Process-130] to [Process-150] described in the first embodiment can be performed to obtain a second substrate 100. Then, a process similar to [Process-160] described in the first embodiment is performed. As a result, the liquid crystal display device 3 shown in FIG. 23 can be obtained.

In the liquid crystal display device 3 as well, the light convergence effect is enhanced by the microlens 152 and the first transparent material layer 360 in which the material 161 is embedded, without stacking a plurality of microlenses having a three-dimensional shape. In addition, the wraparound due to the diffraction by the wiring or the like is alleviated by the second transparent material layer 110. In this way, the liquid crystal display device 3 is also capable of improving light utilization efficiency, without stacking a plurality of microlenses having a three-dimensional shape. In addition, in the liquid crystal display device 3 as well, since flat structures, such as the first transparent material layer 360 in which the material 161 is embedded and the second transparent material layer 110 in which the material 111 is embedded, are stacked, an occurrence of a crack can be suppressed.

In addition, in the liquid crystal display device 3 as well, the multilayer laminate film functioning as an optical compensation element is included in a cell. Therefore, it is possible to increase a contrast of an image to be displayed without separately arranging an optical compensation element, and it is also possible to reduce the number of manufacturing processes and the number of parts. Furthermore, since the optical compensation element can be disposed in the liquid crystal display device, a highly reliable liquid crystal display device can be obtained.

Fourth Embodiment

A fourth embodiment also relates to a liquid crystal display device and an electronic device according to the present disclosure.

Figure 25:
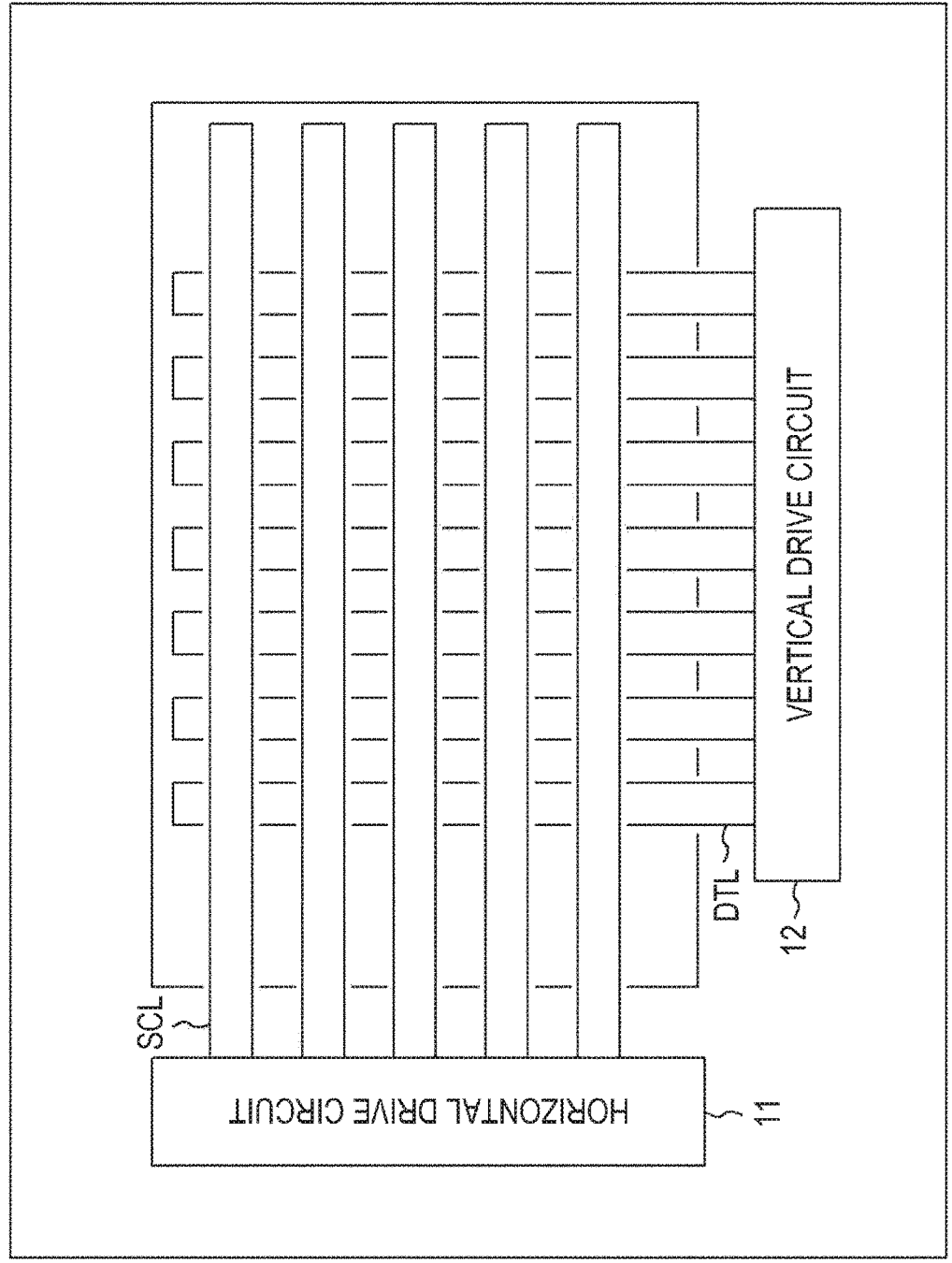
FIG. 25 is a partial schematic cross-sectional view for explaining a liquid crystal display device according to a fourth embodiment.
Figure 26:
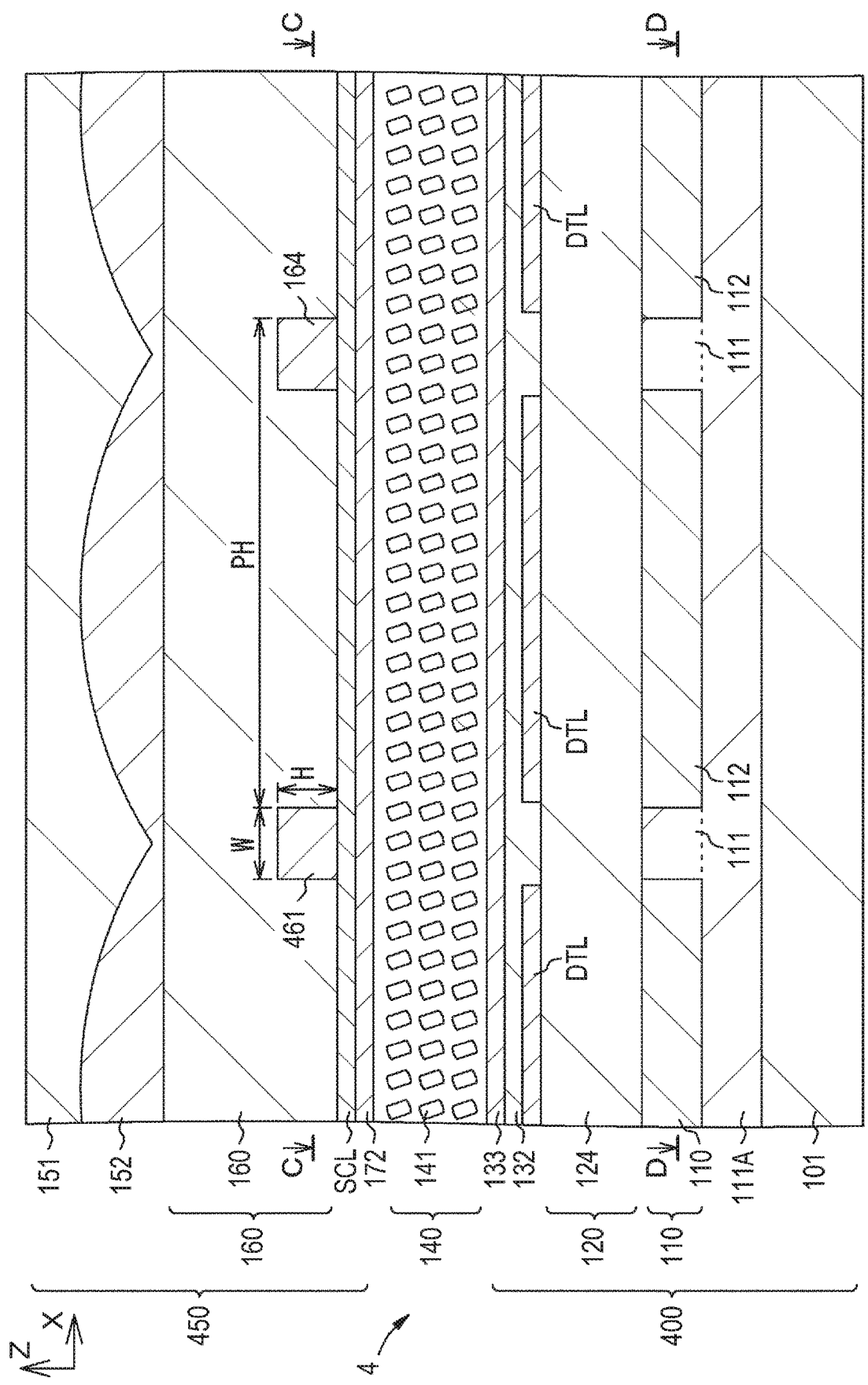
FIG. 26 is a partial schematic cross-sectional view of a substrate, etc. for explaining the liquid crystal display device according to the fourth embodiment.

FIG. 25 is a schematic view for explaining a liquid crystal display device according to the present disclosure. FIG. 26 is a partial schematic cross-sectional view for explaining the liquid crystal display device according to the fourth embodiment.

The liquid crystal display device according to the fourth embodiment is a liquid crystal display device in a passive matrix type. As shown in FIG. 25, a liquid crystal display device 4 includes a plurality of transparent electrodes SCL extending in a first direction (an X direction in the drawing), a plurality of transparent electrodes DTL extending in a second direction (a Y direction in the drawing) different from the first direction, and various circuits such as a horizontal drive circuit 11 for driving the transparent electrodes SCL and a vertical drive circuit 12 for driving the transparent electrodes DTL. For a schematic cross-sectional view for explaining the basic configuration of the liquid crystal display device 4, the liquid crystal display device 1 of FIG. 2A may be replaced with a liquid crystal display device 4, the first substrate 150 of FIG. 2A may be replaced with a first substrate 450, and the second substrate 100 of FIG. 2A may be replaced with a second substrate 400.

As shown in FIG. 26, a transparent electrode SCL extending in the X direction is formed in the first substrate 450, and a transparent electrode DTL extending in the Y direction is formed in the second substrate 400. Then, a region where the transparent electrode SCL and the transparent electrode DTL face each other forms a pixel.

The configuration of the first substrate 450 is basically a configuration in which the common electrode of the first substrate 150 in the first embodiment is replaced with the above-described transparent electrode SCL. The configuration of the first transparent material layer 160 illustrated in FIG. 26 is similar to that described in the first embodiment.

The configuration of the second substrate 400 is basically a configuration in which the wiring 121, the transistor 122, and the various wirings 123 are omitted, and the pixel electrode 131 is replaced with the above-described transparent electrode SCL, when compared to the second substrate 100 in the first embodiment. The configuration of the second transparent material layer 110 is also similar to that described in the first embodiment.

Figure 27:
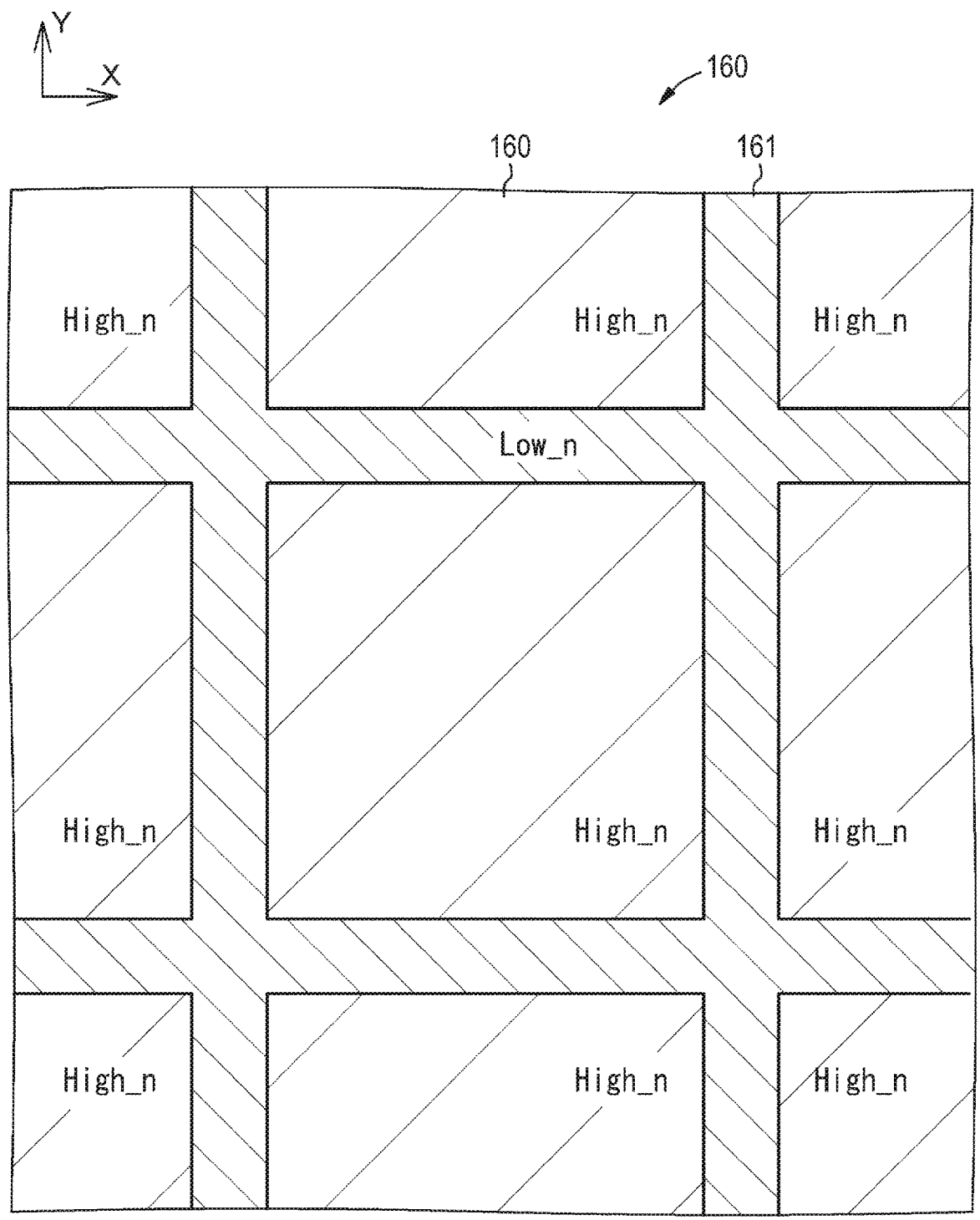
FIG. 27 is a schematic cross-sectional view of a portion taken along line C-C of FIG. 26.
Figure 28:
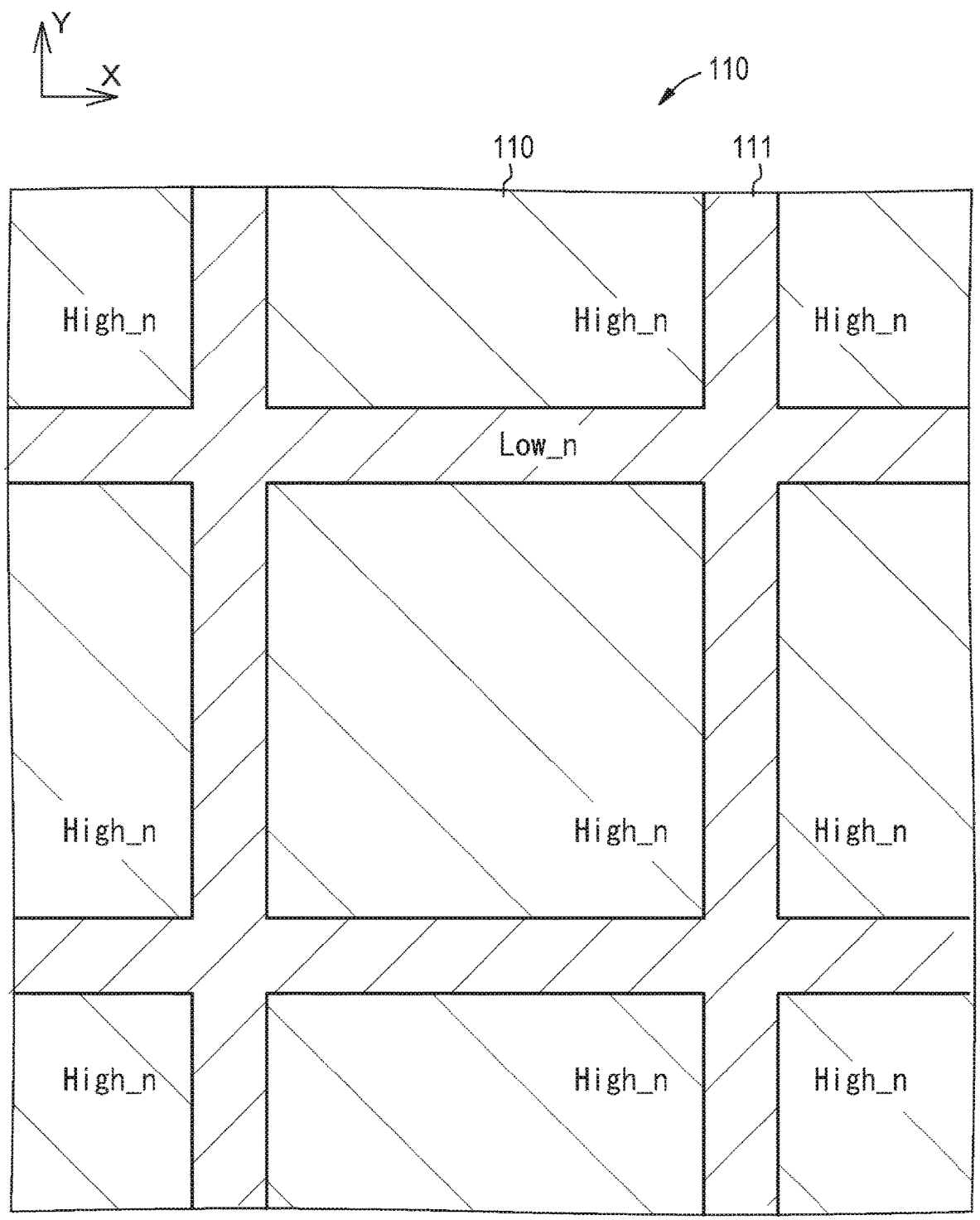
FIG. 28 is a schematic cross-sectional view of a portion taken along line D-D of FIG. 26.

In the liquid crystal display device 4, no wiring or the like for shielding light is formed. Therefore, although the fourth embodiment does not include a light shielding region as shown in FIG. 4 in the first embodiment, the components in the first transparent material layer 160 and the second transparent material layer 110 are arranged in a similar manner to those described in the first embodiment. FIG. 27 is a schematic cross-sectional view of a portion taken along line C-C of FIG. 26. FIG. 28 is a schematic cross-sectional view of a portion taken along line D-D of FIG. 26.

In the liquid crystal display device 4 as well, the light convergence effect is enhanced by the microlens 152 and the first transparent material layer 160 in which the material 161 is embedded, without stacking a plurality of microlenses having a three-dimensional shape. In addition, the second transparent material layer 110 also optically functions similarly to a convex lens. Therefore, the liquid crystal display device 4 is also capable of improving light utilization efficiency, without stacking a plurality of microlenses having a three-dimensional shape. In addition, in the liquid crystal display device 4 as well, since flat structures, such as the first transparent material layer 160 in which the material 161 is embedded and the second transparent material layer 110 in which the material 111 is embedded, are stacked, an occurrence of a crack can be suppressed.

[Description of Electronic Device]

The above-described liquid crystal display device according to the present disclosure can be used as a display unit (display device) for an electronic device in any field that displays a video signal input to the electronic device or a video signal generated in the electronic device as an image or a video. As an example, the above-described liquid crystal display device according to the present disclosure can be used as a display unit of a television set, a digital still camera, a notebook personal computer, a mobile terminal device such as a mobile phone, a video camera, a head mounted display, or the like.

The liquid crystal display device of the present disclosure also includes a module-type liquid crystal display device having a sealed configuration. As an example, the module-type liquid crystal display device may be a display module formed by attaching a counterpart including a transparent glass material or the like to a pixel array unit. Note that the display module may be provided with a circuit unit for inputting and outputting signals or the like from the outside to the pixel array unit, a flexible printed circuit (FPC), and the like. Hereinafter, as specific examples of the electronic device using the liquid crystal display device of the present disclosure, a projection display device, a digital still camera, and a head mounted display will be described. However, the specific examples described here are merely exemplary, and the present disclosure is not limited thereto.

Specific Example 1

Figure 29:
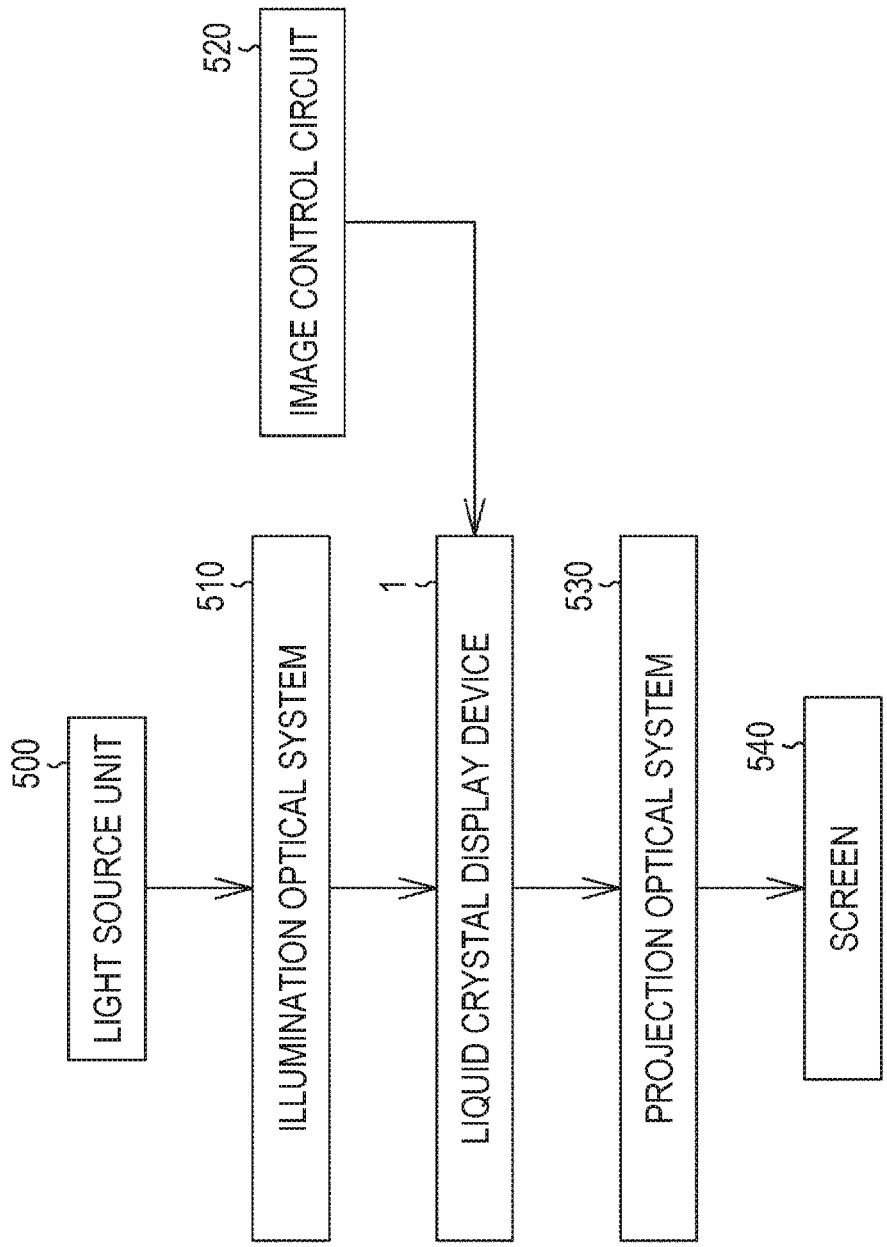
FIG. 29 is a conceptual diagram of a projection display device.

FIG. 29 is a conceptual diagram of a projection display device using the liquid crystal display device of the present disclosure. The projection display device includes a light source unit 500, an illumination optical system 510, a liquid crystal display device 1, an image control circuit 520 that drives the liquid crystal display device, a projection optical system 530, a screen 540, etc. Examples of the light source unit 500 can include various lamps, such as a xenon lamp, and semiconductor light emitting elements, such as a light emitting diode. The illumination optical system 510 is used to guide light from the light source unit 500 to the liquid crystal display device 1, and includes an optical element such as a prism or a dichroic mirror. The liquid crystal display device 1 acts as a light valve, and an image is projected on screen 540 through projection optical system 530.

Specific Example 2

Figure 30A:
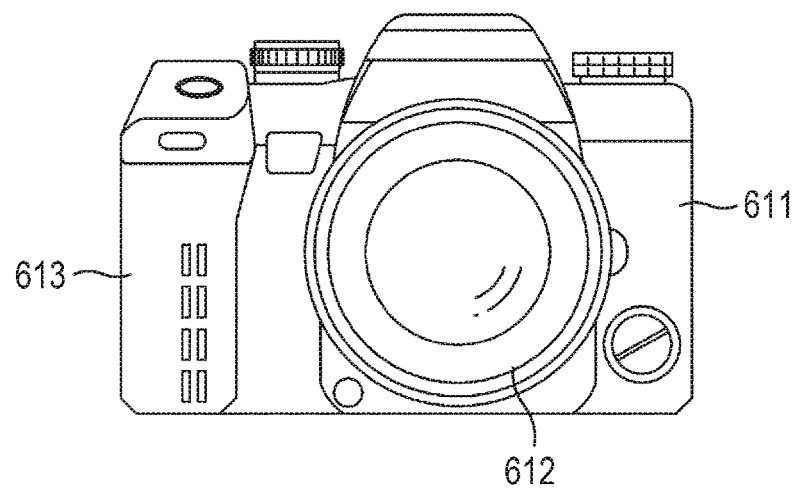
FIGS. 30A and 30B are external views of a lens-interchangeable single-eye reflex type digital still camera.
Figure 30B:
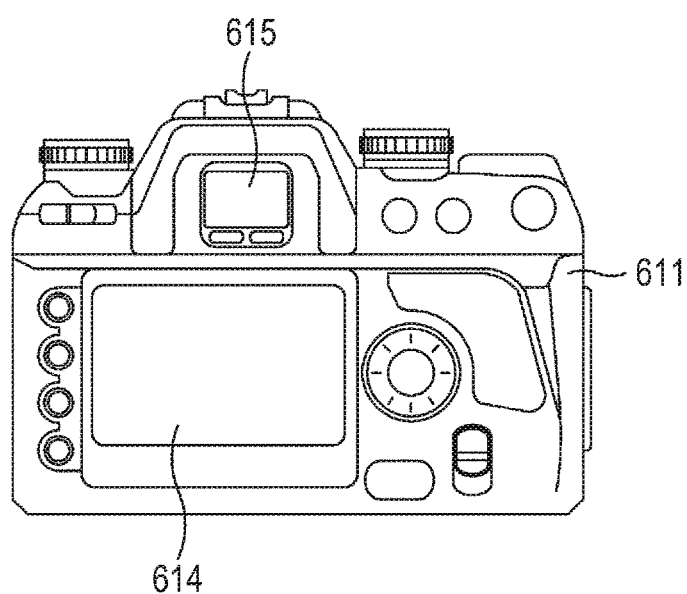

FIGS. 30A and 30B are external views of a lens-interchangeable single-eye reflex type digital still camera, and FIG. 30A shows a front view thereof and FIG. 30B shows a rear view thereof. The lens-interchangeable single-eye reflex type digital still camera includes, for example, an interchangeable imaging lens unit (interchangeable lens) 612 on the right of a front side of a camera main body (camera body) 611, and a grip portion 613 to be held by a photographer on the left of the front side of the camera main body 611.

A monitor 614 is provided substantially at the center of the back side of the camera main body 611. A viewfinder (eyepiece window) 615 is provided above the monitor 614. By looking into the viewfinder 615, the photographer can visually recognize an optical image of a subject guided from the imaging lens unit 612 and determine a composition of the image.

In the lens-interchangeable single-eye reflex type digital still camera having the above-described configuration, the liquid crystal display device of the present disclosure can be used as the viewfinder 615. That is, the lens-interchangeable single-eye reflex type digital still camera according to the present example is manufactured by using the liquid crystal display device of the present disclosure as the viewfinder 615.

Specific Example 3

Figure 31:
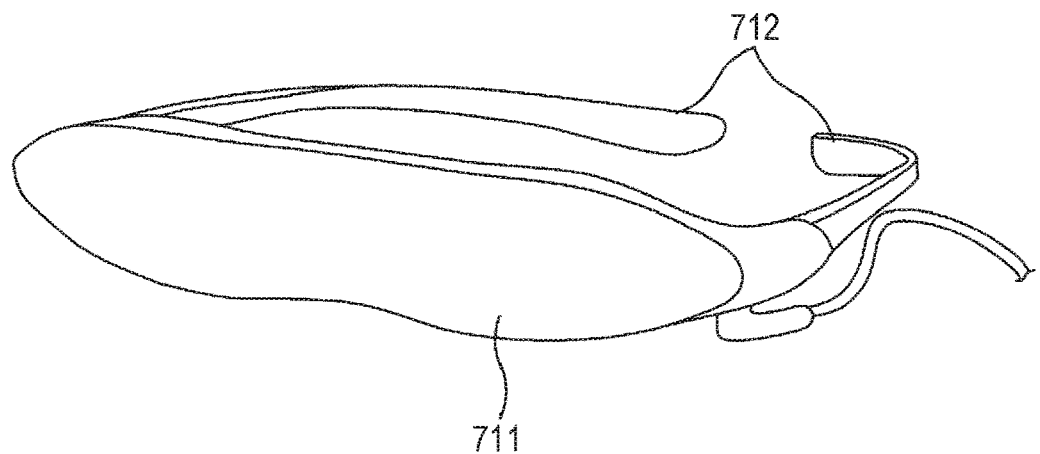
FIG. 31 is an external view of a head mounted display.

FIG. 31 is an external view of a head mounted display. The head mounted display includes ear-hook portions 712 to be worn on a user's head, for example, on both sides of an eyeglass-shaped display unit 711. In this head mounted display, the liquid crystal display device of the present disclosure can be used as the display unit 711. That is, the head mounted display according to the present example is manufactured by using the liquid crystal display device of the present disclosure as the display unit 711.

Specific Example 4

Figure 32:
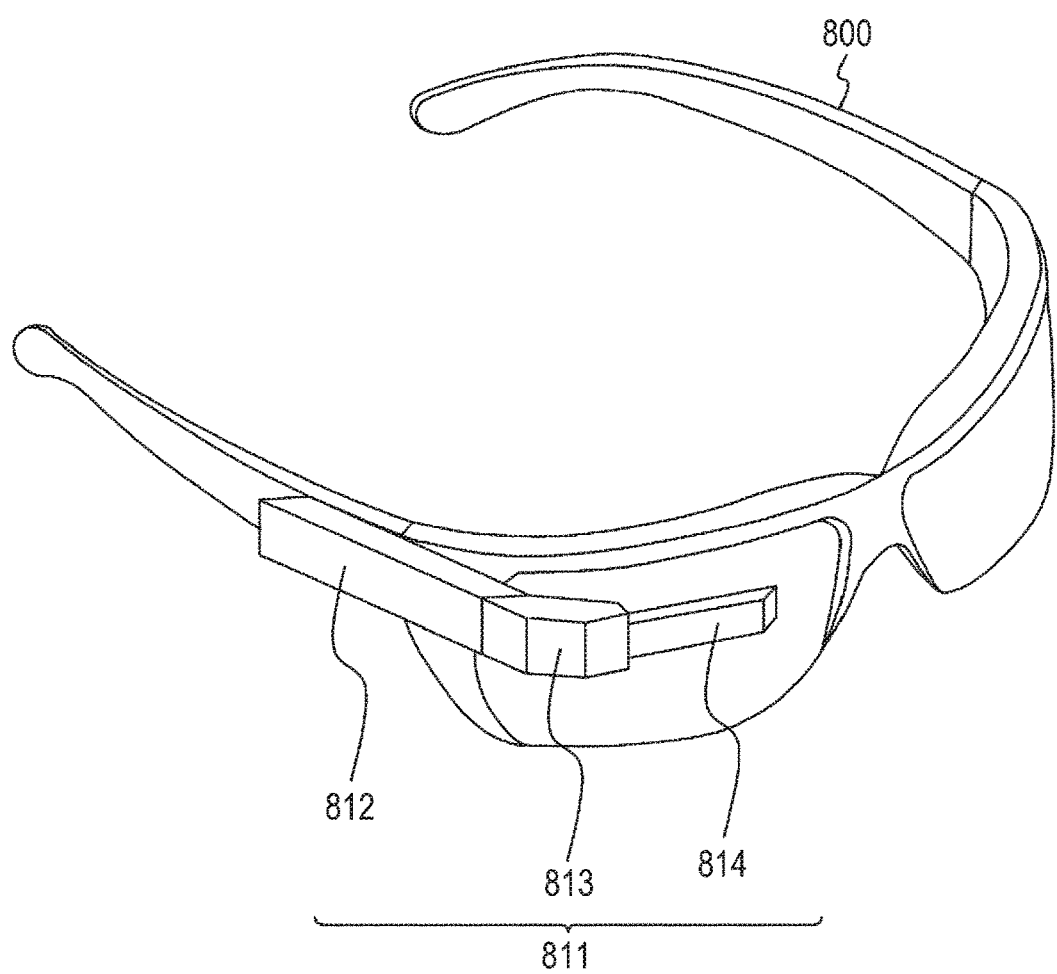
FIG. 32 is an external view of a see-through head mounted display.

FIG. 32 is an external view of a see-through head mounted display. The see-through head mounted display 801 includes a main body 802, an arm 803, and a lens barrel 804.

The main body 802 is connected to the arm 803 and the glasses 800. Specifically, an end of the main body 802 in a long side direction is coupled to the arm 803, and one portion of a side surface of the main body 802 is coupled to the glasses 800 via a connecting member. Note that the main body 802 may be directly mounted on a human body's head.

A control board for controlling an operation of the see-through head mounted display 801 and a display unit are embedded in the main body 802. The arm 803 connects the main body 802 and the lens barrel 804 to each other to support the lens barrel 804. Specifically, the arm 803 is coupled to the end of the main body 802 and the end of the lens barrel 804 to fix the lens barrel 804. Furthermore, a signal line is embedded in the arm 803 to communicate data related to an image provided from the main body 802 to the lens barrel 804.

The lens barrel 804 projects image light provided from the main body 802 via the arm 803 toward eyes of the user wearing the see-through head mounted display 801 through ocular lenses. In the see-through head mounted display 801, the liquid crystal display device of the present disclosure can be used as the display unit of the main body 802.

[Application Example]

The technology according to the present disclosure can be applied to various products. For example, the technology according to the present disclosure may be realized as a device mounted on any type of mobile body such as a vehicle, an electric vehicle, a hybrid electric vehicle, a motorcycle, a bicycle, a personal mobility, an airplane, a drone, a ship, a robot, a construction machine, or an agricultural machine (tractor).

Figure 33:
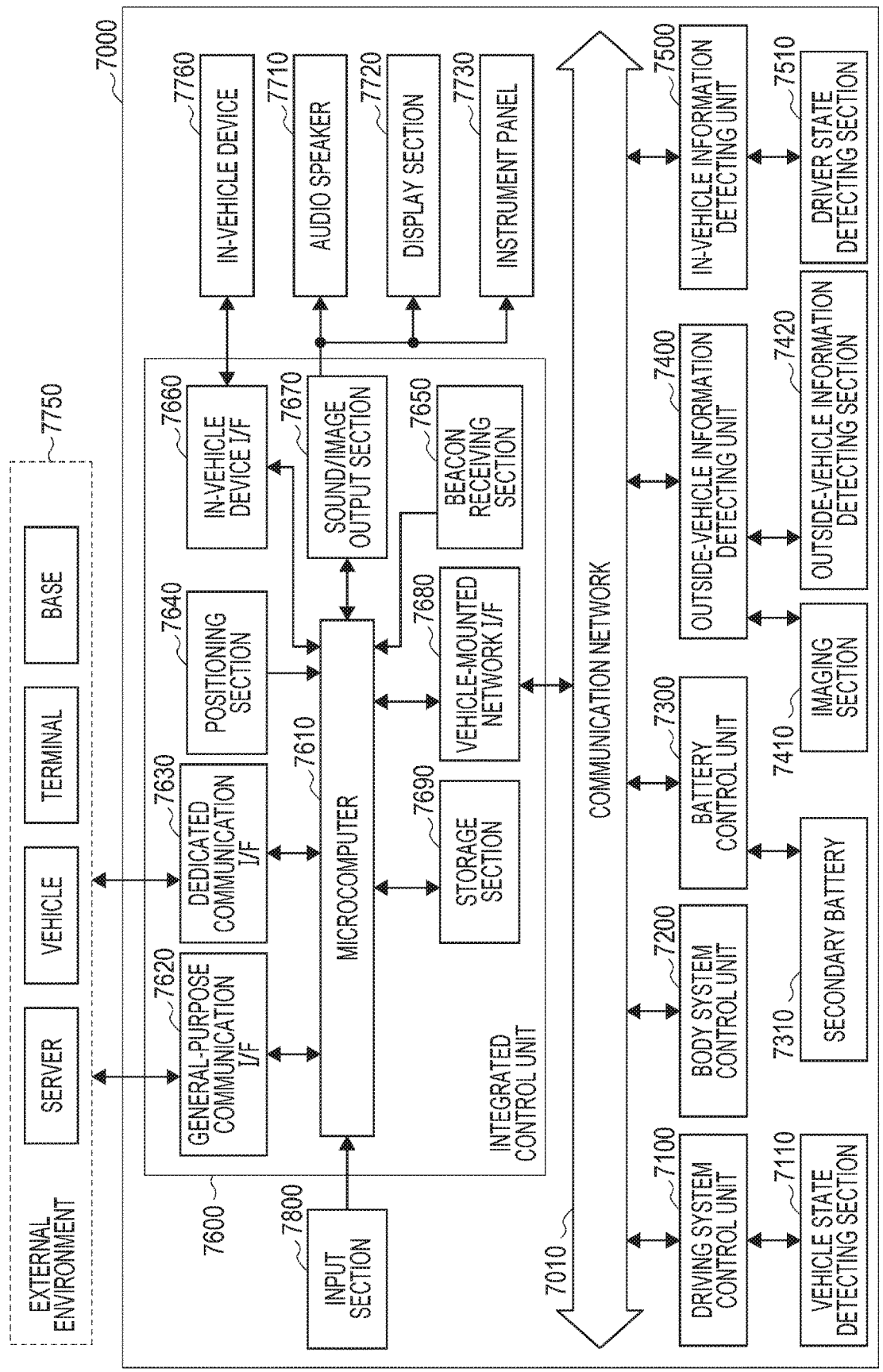
FIG. 33 is a block diagram showing an example of a schematic configuration of a vehicle control system.

FIG. 33 is a block diagram depicting an example of schematic configuration of a vehicle control system 7000 as an example of a mobile body control system to which the technology according to an embodiment of the present disclosure can be applied. The vehicle control system 7000 includes a plurality of electronic control units connected to each other via a communication network 7010. In the example depicted in FIG. 33, the vehicle control system 7000 includes a driving system control unit 7100, a body system control unit 7200, a battery control unit 7300, an outside-vehicle information detecting unit 7400, an in-vehicle information detecting unit 7500, and an integrated control unit 7600. The communication network 7010 connecting the plurality of control units to each other may, for example, be a vehicle-mounted communication network compliant with an arbitrary standard such as controller area network (CAN), local interconnect network (LIN), local area network (LAN), FlexRay (registered trademark), or the like.

Each of the control units includes: a microcomputer that performs arithmetic processing according to various kinds of programs; a storage section that stores the programs executed by the microcomputer, parameters used for various kinds of operations, or the like; and a driving circuit that drives various kinds of control target devices. Each of the control units further includes: a network interface (I/F) for performing communication with other control units via the communication network 7010; and a communication I/F for performing communication with a device, a sensor, or the like within and without the vehicle by wire communication or radio communication. A functional configuration of the integrated control unit 7600 illustrated in FIG. 33 includes a microcomputer 7610, a general-purpose communication I/F 7620, a dedicated communication I/F 7630, a positioning section 7640, a beacon receiving section 7650, an in-vehicle device I/F 7660, a sound/image output section 7670, a vehicle-mounted network I/F 7680, and a storage section 7690. The other control units similarly include a microcomputer, a communication I/F, a storage section, and the like.

The driving system control unit 7100 controls the operation of devices related to the driving system of the vehicle in accordance with various kinds of programs. For example, the driving system control unit 7100 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like. The driving system control unit 7100 may have a function as a control device of an antilock brake system (ABS), electronic stability control (ESC), or the like.

The driving system control unit 7100 is connected with a vehicle state detecting section 7110. The vehicle state detecting section 7110, for example, includes at least one of a gyro sensor that detects the angular velocity of axial rotational movement of a vehicle body, an acceleration sensor that detects the acceleration of the vehicle, and sensors for detecting an amount of operation of an accelerator pedal, an amount of operation of a brake pedal, the steering angle of a steering wheel, an engine speed or the rotational speed of wheels, and the like. The driving system control unit 7100 performs arithmetic processing using a signal input from the vehicle state detecting section 7110, and controls the internal combustion engine, the driving motor, an electric power steering device, the brake device, and the like.

The body system control unit 7200 controls the operation of various kinds of devices provided to the vehicle body in accordance with various kinds of programs. For example, the body system control unit 7200 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 7200. The body system control unit 7200 receives these input radio waves or signals, and controls a door lock device, the power window device, the lamps, or the like of the vehicle.

The battery control unit 7300 controls a secondary battery 7310, which is a power supply source for the driving motor, in accordance with various kinds of programs. For example, the battery control unit 7300 is supplied with information about a battery temperature, a battery output voltage, an amount of charge remaining in the battery, or the like from a battery device including the secondary battery 7310. The battery control unit 7300 performs arithmetic processing using these signals, and performs control for regulating the temperature of the secondary battery 7310 or controls a cooling device provided to the battery device or the like.

The outside-vehicle information detecting unit 7400 detects information about the outside of the vehicle including the vehicle control system 7000. For example, the outside-vehicle information detecting unit 7400 is connected with at least one of an imaging section 7410 and an outside-vehicle information detecting section 7420. The imaging section 7410 includes at least one of a time-of-flight (ToF) camera, a stereo camera, a monocular camera, an infrared camera, and other cameras. The outside-vehicle information detecting section 7420, for example, includes at least one of an environmental sensor for detecting current atmospheric conditions or weather conditions and a peripheral information detecting sensor for detecting another vehicle, an obstacle, a pedestrian, or the like on the periphery of the vehicle including the vehicle control system 7000.

The environmental sensor, for example, may be at least one of a rain drop sensor detecting rain, a fog sensor detecting a fog, a sunshine sensor detecting a degree of sunshine, and a snow sensor detecting a snowfall. The peripheral information detecting sensor may be at least one of an ultrasonic sensor, a radar device, and a LIDAR device (light detection and ranging device, or laser imaging detection and ranging device). Each of the imaging section 7410 and the outside-vehicle information detecting section 7420 may be provided as an independent sensor or device, or may be provided as a device in which a plurality of sensors or devices is integrated.

Figure 34:
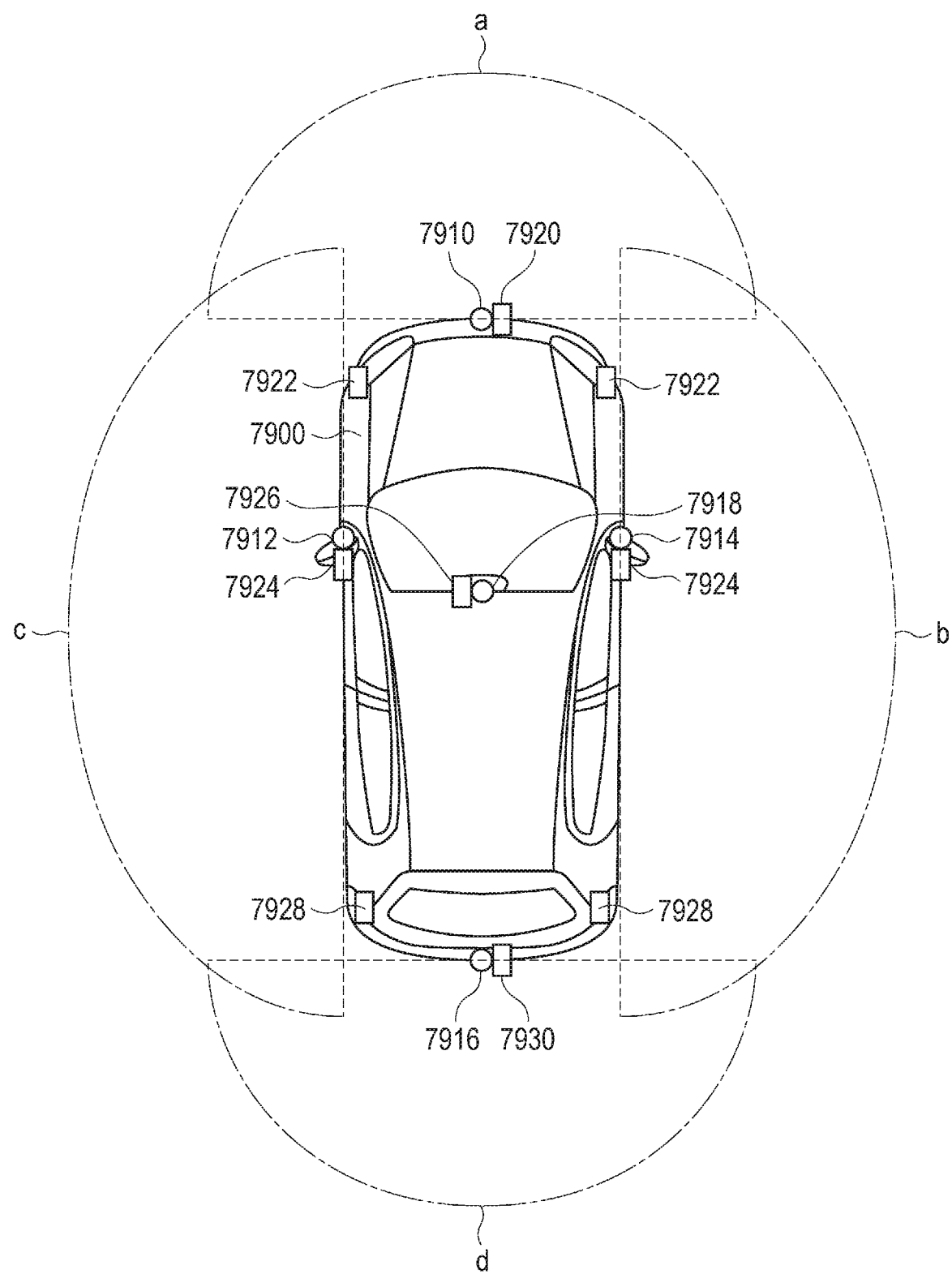
FIG. 34 is an explanatory diagram showing an example of installation positions of an outside-vehicle information detecting section and an imaging section.

FIG. 34 depicts an example of installation positions of the imaging section 7410 and the outside-vehicle information detecting section 7420. Imaging sections 7910, 7912, 7914, 7916, and 7918 are, for example, disposed at at least one of positions on a front nose, sideview mirrors, a rear bumper, and a back door of the vehicle 7900 and a position on an upper portion of a windshield within the interior of the vehicle. The imaging section 7910 provided to the front nose and the imaging section 7918 provided to the upper portion of the windshield within the interior of the vehicle obtain mainly an image of the front of the vehicle 7900. The imaging sections 7912 and 7914 provided to the sideview mirrors obtain mainly an image of the sides of the vehicle 7900. The imaging section 7916 provided to the rear bumper or the back door obtains mainly an image of the rear of the vehicle 7900. The imaging section 7918 provided to the upper portion of the windshield within the interior of the vehicle is used mainly to detect a preceding vehicle, a pedestrian, an obstacle, a signal, a traffic sign, a lane, or the like.

Incidentally, FIG. 34 depicts an example of photographing ranges of the respective imaging sections 7910, 7912, 7914, and 7916. An imaging range a represents the imaging range of the imaging section 7910 provided to the front nose. Imaging ranges b and c respectively represent the imaging ranges of the imaging sections 7912 and 7914 provided to the sideview mirrors. An imaging range d represents the imaging range of the imaging section 7916 provided to the rear bumper or the back door. A bird's-eye image of the vehicle 7900 as viewed from above can be obtained by superimposing image data imaged by the imaging sections 7910, 7912, 7914, and 7916, for example.

Outside-vehicle information detecting sections 7920, 7922, 7924, 7926, 7928, and 7930 provided to the front, rear, sides, and corners of the vehicle 7900 and the upper portion of the windshield within the interior of the vehicle may be, for example, an ultrasonic sensor or a radar device. The outside-vehicle information detecting sections 7920, 7926, and 7930 provided to the front nose of the vehicle 7900, the rear bumper, the back door of the vehicle 7900, and the upper portion of the windshield within the interior of the vehicle may be a LIDAR device, for example. These outside-vehicle information detecting sections 7920 to 7930 are used mainly to detect a preceding vehicle, a pedestrian, an obstacle, or the like.

Returning to FIG. 33, the description will be continued. The outside-vehicle information detecting unit 7400 makes the imaging section 7410 image an image of the outside of the vehicle, and receives imaged image data. In addition, the outside-vehicle information detecting unit 7400 receives detection information from the outside-vehicle information detecting section 7420 connected to the outside-vehicle information detecting unit 7400. In a case where the outside-vehicle information detecting section 7420 is an ultrasonic sensor, a radar device, or a LIDAR device, the outside-vehicle information detecting unit 7400 transmits an ultrasonic wave, an electromagnetic wave, or the like, and receives information of a received reflected wave. On the basis of the received information, the outside-vehicle information detecting unit 7400 may perform processing of detecting an object such as a human, a vehicle, an obstacle, a sign, a character on a road surface, or the like, or processing of detecting a distance thereto. The outside-vehicle information detecting unit 7400 may perform environment recognition processing of recognizing a rainfall, a fog, road surface conditions, or the like on the basis of the received information. The outside-vehicle information detecting unit 7400 may calculate a distance to an object outside the vehicle on the basis of the received information.

In addition, on the basis of the received image data, the outside-vehicle information detecting unit 7400 may perform image recognition processing of recognizing a human, a vehicle, an obstacle, a sign, a character on a road surface, or the like, or processing of detecting a distance thereto. The outside-vehicle information detecting unit 7400 may subject the received image data to processing such as distortion correction, alignment, or the like, and combine the image data imaged by a plurality of different imaging sections 7410 to generate a bird's-eye image or a panoramic image. The outside-vehicle information detecting unit 7400 may perform viewpoint conversion processing using the image data imaged by the imaging section 7410 including the different imaging parts.

The in-vehicle information detecting unit 7500 detects information about the inside of the vehicle. The in-vehicle information detecting unit 7500 is, for example, connected with a driver state detecting section 7510 that detects the state of a driver. The driver state detecting section 7510 may include a camera that images the driver, a biosensor that detects biological information of the driver, a microphone that collects sound within the interior of the vehicle, or the like. The biosensor is, for example, disposed in a seat surface, the steering wheel, or the like, and detects biological information of an occupant sitting in a seat or the driver holding the steering wheel. On the basis of detection information input from the driver state detecting section 7510, the in-vehicle information detecting unit 7500 may calculate a degree of fatigue of the driver or a degree of concentration of the driver, or may determine whether the driver is dozing. The in-vehicle information detecting unit 7500 may subject an audio signal obtained by the collection of the sound to processing such as noise canceling processing or the like.

The integrated control unit 7600 controls general operation within the vehicle control system 7000 in accordance with various kinds of programs. The integrated control unit 7600 is connected with an input section 7800. The input section 7800 is implemented by a device capable of input operation by an occupant, such, for example, as a touch panel, a button, a microphone, a switch, a lever, or the like. The integrated control unit 7600 may be supplied with data obtained by voice recognition of voice input through the microphone. The input section 7800 may, for example, be a remote control device using infrared rays or other radio waves, or an external connecting device such as a mobile telephone, a personal digital assistant (PDA), or the like that supports operation of the vehicle control system 7000. The input section 7800 may be, for example, a camera. In that case, an occupant can input information by gesture. Alternatively, data may be input which is obtained by detecting the movement of a wearable device that an occupant wears. Further, the input section 7800 may, for example, include an input control circuit or the like that generates an input signal on the basis of information input by an occupant or the like using the above-described input section 7800, and which outputs the generated input signal to the integrated control unit 7600. An occupant or the like inputs various kinds of data or gives an instruction for processing operation to the vehicle control system 7000 by operating the input section 7800.

The storage section 7690 may include a read only memory (ROM) that stores various kinds of programs executed by the microcomputer and a random access memory (RAM) that stores various kinds of parameters, operation results, sensor values, or the like. In addition, the storage section 7690 may be implemented by a magnetic storage device such as a hard disc drive (HDD) or the like, a semiconductor storage device, an optical storage device, a magneto-optical storage device, or the like.

The general-purpose communication I/F 7620 is a communication I/F used widely, which communication I/F mediates communication with various apparatuses present in an external environment 7750. The general-purpose communication I/F 7620 may implement a cellular communication protocol such as global system for mobile communications (GSM (registered trademark)), worldwide interoperability for microwave access (WiMAX), long term evolution (LTE), LTE-advanced (LTE-A), or the like, or another wireless communication protocol such as wireless LAN (referred to also as wireless fidelity (Wi-Fi (registered trademark)), Bluetooth (registered trademark), or the like. The general-purpose communication I/F 7620 may, for example, connect to an apparatus (for example, an application server or a control server) present on an external network (for example, the Internet, a cloud network, or a company-specific network) via a base station or an access point. In addition, the general-purpose communication I/F 7620 may connect to a terminal present in the vicinity of the vehicle (which terminal is, for example, a terminal of the driver, a pedestrian, or a store, or a machine type communication (MTC) terminal) using a peer to peer (P2P) technology, for example.

The dedicated communication I/F 7630 is a communication I/F that supports a communication protocol developed for use in vehicles. The dedicated communication I/F 7630 may implement a standard protocol such, for example, as wireless access in vehicle environment (WAVE), which is a combination of institute of electrical and electronic engineers (IEEE) 802.11p as a lower layer and IEEE 1609 as a higher layer, dedicated short range communications (DSRC), or a cellular communication protocol. The dedicated communication I/F 7630 typically carries out V2X communication as a concept including one or more of communication between a vehicle and a vehicle (Vehicle to Vehicle), communication between a road and a vehicle (Vehicle to Infrastructure), communication between a vehicle and a home (Vehicle to Home), and communication between a pedestrian and a vehicle (Vehicle to Pedestrian).

The positioning section 7640, for example, performs positioning by receiving a global navigation satellite system (GNSS) signal from a GNSS satellite (for example, a GPS signal from a global positioning system (GPS) satellite), and generates positional information including the latitude, longitude, and altitude of the vehicle. Incidentally, the positioning section 7640 may identify a current position by exchanging signals with a wireless access point, or may obtain the positional information from a terminal such as a mobile telephone, a personal handyphone system (PHS), or a smart phone that has a positioning function.

The beacon receiving section 7650, for example, receives a radio wave or an electromagnetic wave transmitted from a radio station installed on a road or the like, and thereby obtains information about the current position, congestion, a closed road, a necessary time, or the like. Incidentally, the function of the beacon receiving section 7650 may be included in the dedicated communication I/F 7630 described above.

The in-vehicle device I/F 7660 is a communication interface that mediates connection between the microcomputer 7610 and various in-vehicle devices 7760 present within the vehicle. The in-vehicle device I/F 7660 may establish wireless connection using a wireless communication protocol such as wireless LAN, Bluetooth (registered trademark), near field communication (NFC), or wireless universal serial bus (WUSB). In addition, the in-vehicle device I/F 7660 may establish wired connection by universal serial bus (USB), high-definition multimedia interface (HDMI (registered trademark)), mobile high-definition link (MHL), or the like via a connection terminal (and a cable if necessary) not depicted in the figures. The in-vehicle devices 7760 may, for example, include at least one of a mobile device and a wearable device possessed by an occupant and an information device carried into or attached to the vehicle. The in-vehicle devices 7760 may also include a navigation device that searches for a path to an arbitrary destination. The in-vehicle device I/F 7660 exchanges control signals or data signals with these in-vehicle devices 7760.

The vehicle-mounted network I/F 7680 is an interface that mediates communication between the microcomputer 7610 and the communication network 7010. The vehicle-mounted network I/F 7680 transmits and receives signals or the like in conformity with a predetermined protocol supported by the communication network 7010.

The microcomputer 7610 of the integrated control unit 7600 controls the vehicle control system 7000 in accordance with various kinds of programs on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. For example, the microcomputer 7610 may calculate a control target value for the driving force generating device, the steering mechanism, or the braking device on the basis of the obtained information about the inside and outside of the vehicle, and output a control command to the driving system control unit 7100. For example, the microcomputer 7610 may perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like. In addition, the microcomputer 7610 may perform cooperative control intended for automated driving, which makes the vehicle to travel automatedly without depending on the operation of the driver, or the like, by controlling the driving force generating device, the steering mechanism, the braking device, or the like on the basis of the obtained information about the surroundings of the vehicle.

The microcomputer 7610 may generate three-dimensional distance information between the vehicle and an object such as a surrounding structure, a person, or the like, and generate local map information including information about the surroundings of the current position of the vehicle, on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. In addition, the microcomputer 7610 may predict danger such as collision of the vehicle, approaching of a pedestrian or the like, an entry to a closed road, or the like on the basis of the obtained information, and generate a warning signal. The warning signal may, for example, be a signal for producing a warning sound or lighting a warning lamp.

The sound/image output section 7670 transmits an output signal of at least one of a sound and an image to an output device capable of visually or auditorily notifying information to an occupant of the vehicle or the outside of the vehicle. In the example of FIG. 33, an audio speaker 7710, a display section 7720, and an instrument panel 7730 are illustrated as the output device. The display section 7720 may, for example, include at least one of an on-board display and a head-up display. The display section 7720 may have an augmented reality (AR) display function. The output device may be other than these devices, and may be another device such as headphones, a wearable device such as an eyeglass type display worn by an occupant or the like, a projector, a lamp, or the like. In a case where the output device is a display device, the display device visually displays results obtained by various kinds of processing performed by the microcomputer 7610 or information received from another control unit in various forms such as text, an image, a table, a graph, or the like. In addition, in a case where the output device is an audio output device, the audio output device converts an audio signal constituted of reproduced audio data or sound data or the like into an analog signal, and auditorily outputs the analog signal.

Incidentally, at least two control units connected to each other via the communication network 7010 in the example depicted in FIG. 33 may be integrated into one control unit. Alternatively, each individual control unit may include a plurality of control units. Further, the vehicle control system 7000 may include another control unit not depicted in the figures. In addition, part or the whole of the functions performed by one of the control units in the above description may be assigned to another control unit. That is, predetermined arithmetic processing may be performed by any of the control units as long as information is transmitted and received via the communication network 7010. Similarly, a sensor or a device connected to one of the control units may be connected to another control unit, and a plurality of control units may mutually transmit and receive detection information via the communication network 7010.

The technology according to the present disclosure can be applied to, for example, a display unit of an output device capable of visually or auditorily notifying information among the above-described configurations.

Figure 35:
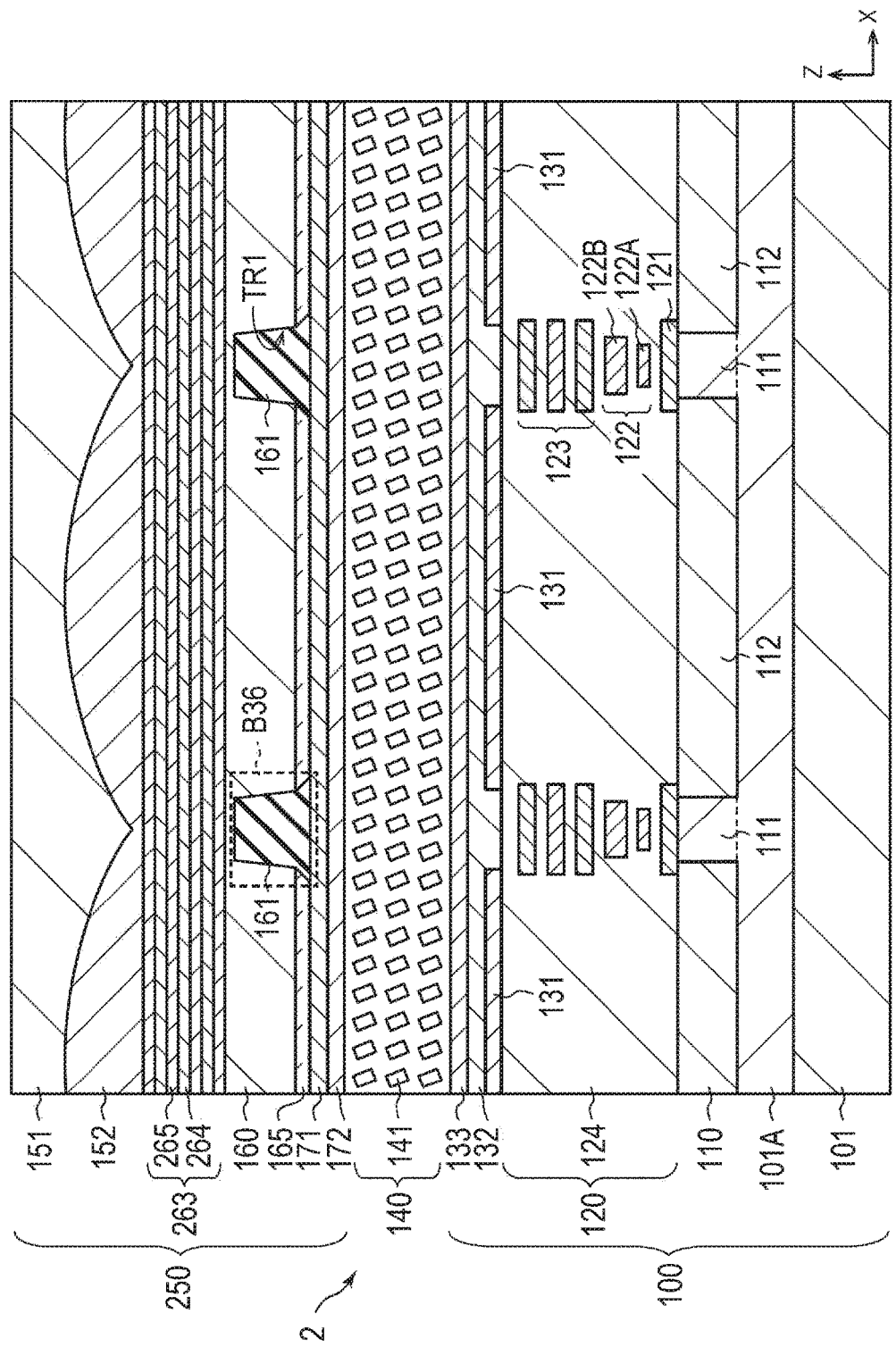
FIG. 35 is a partial schematic cross-sectional view for explaining a liquid crystal display device according to a fifth embodiment.

FIG. 35 is a partial schematic cross-sectional view for explaining a liquid crystal display device according to a fifth embodiment. In the liquid crystal display device according to the fifth embodiment, the first substrate 250 further includes a third transparent material layer 165. The third transparent material layer 165 includes a material having a refractive index (fifth refractive index) higher than the refractive index (second refractive index) of the material 161, and is formed on the first transparent material layer 160. Furthermore, the refractive index of the third transparent material layer 165 is higher than the refractive index (first refractive index) of the first transparent material layer 160. That is, when the refractive indexes of the first transparent material layer 160, the material 161, and the third transparent material layer 165 are defined as n1, n2, and n3, respectively, they have a relationship of $n2<n1<n3$. For example, in a case where the material 161 is a silicon oxide film and the first transparent material layer 160 is a silicon oxynitride film, a high refractive index material such as a silicon nitride film is used for the third transparent material layer 165. The third transparent material layer 165 has a film thickness of, for example, larger than 0 nm and smaller than 200 nm. Preferably, the film thickness of the third transparent material layer 165 is, for example, in the range of 100 nm to 200 nm.

As will be described later, the third transparent material layer 165 functions as an etching stopper or a polishing stopper when an etch-back process or a polishing process is performed with respect to the material 161. Therefore, a surface of the material 161 can be made flat to be substantially flush with a surface of the third transparent material layer 165. As a result, the transparent common electrode 171 and the alignment film 172 can be formed on the surfaces of the material 161 and the third transparent material layer 165 having high flatness. Accordingly, the liquid crystal material 140 can be aligned on the substantially flat alignment film 172, and as a result, it is possible to suppress a decrease in contrast of a pixel.

Figure 36:
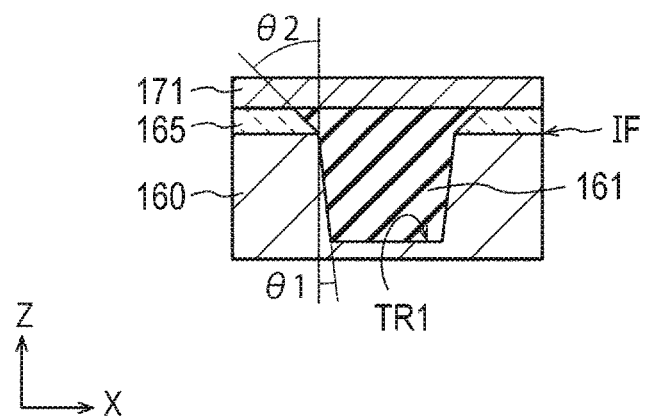
FIG. 36 is a schematic cross-sectional view showing an example of a configuration in a broken-line frame B36 of FIG. 35.

FIG. 36 is a schematic cross-sectional view showing an example of a configuration in a broken-line frame B36 of FIG. 35. The third transparent material layer 165 is provided on the first transparent material layer 160. A first groove TR1 is provided in the third transparent material layer 165 and the first transparent material layer 160. Similarly to the material 161 in the first embodiment, the first groove TR1 is provided in a portion of the first transparent material layer 160 corresponding to a region between adjacent pixels. In a plan view in a light incident direction (Z direction), the first groove TR1 is provided between the adjacent pixels, for example, in the form of a lattice.

The material 161 is embedded in the first groove TR1. Therefore, the material 161 is also provided in a portion of the first transparent material layer 160 corresponding to a region between adjacent pixels, and for example, in the form of a lattice in a plan view in the Z direction.

Here, as will be described later, the third transparent material layer 165 is etched or polished at a slower speed than the first transparent material layer 160. Therefore, in an etching process for forming the first groove TR1, it takes a relatively long time to process the third transparent material layer 165, and accordingly, the third transparent material layer 165 is etched in a relatively large area in a transverse direction (X direction). On the other hand, it takes a relatively short time to process the first transparent material layer 160, and accordingly, the first transparent material layer 160 is etched in a small area in the transverse direction (X direction). Therefore, an inclination angle of a side wall of the first groove TR1 is different between the third transparent material layer 165 and the first transparent material layer 160. For example, the inclination angle of the side wall of the first groove TR1 is an angle at which the side wall of the first groove TR1 is inclined with respect to a direction (Z direction) perpendicular to an interface IF between the first transparent material layer 160 and the third transparent material layer 165. At this time, if the side wall of the first groove TR1 in the first transparent material layer 160 is inclined at a first inclination angle $\theta1$, then the side wall of the first groove TR1 in the third transparent material layer 165 is inclined at a second inclination angle $\theta2$ larger than the first inclination angle $\theta1$ ($\theta2>\theta1$).

The other configurations in the fifth embodiment may be similar to the corresponding configurations in the second embodiment. Therefore, the fifth embodiment can obtain the same effects as the second embodiment.

Next, a method for manufacturing the liquid crystal display device according to the fifth embodiment will be described.

FIGS. 37 to 42 are cross-sectional views showing an example of a method for manufacturing the liquid crystal display device according to the fifth embodiment. First, a first transparent material layer 160 is formed on the multilayer laminate film 263 by performing the processes until the structure shown in FIG. 22A is obtained.

Figure 37:
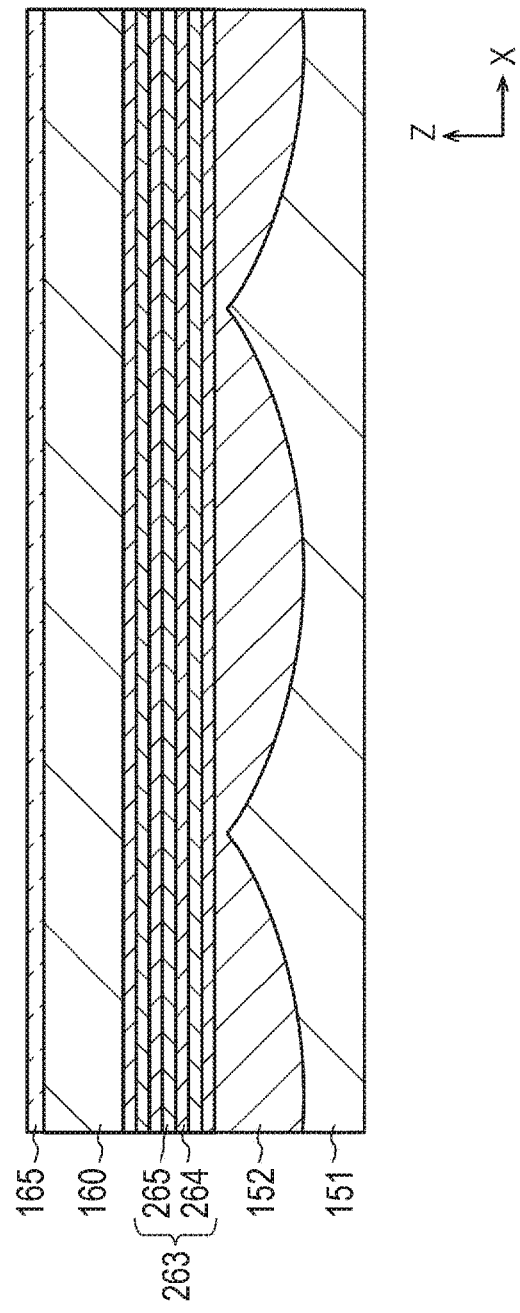
FIG. 37 is a cross-sectional view showing an example of a method for manufacturing the liquid crystal display device according to the fifth embodiment.

Next, as shown in FIG. 37, a third transparent material layer 165 is formed on the first transparent material layer 160.

Figure 38:
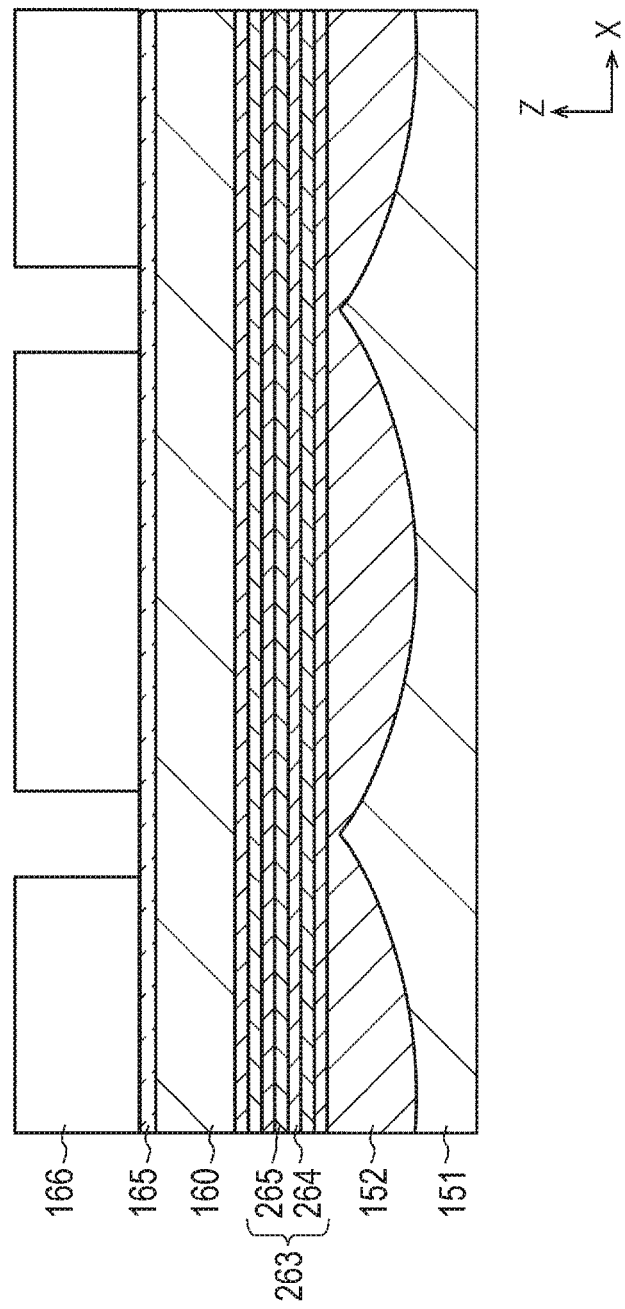
FIG. 38 is a cross-sectional view showing an example of a method for manufacturing the liquid crystal display device according to the fifth embodiment.
Figure 39:
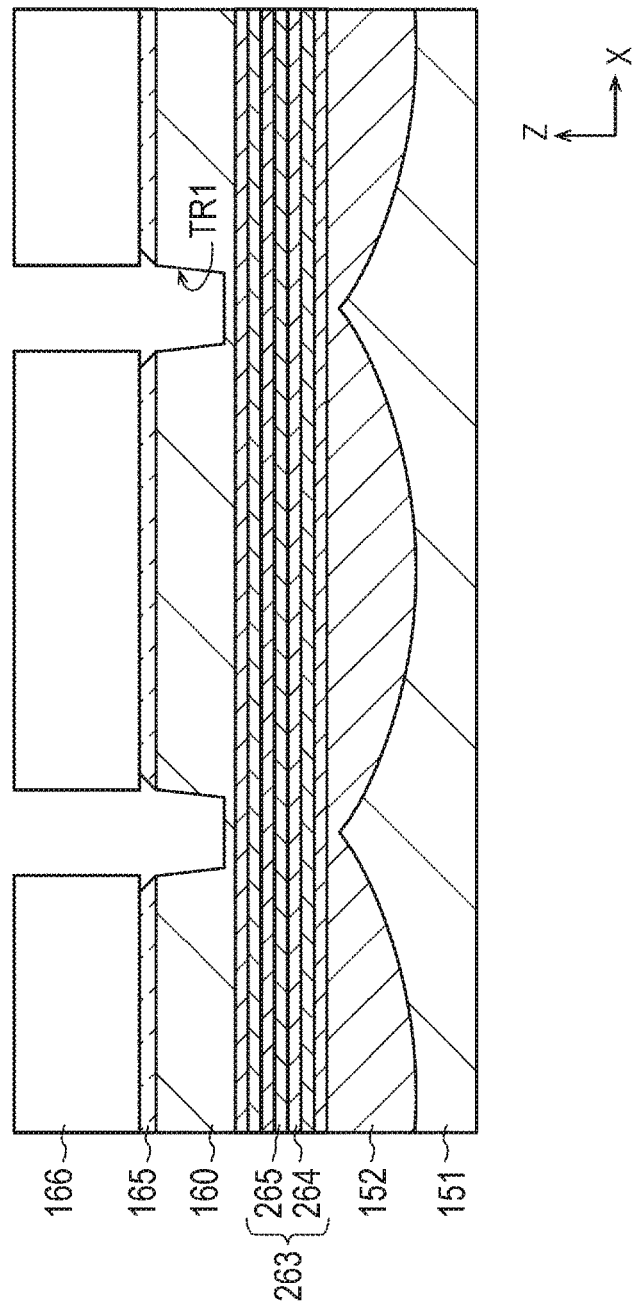
FIG. 39 is a cross-sectional view showing an example of a method for manufacturing the liquid crystal display device according to the fifth embodiment.

Next, as shown in FIG. 38, a resist film 166 is formed and patterned on the third transparent material layer 165 using a lithography technique. The resist film 166 is patterned to expose the third transparent material layer 165 in a region where a first groove TR1 is to be formed.

Next, the third transparent material layer 165 and the first transparent material layer 160 are etched using an anisotropic etching method such as a reactive ion etching (RIE) method to form a first groove TR1. At this time, the third transparent material layer 165 is etched or polished at a slower speed than the first transparent material layer 160. Therefore, as a processed state, the third transparent material layer 165 is etched in a relatively larger area in the X direction, and the side wall of the third transparent material layer 165 has a larger inclination angle (taper angle) $\theta2$.

After the third transparent material layer 165 is etched, the first transparent material layer 160 is etched at a relatively high speed. Therefore, as a processed state, the first transparent material layer 160 is etched in a relatively small area in the X direction, and the side wall of the first transparent material layer 160 has a relatively small inclination angle (taper angle) $\theta1$. In this way, the first groove TR1 is formed to have a relatively large opening width at an upper end thereof, with an inclination angle of the first groove TR1 gradually decreasing from the upper end to a bottom surface thereof.

Figure 40:
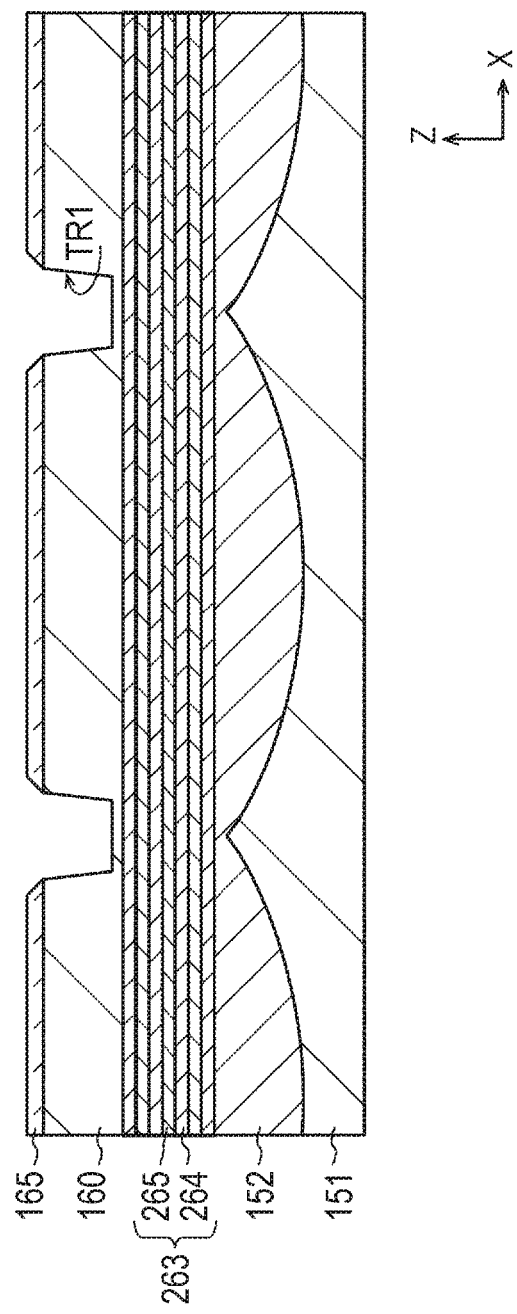
FIG. 40 is a cross-sectional view showing an example of a method for manufacturing the liquid crystal display device according to the fifth embodiment.

Next, by removing the resist film 166, the structure shown in FIG. 40 is obtained.

Figure 41:
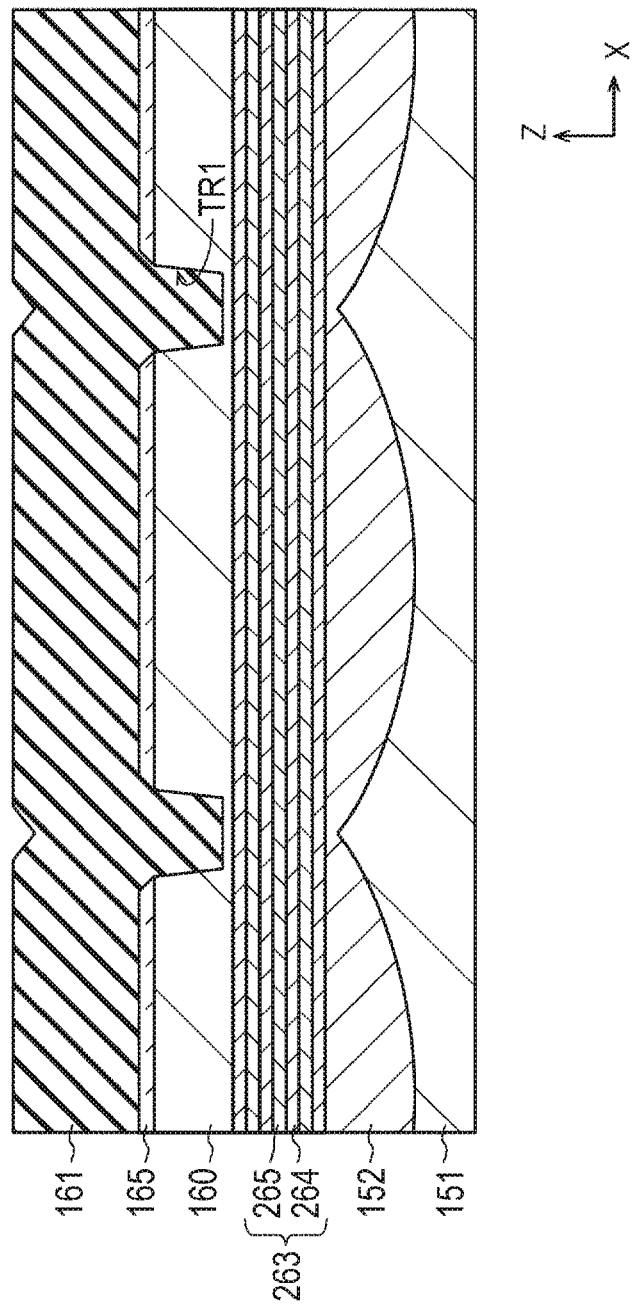
FIG. 41 is a cross-sectional view showing an example of a method for manufacturing the liquid crystal display device according to the fifth embodiment.

Next, as shown in FIG. 41, a material 161 is formed on the third transparent material layer 165 and in the first groove TR1. As a result, the first groove TR1 is filled with the material 161. At this time, since the first groove TR1 is formed to have a relatively large opening width at the upper end thereof as described above, the material 161 is easily filled in the first groove TR1. Even if a void or a seam is generated in the material 161, the void or the seam is formed above the opening of the first groove TR1 (an upper surface of the third transparent material layer 165). Therefore, the void or the seam in the material 161 can be removed in a subsequent etch-back process or a polishing process.

Figure 42:
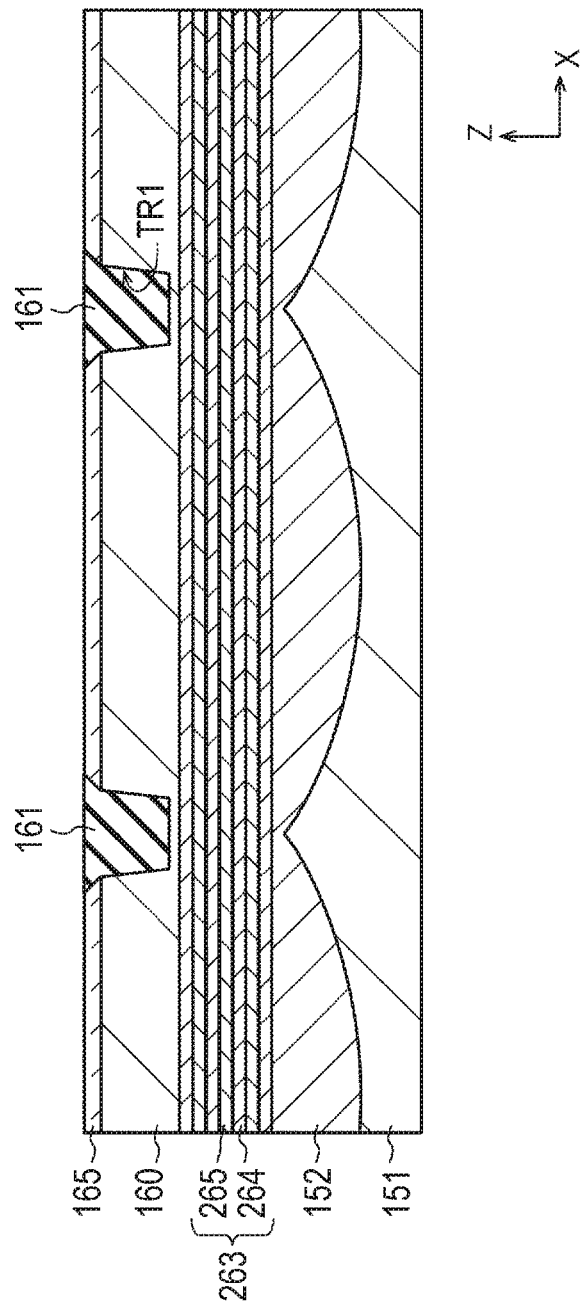
FIG. 42 is a cross-sectional view showing an example of a method for manufacturing the liquid crystal display device according to the fifth embodiment.

Next, the material 161 is etched back or polished using a chemical mechanical polishing (CMP) method or the like. As a result, the material 161 and the third transparent material layer 165 are planarized as shown in FIG. 42.

At this time, the third transparent material layer 165 is etched or polished at a lower speed than the material 161. Therefore, the third transparent material layer 165 functions as an etching stopper or a polishing stopper, such that a surface of the material 161 can be substantially flush with a surface of the third transparent material layer 165. As a result, flatness between the surface of the material 161 and the surface of the third transparent material layer 165 can be enhanced.

Next, a transparent common electrode 171 and an alignment film 172 are formed on the material 161 and the third transparent material layer 165. At this time, the transparent common electrode 171 and the alignment film 172 are formed on the surfaces of the material 161 and the third transparent material layer 165 having high flatness. The flatness of the transparent common electrode 171 and the alignment film 172 is also improved.

In this way, a first substrate 250 is completed. A method for forming a second substrate 100 and a liquid crystal material layer 140 in the fifth embodiment may be the same as that in the second embodiment. In this way, the liquid crystal display device according to the fifth embodiment is completed.

Sixth Embodiment

Figure 43:
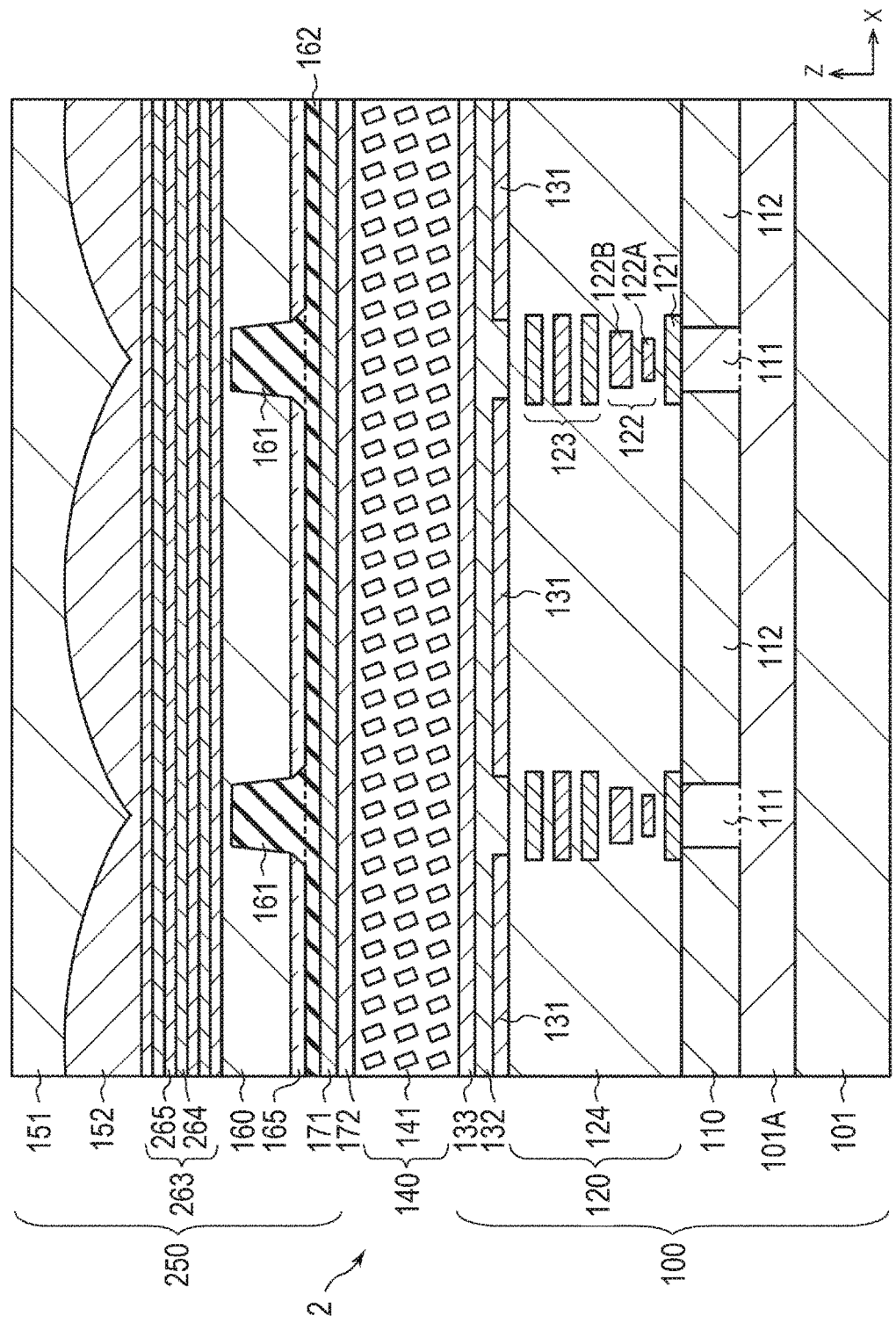
FIG. 43 is a partial schematic cross-sectional view for explaining a liquid crystal display device according to a sixth embodiment.

FIG. 43 is a partial schematic cross-sectional view for explaining a liquid crystal display device according to a sixth embodiment. The liquid crystal display device according to the sixth embodiment further includes a material film 162 provided between the third transparent material layer 165 and the transparent common electrode 171. For the material film 162, for example, a silicon oxide film is used in the same manner as for the material 161.

The material film 162 is formed on the material 161 and the third transparent material layer 165 after the material 161 is etched back or polished. Normally, film flatness achieved by a film forming process is better than that achieved by an etch-back process or a polishing process. Therefore, by forming the material film 162, warpage and uneven polishing can be reduced throughout the entire first substrate 250. That is, the surface of the material film 162 has further improved flatness than the surfaces of the material 161 and the third transparent material layer 165. As a result, the flatness of the transparent common electrode 171 and the alignment film 172 is also improved, leading to an improvement in contrast.

The other configurations in the sixth embodiment may be similar to the corresponding configurations in the fifth embodiment. In addition, it is only required that the material film 162 be formed on the material 161 and the third transparent material layer 165 after the material 161 is etched back or polished. The other processes of the manufacturing method in the sixth embodiment may be the same as those in the fifth embodiment. Therefore, the sixth embodiment can obtain the same effects as the fifth embodiment.

Note that, although not illustrated, an antireflection film may be provided under the transparent common electrode 171. The antireflection film may be, for example, a laminate film including a silicon oxide film and a silicon nitride film.

Seventh Embodiment

Figure 44:
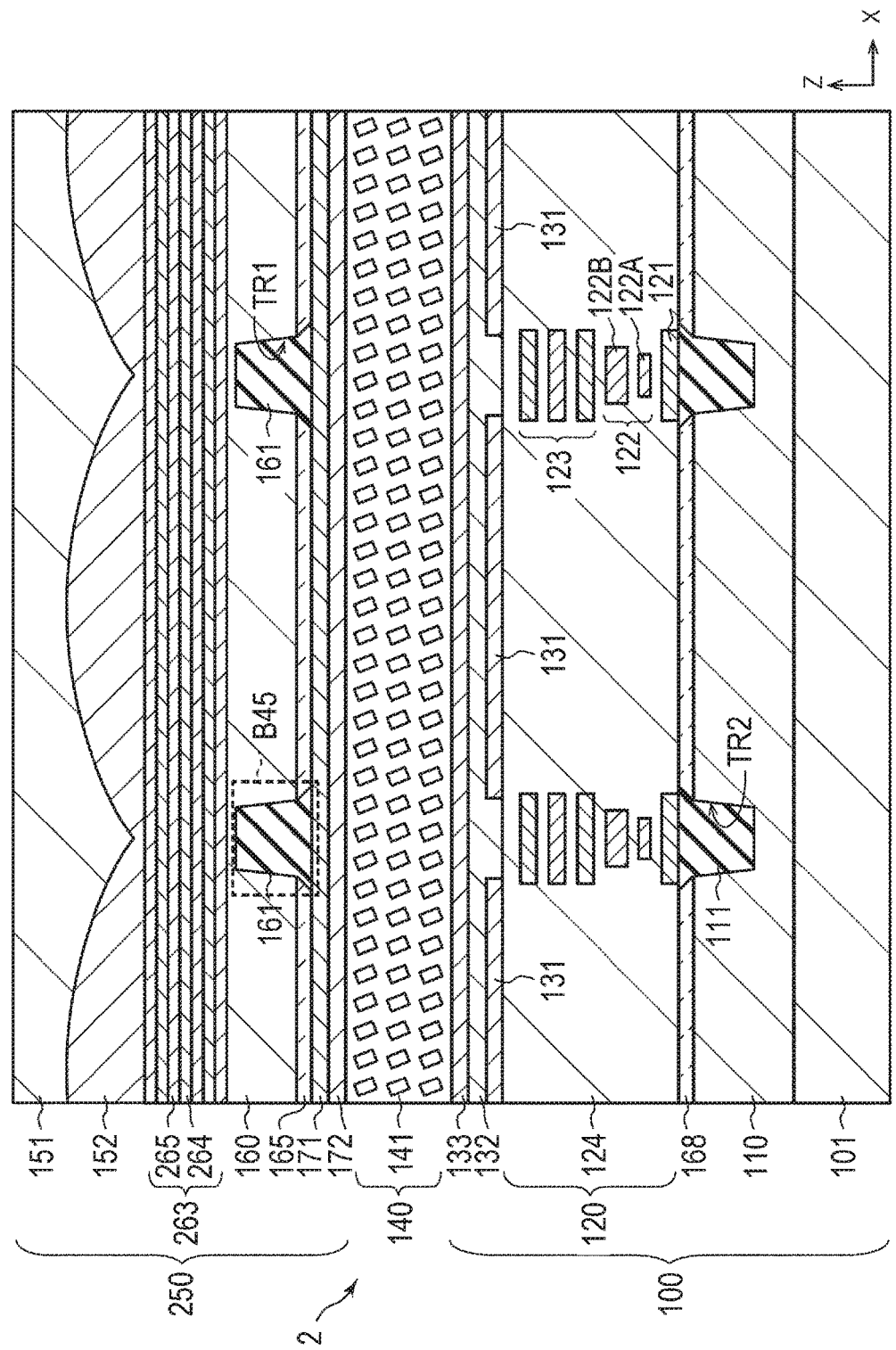
FIG. 44 is a partial schematic cross-sectional view for explaining a liquid crystal display device according to a seventh embodiment.

FIG. 44 is a partial schematic cross-sectional view for explaining a liquid crystal display device according to a seventh embodiment. In the liquid crystal display device according to the seventh embodiment, the second substrate 100 further includes a fourth transparent material layer 168. The fourth transparent material layer 168 includes a material having a refractive index (sixth refractive index) higher than the refractive index (fourth refractive index) of the material 111, and is formed on the second transparent material layer 110. Furthermore, the refractive index of the fourth transparent material layer 168 is higher than the refractive index (third refractive index) of the second transparent material layer 110. That is, when the refractive indexes of the second transparent material layer 110, the material 111, and the fourth transparent material layer 168 are defined as n4, n5, and n6, respectively, they have a relationship of n5<n4<n6. For example, in a case where the material 111 is a silicon oxide film and the second transparent material layer 110 is a silicon oxynitride film, a high refractive index material such as a silicon nitride film is used for the fourth transparent material layer 168. The fourth transparent material layer 168 has a film thickness of, for example, larger than 0 nm and smaller than 200 nm. Preferably, the film thickness of the fourth transparent material layer 168 is, for example, in the range of 100 nm to 200 nm.

As will be described later, the fourth transparent material layer 168 functions as an etching stopper or a polishing stopper when an etch-back process or a polishing process is performed with respect to the material 111. Therefore, a surface of the material 111 can be made flat to be substantially flush with a surface of the fourth transparent material layer 168. As a result, accuracy is improved in finely processing the wirings 121 and 123, the transistor 122, and a contact (not illustrated).

Figure 45:
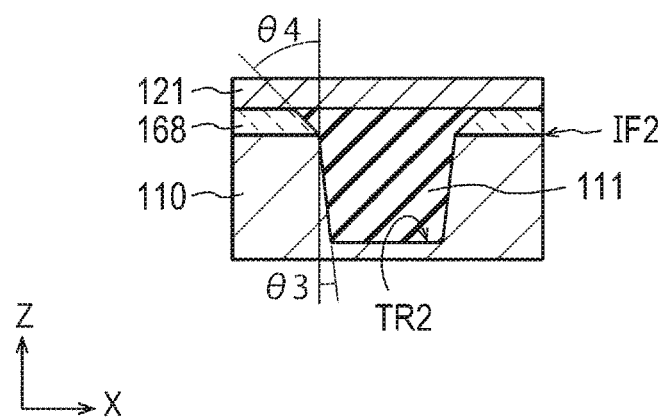
FIG. 45 is a schematic cross-sectional view showing an example of a configuration in a broken-line frame B45 of FIG. 35.

FIG. 45 is a schematic cross-sectional view showing an example of a configuration in a broken-line frame B45 of FIG. 35. The fourth transparent material layer 168 is provided on the second transparent material layer 110. A second groove TR2 is provided in the fourth transparent material layer 168 and the second transparent material layer 110. Similarly to the first groove TR1, the second groove TR2 is provided in a portion of the second transparent material layer 110 corresponding to a region between adjacent pixels. In a plan view in a light incident direction (Z direction), the second groove TR2 is provided between the adjacent pixels, for example, in the form of a lattice.

The material 111 is embedded in the second groove TR2. Therefore, the material 111 is also provided in a portion of the second transparent material layer 110 corresponding to a region between adjacent pixels, and for example, in the form of a lattice in a plan view in the Z direction.

Here, the fourth transparent material layer 168 is etched or polished at a slower speed than the second transparent material layer 110. Therefore, in an etching process for forming the second groove TR2, it takes a relatively long time to process the fourth transparent material layer 168, and accordingly, the fourth transparent material layer 168 is etched in a relatively large area in a transverse direction (X direction). On the other hand, it takes a relatively short time to process the second transparent material layer 110, and accordingly, the second transparent material layer 110 is etched in a small area in the transverse direction (X direction). Therefore, an inclination angle of a side wall of the second groove TR2 is different between the fourth transparent material layer 168 and the second transparent material layer 110. For example, the inclination angle of the side wall of the second groove TR2 is an angle at which the side wall of the second groove TR2 is inclined with respect to a direction (Z direction) perpendicular to an interface IF2 between the second transparent material layer 110 and the fourth transparent material layer 168. At this time, if the side wall of the second groove TR2 in the second transparent material layer 110 is inclined at a third inclination angle θ3, then the side wall of the second groove TR2 in the fourth transparent material layer 168 is inclined at a fourth inclination angle θ4 larger than the third inclination angle θ3 (θ4>θ3).

The other configurations in the seventh embodiment may be similar to the corresponding configurations in the fifth embodiment. Therefore, the seventh embodiment can obtain the same effects as the fifth embodiment.

A method for forming the fourth transparent material layer 168, the second groove TR2, and the material film 111 in the seventh embodiment can be easily understood from the method for forming the third transparent material layer 165, the first groove TR1, and the material film 161 in the fifth embodiment. Thus, the description thereof will be omitted.

Eighth Embodiment

Figure 46:
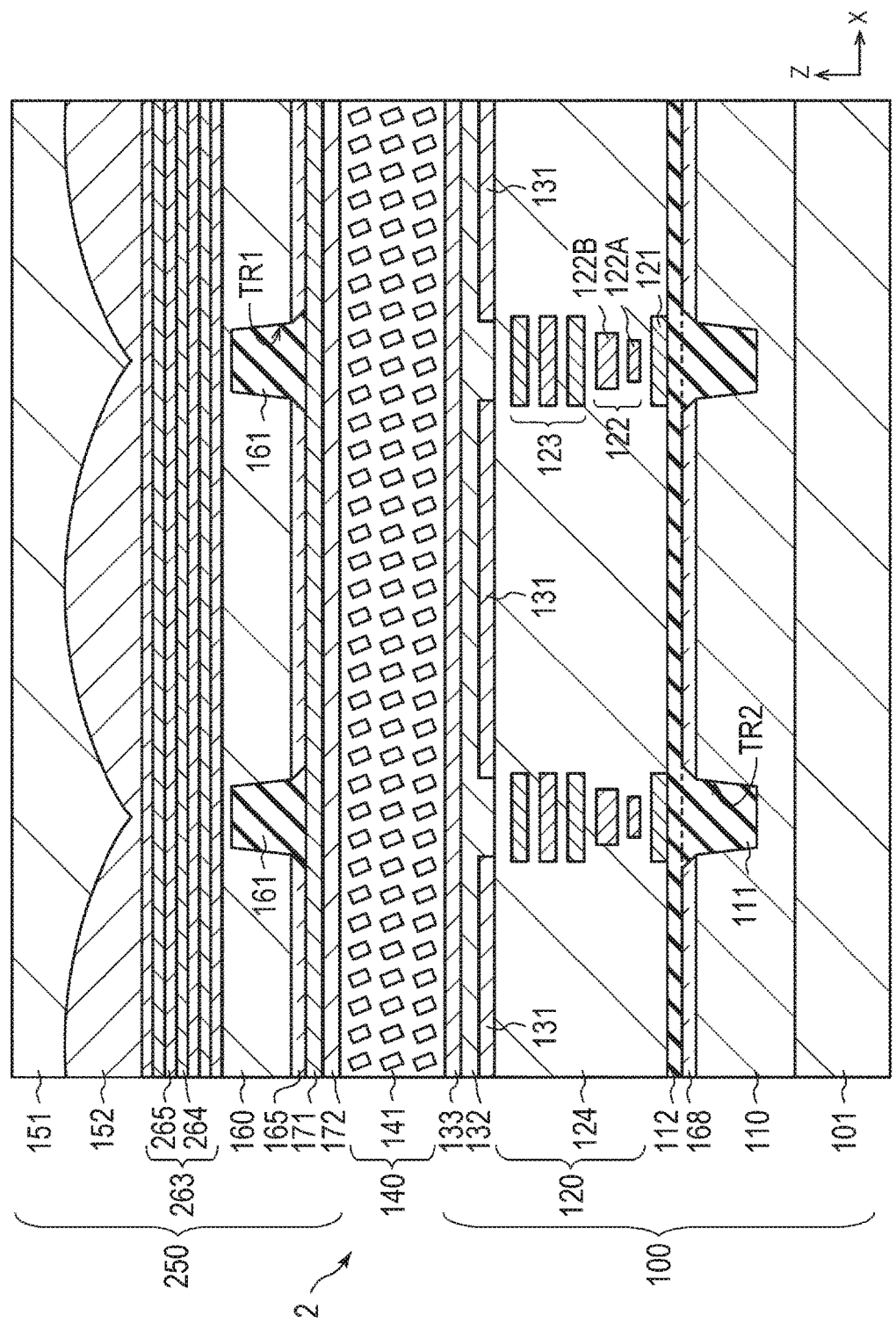
FIG. 46 is a partial schematic cross-sectional view for explaining a liquid crystal display device according to an eighth embodiment.

FIG. 46 is a partial schematic cross-sectional view for explaining a liquid crystal display device according to an eighth embodiment. The liquid crystal display device according to the eighth embodiment further includes a material film 112 provided on the fourth transparent material layer 168. For the material film 112, for example, a silicon oxide film is used in the same manner as for the material 111.

The material film 112 is formed on the material 111 and the fourth transparent material layer 168 after the material 111 is etched back or polished. Normally, film flatness achieved by a film forming process is better than that achieved by an etch-back process or a polishing process. Therefore, by forming the material film 112, warpage and uneven polishing can be reduced throughout the entire second substrate 100. That is, the surface of the material film 112 has further improved flatness than the surfaces of the material 111 and the fourth transparent material layer 168. As a result, accuracy is improved in finely processing the wirings 121 and 123, the transistor 122, and a contact (not illustrated).

The other configurations in the eighth embodiment may be similar to the corresponding configurations in the seventh embodiment. In addition, it is only required that the material film 112 be formed on the material 111 and the fourth transparent material layer 168 after the material 111 is etched back or polished. The other processes of the manufacturing method in the eighth embodiment may be the same as those in the seventh embodiment. Therefore, the eighth embodiment can obtain the same effects as the seventh embodiment.

[Others]

Note that the technology of the present disclosure can also have the following configurations.

[A1]
A liquid crystal display device including:
a first substrate including a microlens corresponding to each pixel;
a second substrate disposed to face the first substrate; and
a liquid crystal material layer sandwiched between the first substrate and the second substrate,
in which a first transparent material layer including a material having a first refractive index is formed in the first substrate, and a material having a second refractive index different from the first refractive index is disposed in a portion of the first transparent material layer corresponding to a region between adjacent pixels, and
a second transparent material layer including a material having a third refractive index is formed in the second substrate, and a material having a fourth refractive index different from the third refractive index is disposed in a portion of the second transparent material layer corresponding to the region between adjacent pixels.

[A2]
The liquid crystal display device according to [A1], in which the first transparent material layer is formed between the microlens and the liquid crystal material layer.

[A3]
The liquid crystal display device according to [A1] or [A2], in which the second refractive index is smaller than the first refractive index.

[A4]
The liquid crystal display device according to any one of [A1] to [A3], in which the material having the second refractive index is arranged in a form of a lattice.

[A5]
The liquid crystal display device according to [A4], in which the material having the second refractive index is arranged to widen at an intersection portion of the lattice.

[A6]
The liquid crystal display device according to any one of [A1] to [A5], in which the material having the first refractive index is a silicon nitride or a silicon oxynitride.

[A7]
The liquid crystal display device according to any one of [A1] to [A6], in which the material having the second refractive index is a silicon oxide.

[A8]
The liquid crystal display device according to any one of [A1] to [A7], in which a multilayer laminate film including a high refractive index material film and a low refractive index material film is disposed between the microlens and the first transparent material layer.

[A9]
The liquid crystal display device according to [A8], in which the multilayer laminate film includes a silicon nitride film and a silicon oxide film.

[A10]
The liquid crystal display device according to any one of [A1] to [A9], in which the first transparent material layer includes a multilayer laminate film including a high refractive index material film and a low refractive index material film.

[A11]
The liquid crystal display device according to any one of [A1] to [A10], in which the fourth refractive index is smaller than the third refractive index.

[A12]
The liquid crystal display device according to any one of [A1] to [A11], in which the material having the fourth refractive index is arranged in a form of a lattice.

[A13]
The liquid crystal display device according to [A12], in which the material having the fourth refractive index is arranged to widen at an intersection portion of the lattice.

[A14]
The liquid crystal display device according to any one of [A1] to [A13], in which the material having the third refractive index is a silicon nitride or a silicon oxynitride.

[A15]
The liquid crystal display device according to any one of [A1] to [A14], in which the material having the fourth refractive index is a silicon oxide.

[A16]
The liquid crystal display device according to any one of [A1] to [A15], in which a transparent common electrode is formed in the first substrate, and a transparent pixel electrode corresponding to each pixel is formed in the second substrate.

[A17]
The liquid crystal display device according to any one of [A1] to [A16], in which the second substrate has a lattice-shaped light shielding region located in a portion corresponding to the region between adjacent pixels.

[A18]

The liquid crystal display device according to any one of [A1] to [A15], in which a plurality of transparent electrodes extending in a first direction is formed in the first substrate, and a plurality of transparent electrodes extending in a second direction different from the first direction is formed in the second substrate.

[B1]

An electronic device including a liquid crystal display device, the liquid crystal display device including:

a first substrate including a microlens corresponding to each pixel;

a second substrate disposed to face the first substrate; and a liquid crystal material layer sandwiched between the first substrate and the second substrate, in which a first transparent material layer including a material having a first refractive index is formed in the first substrate, and a material having a second refractive index different from the first refractive index is disposed in a portion of the first transparent material layer corresponding to a region between adjacent pixels, and a second transparent material layer including a material having a third refractive index is formed in the second substrate, and a transparent material having a fourth refractive index different from the third refractive index is disposed in a portion of the second transparent material layer corresponding to the region between adjacent pixels.

[B2]

The electronic device according to [B1], in which the first transparent material layer is formed between the microlens and the liquid crystal material layer.

[B3]

The electronic device according to [B1] or [B2], in which the second refractive index is smaller than the first refractive index.

[B4]

The electronic device according to any one of [B1] to [B3], in which the material having the second refractive index is arranged in a form of a lattice.

[B5]

The electronic device according to [B4], in which the material having the second refractive index is arranged to widen at an intersection portion of the lattice.

[B6]

The electronic device according to any one of [B1] to [B5], in which the material having the first refractive index is a silicon nitride or a silicon oxynitride.

[B7]

The electronic device according to any one of [B1] to [B6], in which the material having the second refractive index is a silicon oxide.

[B8]

The electronic device according to any one of [B1] to [B7], in which a multilayer laminate film including a high refractive index material film and a low refractive index material film is disposed between the microlens and the first transparent material layer.

[B9]

The electronic device according to [B8], in which the multilayer laminate film includes a silicon nitride film and a silicon oxide film.

[B10]

The electronic device according to any one of [B1] to [B9], in which the first transparent material layer includes a multilayer laminate film including a high refractive index material film and a low refractive index material film.

[B11]

The electronic device according to any one of [B1] to [B10], in which the fourth refractive index is smaller than the third refractive index.

[B12]

The electronic device according to any one of [B1] to [B11], in which the material having the fourth refractive index is arranged in a form of a lattice.

[B13]

The electronic device according to [B12], in which the material having the fourth refractive index is arranged to widen at an intersection portion of the lattice.

[B14]

The electronic device according to any one of [B1] to [B13], in which the material having the third refractive index is a silicon nitride or a silicon oxynitride.

[B15]

The electronic device according to any one of [B1] to [B14], in which the material having the fourth refractive index is a silicon oxide.

[B16]

The electronic device according to any one of [B1] to [B15], in which a transparent common electrode is formed in the first substrate, and a transparent pixel electrode corresponding to each pixel is formed in the second substrate.

[B17]

The electronic device according to any one of [B1] to [B16], in which the second substrate has a lattice-shaped light shielding region located in a portion corresponding to the region between adjacent pixels.

[B18]

The electronic device according to any one of [B1] to [B15], in which a plurality of transparent electrodes extending in a first direction is formed in the first substrate, and a plurality of transparent electrodes extending in a second direction different from the first direction is formed in the second substrate.

[A20]

The liquid crystal display device according to [A1], in which a third transparent material layer including a material having a fifth refractive index higher than the second refractive index is formed on the first transparent material layer in the first substrate, and the material having the second refractive index is embedded in a first groove provided in portions of the first and third transparent material layers corresponding to the region between adjacent pixels.

[A21]

The liquid crystal display device according to [A20], in which a side wall of the first groove in the first transparent material layer is inclined at a first inclination angle from a direction perpendicular to an interface between the first transparent material layer and the third transparent material layer, and a side wall of the first groove in the third transparent material layer is inclined at a second inclination angle larger than the first inclination angle from the perpendicular direction.

[A22]

The liquid crystal display device according to [A20] or [A21], in which the third transparent material layer has a film thickness of larger than 0 nm and smaller than 200 nm.

[A23]

The liquid crystal display device according to any one of [A20] to [A22], in which the first transparent material layer is a silicon oxynitride film, and the third transparent material layer is a silicon nitride film.

[A24]

The liquid crystal display device according to any one of [A20] to [A23], in which the third transparent material layer is etched or polished at a slower speed than the first transparent material layer.

[A25]

The liquid crystal display device according to [A1], in which a fourth transparent material layer including a material having a sixth refractive index higher than the fourth refractive index is formed on the second transparent material layer in the second substrate, and the material having the fourth refractive index is embedded in a second groove provided in portions of the second and fourth transparent material layers corresponding to the region between adjacent pixels.

[A26]

The liquid crystal display device according to [A25], in which a side wall of the second groove in the second transparent material layer is inclined at a third inclination angle from a direction perpendicular to an interface between the second transparent material layer and the fourth transparent material layer, and a side wall of the second groove in the fourth transparent material layer is inclined at a fourth inclination angle larger than the third inclination angle from the perpendicular direction.

[A27]

The liquid crystal display device according to [A25] or [A26], in which the fourth transparent material layer has a film thickness of larger than 0 nm and smaller than 200 nm.

[A28]

The liquid crystal display device according to any one of [A25] to [A27], in which the second transparent material layer is a silicon oxynitride film, and the fourth transparent material layer is a silicon nitride film.

[A29]

The liquid crystal display device according to any one of [A25] to [A28], in which the fourth transparent material layer is etched or polished at a slower speed than the second transparent material layer.

[A30]

The electronic device according to [A19], in which a third transparent material layer including a material having a fifth refractive index higher than the second refractive index is formed on the first transparent material layer in the first substrate, and the material having the second refractive index is embedded in a first groove provided in portions of the first and third transparent material layers corresponding to the region between adjacent pixels.

REFERENCE SIGNS LIST 1, 2, 3, 4 Liquid crystal display device
11 Horizontal drive circuit
12 Vertical drive circuit
100 Second substrate
101 Support substrate
110 Second transparent material layer including material having third refractive index
111 Material having fourth refractive index different from third refractive index
111A Base film
120 Wiring layer
121 Wiring
122 Transistor
122A Semiconductor material layer
122B Gate electrode
123 Wiring (other various wirings)
124 Insulating layer
131 Transparent pixel electrode
132 Planarization film
133 Alignment film
140 Liquid crystal material layer
141 Liquid crystal molecule
150 Second substrate
151 Support substrate
152 Microlens
160 First transparent material layer including material having first refractive index
161 Material having second refractive index different from
first refractive index
171 Transparent common electrode
172 Alignment film
180 Seal part
250 Second substrate
263 Multilayer laminate film
264 High refractive index material film
265 Low refractive index material film
350 Second substrate
360 First transparent material layer including material having first refractive index
400 Second substrate
450 First substrate
PX Pixel
SCL Scanning line
DTL Signal line
TR Transistor
CS Capacitance structure
500 Light source unit
510 Illumination optical system
520 Image control circuit
530 Projection optical system
540 Screen
611 Camera main body
612 Imaging lens unit
613 Grip portion
614 Monitor
615 Viewfinder
711 Eyeglass-shaped display unit
712 Ear-hook portion
800 Glasses
801 See-through head mounted display
802 Main body
803 Arm
804 Lens barrel

The invention claimed is:

1. A liquid crystal display device, comprising:
a first substrate that includes a microlens corresponding to each pixel;
a second substrate that faces the first substrate; and
a liquid crystal material layer sandwiched between the first substrate and the second substrate, wherein
a first transparent material layer is in the first substrate and includes a material that has a first refractive index,
a material that has a second refractive index different from the first refractive index is in a portion of the first transparent material layer corresponding to a region between adjacent pixels, a second transparent material layer is in the second substrate and includes a material that has a third refractive index, a material that has a fourth refractive index different from the third refractive index is in a portion of the second transparent material layer corresponding to the region between the adjacent pixels, a third transparent material layer is on the first transparent material layer in the first substrate and includes a material that has a fifth refractive index higher than the second refractive index, the material that has the second refractive index is embedded in a first groove, the first groove is in portions of the first transparent material layer and the third transparent material layer corresponding to the region between the adjacent pixels, and the adjacent pixels include the pixel.

2. The liquid crystal display device according to claim 1, wherein the first transparent material layer is between the microlens and the liquid crystal material layer.

3. The liquid crystal display device according to claim 1, wherein the second refractive index is smaller than the first refractive index.

4. The liquid crystal display device according to claim 1, wherein the material that has the second refractive index is in a form of a lattice.

5. The liquid crystal display device according to claim 4, wherein the material that has the second refractive index widens at an intersection portion of the lattice.

6. The liquid crystal display device according to claim 1, wherein the material that has the first refractive index is one of a silicon nitride or a silicon oxynitride.

7. The liquid crystal display device according to claim 1, wherein the material that has the second refractive index is a silicon oxide.

8. The liquid crystal display device according to claim 1, wherein a multilayer laminate film is between the microlens and the first transparent material layer and includes a high refractive index material film and a low refractive index material film.

9. The liquid crystal display device according to claim 8, wherein the multilayer laminate film includes a silicon nitride film and a silicon oxide film.

10. The liquid crystal display device according to claim 1, wherein the fourth refractive index is smaller than the third refractive index.

11. The liquid crystal display device according to claim 1, wherein the material that has the fourth refractive index is in a form of a lattice.

12. The liquid crystal display device according to claim 11, wherein the material that has the fourth refractive index widens at an intersection portion of the lattice.

13. The liquid crystal display device according to claim 1, wherein the material that has the third refractive index is one of a silicon nitride or a silicon oxynitride.

14. The liquid crystal display device according to claim 1, wherein the material that has the fourth refractive index is a silicon oxide.

15. The liquid crystal display device according to claim 1, wherein a transparent common electrode is in the first substrate, and a transparent pixel electrode corresponding to each pixel is in the second substrate.

16. The liquid crystal display device according to claim 15, wherein the second substrate has a lattice-shaped light shielding region located in a portion corresponding to the region between the adjacent pixels.

17. The liquid crystal display device according to claim 1, wherein a plurality of transparent electrodes extending in a first direction is in the first substrate, and a plurality of transparent electrodes extending in a second direction different from the first direction is in the second substrate.

18. The liquid crystal display device according to claim 1, wherein a side wall of the first groove in the first transparent material layer is inclined at a first inclination angle from a direction perpendicular to an interface between the first transparent material layer and the third transparent material layer, and a side wall of the first groove in the third transparent material layer is inclined at a second inclination angle larger than the first inclination angle from the perpendicular direction.

19. The liquid crystal display device according to claim 1, wherein the third transparent material layer has a film thickness of larger than 0 nm and smaller than 200 nm.

20. The liquid crystal display device according to claim 1, wherein the first transparent material layer is a silicon oxynitride film, and the third transparent material layer is a silicon nitride film.

21. The liquid crystal display device according to claim 1, wherein the third transparent material layer is one of etched or polished at a slower speed than the first transparent material layer.

22. The liquid crystal display device according to claim 1, wherein a fourth transparent material layer is on the second transparent material layer in the second substrate and includes a material that has a sixth refractive index higher than the fourth refractive index, the material that has the fourth refractive index is embedded in a second groove, and the second groove is in portions of the second transparent material layer and the fourth transparent material layer corresponding to the region between the adjacent pixels.

23. The liquid crystal display device according to claim 22, wherein a side wall of the second groove in the second transparent material layer is inclined at a third inclination angle from a direction perpendicular to an interface between the second transparent material layer and the fourth transparent material layer, and a side wall of the second groove in the fourth transparent material layer is inclined at a fourth inclination angle larger than the third inclination angle from the perpendicular direction.

24. The liquid crystal display device according to claim 22, wherein the fourth transparent material layer has a film thickness of larger than 0 nm and smaller than 200 nm.

25. The liquid crystal display device according to claim 22, wherein the second transparent material layer is a silicon oxynitride film, and the fourth transparent material layer is a silicon nitride film.

26. The liquid crystal display device according to claim 22, wherein the fourth transparent material layer is one of etched or polished at a slower speed than the second transparent material layer.

27. An electronic device, comprising:
   a liquid crystal display device that includes:
      a first substrate that includes a microlens corresponding to each pixel;
      a second substrate that faces the first substrate; and
      a liquid crystal material layer sandwiched between the first substrate and the second substrate, wherein
         a first transparent material layer is in the first substrate and includes a material that has a first refractive index,
         a material that has a second refractive index different from the first refractive index is in a portion of the first transparent material layer corresponding to a region between adjacent pixels,
         a second transparent material layer is in the second substrate and includes a material that has a third refractive index,
         a material that has a fourth refractive index different from the third refractive index is in a portion of the second transparent material layer corresponding to the region between the adjacent pixels,
         a third transparent material layer is on the first transparent material layer in the first substrate and includes a material that has a fifth refractive index higher than the second refractive index,
      the material that has the second refractive index is embedded in a first groove,
      the first groove is in portions of the first transparent material layer and the third transparent material layer corresponding to the region between the adjacent pixels, and
      the adjacent pixels include the pixel.

* * * * *